US007120802B2

(12) United States Patent  
Shear et al.

(10) Patent No.: US 7,120,802 B2  
(45) Date of Patent: Oct. 10, 2006

(54) SYSTEMS AND METHODS FOR USING CRYPTOGRAPHY TO PROTECT SECURE COMPUTING ENVIRONMENTS

(75) Inventors: Victor H. Shear, Bethesda, MD (US); W. Olin Sibert, Lexington, MA (US); David M. Van Wie, Sunnyvale, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 938 days.

(21) Appl. No.: 09/925,072

(22) Filed: Aug. 6, 2001

(65) Prior Publication Data

US 2002/0023214 A1 Feb. 21, 2002

Related U.S. Application Data

(63) Continuation of application No. 09/678,830, filed on Oct. 4, 2000, now Pat. No. 6,292,569, which is a continuation of application No. 08/689,754, filed on Aug. 12, 1996, now Pat. No. 6,157,721.

(51) Int. Cl.  
*G06F 11/30* (2006.01)

(52) U.S. Cl. ............... 713/194; 713/156; 713/164; 713/175; 713/190; 705/54; 705/57

(58) Field of Classification Search ............. 705/54, 705/57; 713/156, 164, 175, 190, 194, 181  
See application file for complete search history.

(56) References Cited

U.S. PATENT DOCUMENTS

| 3,573,747 A | 4/1971 | Adams et al. |
|---|---|---|
| 3,609,697 A | 9/1971 | Blevins |
| 3,790,700 A | 2/1974 | Callais et al. |
| 3,796,830 A | 3/1974 | Smith |
| 3,798,359 A | 3/1974 | Feistel |
| 3,798,360 A | 3/1974 | Feistel |
| 3,798,605 A | 3/1974 | Feistel |
| 3,806,874 A | 4/1974 | Ehrat |

(Continued)

FOREIGN PATENT DOCUMENTS

AU 653823 12/1992

(Continued)

OTHER PUBLICATIONS

Davud Arneke and Donna Cunningham, Document from the Internet: *AT&T encryption system protects information services*, (News Release), Jan. 9, 1995, 1 page.

(Continued)

*Primary Examiner*—Emmanuel L. Moise  
*Assistant Examiner*—Paul Callahan  
(74) *Attorney, Agent, or Firm*—Finnegan Henderson Farabow Garrett & Dunner LLP

(57) ABSTRACT

Secure computation environments are protected from bogus or rogue load modules, executables and other data elements through use of digital signatures, seals and certificates issued by a verifying authority. A verifying authority—which may be a trusted independent third party—tests the load modules or other executables to verify that their corresponding specifications are accurate and complete, and then digitally signs the load module or other executable based on tamper resistance work factor classification. Secure computation environments with different tamper resistance work factors use different verification digital signature authentication techniques (e.g., different signature algorithms and/or signature verification keys)—allowing one tamper resistance work factor environment to protect itself against load modules from another, different tamper resistance work factor environment. Several dissimilar digital signature algorithms may be used to reduce vulnerability from algorithm compromise, and subsets of multiple digital signatures may be used to reduce the scope of any specific compromise.

3 Claims, 15 Drawing Sheets

U.S. PATENT DOCUMENTS

| | | |
|---|---|---|
| 3,806,882 A | 4/1974 | Clarke |
| 3,829,833 A | 8/1974 | Freeny |
| 3,845,391 A | 10/1974 | Crosby |
| 3,906,448 A | 9/1975 | Henriques |
| 3,911,397 A | 10/1975 | Freeny |
| 3,924,065 A | 12/1975 | Freeny |
| 3,931,504 A | 1/1976 | Jacoby |
| 3,946,200 A | 3/1976 | Juodikis |
| 3,946,220 A | 3/1976 | Brobeck et al. |
| 3,956,615 A | 5/1976 | Anderson et al. |
| 3,958,081 A | 5/1976 | Ehrsam et al. |
| 3,970,992 A | 7/1976 | Boothroyd et al. |
| 3,996,449 A | 12/1976 | Attanasio et al. |
| 4,020,326 A | 4/1977 | Coulthurst |
| 4,048,619 A | 9/1977 | Forman et al. |
| 4,071,911 A | 1/1978 | Mazur |
| 4,104,721 A | 8/1978 | Markstein et al. |
| 4,112,421 A | 9/1978 | Freeny |
| 4,120,030 A | 10/1978 | Johnstone |
| 4,162,483 A | 7/1979 | Entenman |
| 4,163,280 A | 7/1979 | Mori et al. |
| 4,168,396 A | 9/1979 | Best |
| 4,183,085 A | 1/1980 | Roberts et al. |
| 4,196,310 A | 4/1980 | Forman et al. |
| 4,200,913 A | 4/1980 | Kuhar et al. |
| 4,209,787 A | 6/1980 | Freeny |
| 4,217,588 A | 8/1980 | Freeny |
| 4,220,991 A | 9/1980 | Hamano et al. |
| 4,232,193 A | 11/1980 | Gerard |
| 4,232,317 A | 11/1980 | Freeny |
| 4,236,217 A | 11/1980 | Kennedy |
| 4,246,638 A | 1/1981 | Thomas |
| 4,253,157 A | 2/1981 | Kirschner et al. |
| 4,259,720 A | 3/1981 | Campbell |
| 4,262,329 A | 4/1981 | Bright et al. |
| 4,265,371 A | 5/1981 | Desai et al. |
| 4,270,182 A | 5/1981 | Asija |
| 4,278,837 A | 7/1981 | Best |
| 4,305,131 A | 12/1981 | Best |
| 4,306,289 A | 12/1981 | Lumley |
| 4,309,569 A | 1/1982 | Merkle |
| 4,319,079 A | 3/1982 | Best |
| 4,321,672 A | 3/1982 | Braun et al. |
| 4,323,921 A | 4/1982 | Guillou |
| 4,328,544 A | 5/1982 | Baldwin et al. |
| 4,337,483 A | 6/1982 | Guillou |
| 4,361,877 A | 11/1982 | Dyer et al. |
| 4,375,579 A | 3/1983 | Davida et al. |
| 4,405,829 A | 9/1983 | Rivest et al. |
| 4,433,207 A | 2/1984 | Best |
| 4,434,464 A | 2/1984 | Suzuki et al. |
| 4,442,484 A | 4/1984 | Childs, Jr. et al. |
| 4,442,486 A | 4/1984 | Mayer |
| 4,446,519 A | 5/1984 | Thomas |
| 4,454,594 A | 6/1984 | Heffron et al. |
| 4,458,315 A | 7/1984 | Uchenick |
| 4,462,076 A | 7/1984 | Smith |
| 4,462,078 A | 7/1984 | Ross |
| 4,465,901 A | 8/1984 | Best |
| 4,471,163 A | 9/1984 | Donald et al. |
| 4,471,216 A | 9/1984 | Herve |
| 4,484,217 A | 11/1984 | Block et al. |
| 4,494,156 A | 1/1985 | Kadison et al. |
| 4,513,174 A | 4/1985 | Herman |
| 4,523,271 A | 6/1985 | Levien |
| 4,525,599 A | 6/1985 | Curran et al. |
| 4,528,588 A | 7/1985 | Lofberg |
| 4,528,643 A | 7/1985 | Freeny |
| 4,529,870 A | 7/1985 | Chaum |
| 4,553,252 A | 11/1985 | Egendorf |
| 4,558,176 A | 12/1985 | Arnold et al. |
| 4,558,413 A | 12/1985 | Schmidt et al. |
| 4,562,305 A | 12/1985 | Gaffney, Jr. |
| 4,562,306 A | 12/1985 | Chou et al. |
| 4,562,495 A | 12/1985 | Bond et al. |
| 4,573,119 A | 2/1986 | Westheimer et al. |
| 4,577,289 A | 3/1986 | Comerford et al. |
| 4,578,530 A | 3/1986 | Zeidler |
| 4,584,639 A | 4/1986 | Hardy |
| 4,584,641 A | 4/1986 | Guglielmino |
| 4,588,991 A | 5/1986 | Atalla |
| 4,589,064 A | 5/1986 | Chiba et al. |
| 4,590,552 A | 5/1986 | Guttag et al. |
| 4,593,183 A | 6/1986 | Fakatsu |
| 4,593,353 A | 6/1986 | Pickholtz |
| 4,593,376 A | 6/1986 | Volk |
| 4,595,950 A | 6/1986 | Lofberg |
| 4,597,058 A | 6/1986 | Izumi et al. |
| 4,598,288 A | 7/1986 | Yarbrough et al. |
| 4,599,489 A | 7/1986 | Cargile |
| 4,609,777 A | 9/1986 | Cargile |
| 4,609,985 A | 9/1986 | Dozier |
| 4,621,321 A | 11/1986 | Boebert et al. |
| 4,621,334 A | 11/1986 | Garcia |
| 4,622,222 A | 11/1986 | Horváth et al. |
| 4,634,807 A | 1/1987 | Chorley et al. |
| 4,644,493 A | 2/1987 | Chandra et al. |
| 4,646,234 A | 2/1987 | Tolman et al. |
| 4,652,990 A | 3/1987 | Pailen et al. |
| 4,658,093 A | 4/1987 | Hellman |
| 4,670,857 A | 6/1987 | Rackman |
| 4,672,572 A | 6/1987 | Alsberg |
| 4,672,605 A | 6/1987 | Hustig et al. |
| 4,677,434 A | 6/1987 | Fascenda |
| 4,677,552 A | 6/1987 | Sibley, Jr. |
| 4,680,731 A | 7/1987 | Izumi et al. |
| 4,683,553 A | 7/1987 | Mollier |
| 4,683,968 A | 8/1987 | Appelbaum et al. |
| 4,685,056 A | 8/1987 | Barnsdale et al. |
| 4,688,169 A | 8/1987 | Joshi |
| 4,691,350 A | 9/1987 | Kleijne et al. |
| 4,696,034 A | 9/1987 | Wiedemer |
| 4,700,296 A | 10/1987 | Palmer, Jr. et al. |
| 4,701,846 A | 10/1987 | Ikeda et al. |
| 4,712,238 A | 12/1987 | Gilhousen et al. |
| 4,713,753 A | 12/1987 | Boebert et al. |
| 4,727,550 A | 2/1988 | Chang et al. |
| 4,740,890 A | 4/1988 | William |
| 4,747,139 A | 5/1988 | Taaffe |
| 4,748,561 A | 5/1988 | Brown |
| 4,757,533 A | 7/1988 | Allen et al. |
| 4,757,534 A | 7/1988 | Matyas et al. |
| 4,757,914 A | 7/1988 | Roth et al. |
| 4,768,087 A | 8/1988 | Taub et al. |
| 4,780,821 A | 10/1988 | Crossley |
| 4,791,565 A | 12/1988 | Dunham et al. |
| 4,796,181 A | 1/1989 | Wiedemer |
| 4,796,220 A | 1/1989 | Wolfe |
| 4,798,209 A | 1/1989 | Klingenbeck et al. |
| 4,799,156 A | 1/1989 | Shavit |
| 4,807,288 A | 2/1989 | Ugon et al. |
| 4,816,655 A | 3/1989 | Musyck et al. |
| 4,817,140 A | 3/1989 | Chandra et al. |
| 4,823,264 A | 4/1989 | Deming |
| 4,827,508 A | 5/1989 | Shear |
| 4,858,121 A | 8/1989 | Barber et al. |
| 4,864,494 A | 9/1989 | Kobus |
| 4,864,616 A | 9/1989 | Pond et al. |
| 4,866,769 A | 9/1989 | Karp |
| 4,868,736 A | 9/1989 | Walker |
| 4,868,877 A | 9/1989 | Fischer |
| 4,888,798 A | 12/1989 | Earnest |
| 4,893,248 A | 1/1990 | Pitts et al. |
| 4,893,332 A | 1/1990 | Brown |

| | | | | | | |
|---|---|---|---|---|---|---|
| 4,903,296 A | 2/1990 | Chandra et al. | | 5,245,165 A | 9/1993 | Zhang |
| 4,919,545 A | 4/1990 | Yu | | 5,247,575 A | 9/1993 | Sprague et al. |
| 4,924,378 A | 5/1990 | Hershey et al. | | 5,251,294 A | 10/1993 | Abelow |
| 4,926,480 A | 5/1990 | Chaum | | 5,253,297 A | 10/1993 | Press |
| 4,930,073 A | 5/1990 | Cina | | 5,257,369 A | 10/1993 | Skeen et al. |
| 4,937,863 A | 6/1990 | Robert et al. | | 5,260,999 A | 11/1993 | Wyman |
| 4,941,175 A | 7/1990 | Enescu et al. | | 5,263,157 A | 11/1993 | Janis |
| 4,949,187 A | 8/1990 | Cohen | | 5,263,158 A | 11/1993 | Janis |
| 4,953,209 A | 8/1990 | Ryder, Sr. et al. | | 5,263,165 A | 11/1993 | Janis |
| 4,962,533 A | 10/1990 | Krueger et al. | | 5,265,164 A | 11/1993 | Matyas et al. |
| 4,975,647 A | 12/1990 | Downer et al. | | 5,276,735 A | 1/1994 | Boebert et al. |
| 4,975,878 A | 12/1990 | Boddu et al. | | 5,276,901 A | 1/1994 | Howell et al. |
| 4,977,594 A | 12/1990 | Shear | | 5,280,479 A | 1/1994 | Mary |
| 4,995,082 A | 2/1991 | Schnorr | | 5,283,830 A | 2/1994 | Hinsley et al. |
| 4,999,806 A | 3/1991 | Chernow et al. | | 5,285,494 A | 2/1994 | Sprecher et al. |
| 5,001,752 A | 3/1991 | Fischer | | 5,287,407 A | 2/1994 | Holmes |
| 5,005,122 A | 4/1991 | Griffin et al. | | 5,291,598 A | 3/1994 | Grundy |
| 5,005,200 A | 4/1991 | Fischer | | 5,301,231 A | 4/1994 | Abraham et al. |
| 5,010,571 A | 4/1991 | Katznelson | | 5,301,326 A | 4/1994 | Linnett et al. |
| 5,014,234 A | 5/1991 | Edwards, Jr. | | 5,311,591 A | 5/1994 | Fischer |
| 5,022,080 A | 6/1991 | Durst et al. | | 5,319,705 A | 6/1994 | Halter et al. |
| 5,023,907 A | 6/1991 | Johnson et al. | | 5,319,735 A | 6/1994 | Preuss et al. |
| 5,027,397 A | 6/1991 | Double et al. | | 5,319,785 A | 6/1994 | Thaller |
| 5,032,979 A | 7/1991 | Hecht et al. | | 5,325,524 A | 6/1994 | Black et al. |
| 5,047,928 A | 9/1991 | Wiedemer | | 5,335,169 A | 8/1994 | Cheng |
| 5,048,085 A | 9/1991 | Abraham et al. | | 5,335,346 A | 8/1994 | Fabbio |
| 5,050,213 A | 9/1991 | Shear | | 5,337,357 A | 8/1994 | Chou et al. |
| 5,058,162 A | 10/1991 | Santon et al. | | 5,337,360 A | 8/1994 | Fischer |
| 5,065,429 A | 11/1991 | Lang | | 5,341,429 A | 8/1994 | Stringer et al. |
| 5,079,648 A | 1/1992 | Maufe | | 5,343,526 A | 8/1994 | Lassers |
| 5,091,966 A | 2/1992 | Bloomberg et al. | | 5,343,527 A | 8/1994 | Moore et al. |
| 5,103,392 A | 4/1992 | Mori | | 5,347,579 A | 9/1994 | Blandford |
| 5,103,476 A | 4/1992 | Waite et al. | | 5,349,642 A | 9/1994 | Kingdon |
| 5,109,413 A | 4/1992 | Comerford et al. | | 5,351,293 A | 9/1994 | Michener et al. |
| 5,111,390 A | 5/1992 | Ketcham | | 5,355,474 A | 10/1994 | Thuraisngham et al. |
| 5,113,518 A | 5/1992 | Durst, Jr. et al. | | 5,359,721 A | 10/1994 | Kempf et al. |
| 5,119,493 A | 6/1992 | Janis et al. | | 5,361,359 A | 11/1994 | Tajalli et al. |
| 5,126,936 A | 6/1992 | Champion et al. | | 5,365,587 A | 11/1994 | Campbell et al. |
| 5,128,525 A | 7/1992 | Stearns et al. | | 5,367,621 A | 11/1994 | Cohen et al. |
| 5,129,084 A | 7/1992 | Kelly, Jr. et al. | | 5,369,702 A | 11/1994 | Shanton |
| 5,136,643 A | 8/1992 | Fischer | | 5,369,707 A | 11/1994 | Follendore, III |
| 5,136,646 A | 8/1992 | Haber et al. | | 5,371,792 A | 12/1994 | Asai et al. |
| 5,136,647 A | 8/1992 | Haber et al. | | 5,373,440 A | 12/1994 | Cohen et al. |
| 5,136,716 A | 8/1992 | Harvey et al. | | 5,373,561 A | 12/1994 | Haber et al. |
| 5,138,712 A | 8/1992 | Corbin | | 5,383,113 A | 1/1995 | Kight et al. |
| 5,146,575 A | 9/1992 | Nolan | | 5,388,211 A | 2/1995 | Hornbuckle |
| 5,148,481 A | 9/1992 | Abraham et al. | | 5,390,247 A | 2/1995 | Fischer |
| 5,150,407 A | 9/1992 | Chan | | 5,390,297 A | 2/1995 | Barber et al. |
| 5,155,680 A | 10/1992 | Wiedemer | | 5,390,330 A | 2/1995 | Talati |
| 5,163,091 A | 11/1992 | Graziano | | 5,392,220 A | 2/1995 | Van den Hamer et al. |
| 5,164,988 A | 11/1992 | Matyas et al. | | 5,392,390 A | 2/1995 | Crozier |
| 5,168,147 A | 12/1992 | Bloomberg | | 5,394,469 A | 2/1995 | Nagel et al. |
| 5,185,717 A | 2/1993 | Mori | | 5,410,598 A | 4/1995 | Shear |
| 5,187,787 A | 2/1993 | Skeen et al. | | 5,412,717 A | 5/1995 | Fischer |
| 5,191,573 A | 3/1993 | Hair | | 5,418,713 A | 5/1995 | Allen |
| 5,199,066 A | 3/1993 | Logan | | 5,420,927 A | 5/1995 | Michali |
| 5,199,074 A | 3/1993 | Thor | | 5,421,006 A | 5/1995 | Jablon |
| 5,201,046 A | 4/1993 | Goldberg et al. | | 5,422,953 A | 6/1995 | Fischer |
| 5,201,047 A | 4/1993 | Maki et al. | | 5,428,606 A | 6/1995 | Moskowitz |
| 5,204,897 A | 4/1993 | Wyman | | 5,432,851 A | 7/1995 | Scheidt et al. |
| 5,206,951 A | 4/1993 | Khoyi et al. | | 5,432,928 A | 7/1995 | Sherman |
| 5,208,748 A | 5/1993 | Flores et al. | | 5,432,950 A | 7/1995 | Sibigtroth |
| 5,214,702 A | 5/1993 | Fischer | | 5,438,508 A | 8/1995 | Wyman |
| 5,216,603 A | 6/1993 | Flores et al. | | 5,440,634 A | 8/1995 | Jones et al. |
| 5,218,605 A | 6/1993 | Low et al. | | 5,442,645 A | 8/1995 | Ugon |
| 5,218,606 A | 6/1993 | Eguchi et al. | | 5,444,779 A | 8/1995 | Daniele |
| 5,221,833 A | 6/1993 | Hecht | | 5,449,895 A | 9/1995 | Hecht et al. |
| 5,222,134 A | 6/1993 | Waite et al. | | 5,449,896 A | 9/1995 | Hecht et al. |
| 5,224,160 A | 6/1993 | Paulini et al. | | 5,450,490 A | 9/1995 | Jensen et al. |
| 5,224,163 A | 6/1993 | Gasser et al. | | 5,450,493 A | 9/1995 | Maher |
| 5,227,797 A | 7/1993 | Murphy | | 5,453,601 A | 9/1995 | Rosen |
| 5,235,642 A | 8/1993 | Wobber et al. | | 5,453,605 A | 9/1995 | Hecht et al. |
| 5,241,671 A | 8/1993 | Reed et al. | | 5,455,407 A | 10/1995 | Rosen |

| Patent Number | Date | Inventor |
|---|---|---|
| 5,455,861 A | 10/1995 | Faucher et al. |
| 5,455,953 A | 10/1995 | Russell |
| 5,457,746 A | 10/1995 | Dolphin |
| 5,457,747 A | 10/1995 | Drexler et al. |
| 5,458,494 A | 10/1995 | Krohn et al. |
| 5,463,565 A | 10/1995 | Cookson et al. |
| 5,473,687 A | 12/1995 | Lipscomb et al. |
| 5,473,692 A | 12/1995 | Davis |
| 5,479,509 A | 12/1995 | Ugon |
| 5,485,622 A | 1/1996 | Yamaki |
| 5,490,216 A | 2/1996 | Richardson, III |
| 5,491,800 A | 2/1996 | Goldsmith et al. |
| 5,497,479 A | 3/1996 | Hornbuckle |
| 5,497,491 A | 3/1996 | Mitchell et al. |
| 5,499,298 A | 3/1996 | Narasimhalu et al. |
| 5,504,757 A | 4/1996 | Cook et al. |
| 5,504,818 A | 4/1996 | Okano |
| 5,504,837 A | 4/1996 | Griffeth et al. |
| 5,508,913 A | 4/1996 | Yamamoto et al. |
| 5,509,070 A | 4/1996 | Schull |
| 5,513,261 A | 4/1996 | Maher |
| 5,517,518 A | 5/1996 | Morson et al. |
| 5,524,933 A | 6/1996 | Kunt et al. |
| 5,530,235 A | 6/1996 | Stefik et al. |
| 5,530,752 A | 6/1996 | Rubin |
| 5,533,123 A | 7/1996 | Force et al. |
| 5,534,855 A | 7/1996 | Shockley et al. |
| 5,534,975 A | 7/1996 | Stefik et al. |
| 5,535,322 A | 7/1996 | Hecht |
| 5,537,526 A | 7/1996 | Anderson et al. |
| 5,539,735 A | 7/1996 | Moskowitz |
| 5,539,828 A | 7/1996 | Davis |
| 5,550,971 A | 8/1996 | Brunner et al. |
| 5,553,282 A | 9/1996 | Parrish et al. |
| 5,557,518 A | 9/1996 | Rosen |
| 5,557,798 A | 9/1996 | Skeen et al. |
| 5,563,946 A | 10/1996 | Cooper et al. |
| 5,568,552 A | 10/1996 | Davis |
| 5,572,673 A | 11/1996 | Shurts |
| 5,574,962 A | 11/1996 | Fardeau et al. |
| 5,577,209 A | 11/1996 | Boyle et al. |
| 5,581,800 A | 12/1996 | Fardeau et al. |
| 5,592,549 A | 1/1997 | Nagel et al. |
| 5,603,031 A | 2/1997 | White et al. ............... 395/683 |
| 5,606,609 A | 2/1997 | Houser et al. |
| 5,613,004 A | 3/1997 | Cooperman et al. |
| 5,621,797 A | 4/1997 | Rosen |
| 5,625,693 A | 4/1997 | Rohatgi et al. |
| 5,629,770 A | 5/1997 | Brassil et al. |
| 5,629,980 A | 5/1997 | Stefik et al. |
| 5,633,932 A | 5/1997 | Davis et al. |
| 5,634,012 A | 5/1997 | Stefik et al. |
| 5,636,276 A | 6/1997 | Brugger et al. |
| 5,636,292 A | 6/1997 | Rhoads |
| 5,638,443 A | 6/1997 | Stefik |
| 5,638,504 A | 6/1997 | Scott et al. |
| 5,640,546 A | 6/1997 | Gopinath et al. |
| 5,649,099 A | 7/1997 | Theimer et al. |
| 5,655,077 A | 8/1997 | Jones et al. |
| 5,671,279 A | 9/1997 | Elgamal |
| 5,678,170 A | 10/1997 | Grube et al. |
| 5,687,236 A | 11/1997 | Moskowitz et al. |
| 5,689,565 A | 11/1997 | Spies et al. |
| 5,689,566 A | 11/1997 | Nguyen |
| 5,689,587 A | 11/1997 | Bender et al. |
| 5,692,047 A * | 11/1997 | McManis ............... 713/167 |
| 5,692,180 A | 11/1997 | Lee |
| 5,699,427 A | 12/1997 | Chow et al. |
| 5,710,834 A | 1/1998 | Rhoads |
| 5,715,314 A | 2/1998 | Payne et al. |
| 5,715,403 A | 2/1998 | Stefik |
| 5,717,923 A | 2/1998 | Dedrick |
| 5,721,788 A | 2/1998 | Powell et al. |
| 5,724,424 A | 3/1998 | Gifford |
| 5,724,425 A | 3/1998 | Chang |
| 5,732,398 A | 3/1998 | Tagawa |
| 5,740,549 A | 4/1998 | Reilly et al. |
| 5,745,569 A | 4/1998 | Moskowitz et al. |
| 5,745,604 A | 4/1998 | Rhoads |
| 5,745,678 A | 4/1998 | Herzberg et al. |
| 5,748,763 A | 5/1998 | Rhoads |
| 5,748,783 A | 5/1998 | Rhoads |
| 5,748,960 A | 5/1998 | Fischer |
| 5,754,849 A | 5/1998 | Dyer et al. |
| 5,757,914 A | 5/1998 | McManis |
| 5,757,915 A | 5/1998 | Aucsmith |
| 5,758,152 A | 5/1998 | LeTourneau |
| 5,765,152 A | 6/1998 | Erickson |
| 5,768,426 A | 6/1998 | Rhoads |
| 5,774,872 A | 6/1998 | Golden et al. |
| 5,787,334 A | 7/1998 | Fardeau et al. |
| 5,802,590 A | 9/1998 | Draves |
| 5,819,263 A | 10/1998 | Bromley et al. |
| 5,842,173 A | 11/1998 | Strum et al. |
| 5,845,281 A | 12/1998 | Benson et al. |
| 5,892,899 A | 4/1999 | Aucsmith et al. |
| 5,892,900 A | 4/1999 | Ginter et al. |
| 5,896,454 A | 4/1999 | Cookson et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,940,504 A | 8/1999 | Griswold |
| 5,940,505 A | 8/1999 | Kanamaru |
| 5,943,422 A | 8/1999 | Van Wie et al. |
| 5,949,876 A | 9/1999 | Ginter et al. |
| 5,956,408 A | 9/1999 | Arnold |
| 5,966,440 A | 10/1999 | Hair |
| 5,978,484 A | 11/1999 | Apperson et al. |
| 5,982,891 A | 11/1999 | Ginter et al. |
| 5,999,949 A | 12/1999 | Crandall |
| 6,009,170 A | 12/1999 | Sako et al. |
| 6,016,393 A | 1/2000 | White et al. ............... 395/683 |
| 6,102,965 A | 8/2000 | Dye et al. |
| 6,112,181 A | 8/2000 | Shear et al. |
| 6,135,646 A | 10/2000 | Kahn et al. |
| 6,138,119 A | 10/2000 | Hall et al. |
| 6,157,721 A | 12/2000 | Shear et al. |
| 6,185,683 B1 | 2/2001 | Ginter et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,292,569 B1 | 9/2001 | Shear et al. |
| 6,363,488 B1 | 3/2002 | Ginter et al. |
| 6,389,402 B1 | 5/2002 | Ginter et al. |
| 6,427,140 B1 | 7/2002 | Ginter et al. |
| 6,449,367 B1 | 9/2002 | Van Wie et al. |
| 6,618,484 B1 | 9/2003 | Van Wie et al. |
| 6,640,304 B1 | 10/2003 | Ginter et al. |
| 6,658,568 B1 | 12/2003 | Ginter et al. |
| 6,668,325 B1 | 12/2003 | Collberg et al. |

FOREIGN PATENT DOCUMENTS

| | | |
|---|---|---|
| AU | 65011/96 | 3/1997 |
| AU | 717615 | 6/1997 |
| AU | A-36815/97 | 2/1998 |
| AU | A-36816/97 | 2/1998 |
| AU | A-36840/97 | 2/1998 |
| BE | 9 004 79 | 12/1984 |
| BE | 62-241061 | 12/1984 |
| DE | 29 43 436 A1 | 10/1979 |
| DE | 3803982 A1 | 1/1990 |
| EP | 0 084 441 A1 | 7/1983 |
| EP | 0 128 672 A1 | 12/1984 |
| EP | 0 135 422 A1 | 3/1985 |

| | | |
|---|---|---|
| EP | 0 180 460 A1 | 5/1986 |
| EP | 0 370 146 A1 | 11/1988 |
| EP | 0 367 700 A2 | 5/1990 |
| EP | 0 398 645 | 11/1990 |
| EP | 0 399 822 A2 | 11/1990 |
| EP | 0 421 409 A2 | 4/1991 |
| EP | 0 456 386 A2 | 11/1991 |
| EP | 0 469 864 A2 | 2/1992 |
| EP | 0 469 864 A3 | 2/1992 |
| EP | 0 565 314 A2 | 10/1993 |
| EP | 0 567 800 A1 | 11/1993 |
| EP | 0 570 123 | 11/1993 |
| EP | 0 593 305 A2 | 4/1994 |
| EP | 0 651 554 A1 | 5/1995 |
| EP | 0 653 695 A2 | 5/1995 |
| EP | 0 668 695 A2 | 8/1995 |
| EP | 0 668 695 A3 | 8/1995 |
| EP | 0 695 985 A1 | 2/1996 |
| EP | 0 714 204 A2 | 5/1996 |
| EP | 0 715 243 A1 | 6/1996 |
| EP | 0 715 244 A1 | 6/1996 |
| EP | 0 715 245 A1 | 6/1996 |
| EP | 0 715 246 A1 | 6/1996 |
| EP | 0 715 247 A1 | 6/1996 |
| EP | 0715243 A1 | 6/1996 |
| EP | 0715244 A1 | 6/1996 |
| EP | 0715245 A1 | 6/1996 |
| EP | 0715246 A1 | 6/1996 |
| EP | 0715247 A1 | 6/1996 |
| EP | 0 725 376 A2 | 8/1996 |
| EP | 0 763 936 A2 | 9/1996 |
| EP | 0 749 081 A1 | 12/1996 |
| EP | 0 778 513 A2 | 6/1997 |
| EP | 0 795 873 A2 | 9/1997 |
| EP | 0 800 312 A1 | 10/1997 |
| EP | 0 913 757 A2 | 5/1999 |
| GB | A2136175 | 9/1984 |
| GB | 2264796 A | 9/1993 |
| GB | 2294348 | 4/1996 |
| GB | 2295947 | 6/1996 |
| JP | 57-726 | 5/1982 |
| JP | 61 121145 A | 6/1986 |
| JP | 62-225059 | 8/1987 |
| JP | 62-241061 | 10/1987 |
| JP | 63 129564 A | 6/1988 |
| JP | 63 289646 A | 11/1988 |
| JP | 01-068835 | 3/1989 |
| JP | 01 68853 A | 3/1989 |
| JP | 64-68835 | 3/1989 |
| JP | 01 248891 A | 10/1989 |
| JP | 01 296363 A | 11/1989 |
| JP | 02-242352 | 9/1990 |
| JP | 02-247763 | 10/1990 |
| JP | 02-294855 | 12/1990 |
| JP | 04 117548 A | 4/1992 |
| JP | 04 504794 | 8/1992 |
| JP | 04-369068 | 12/1992 |
| JP | 05 173892 A | 7/1993 |
| JP | 05-181734 | 7/1993 |
| JP | 05-257783 | 10/1993 |
| JP | 05 258463 A | 10/1993 |
| JP | 05-268415 | 10/1993 |
| JP | 06 501120 | 1/1994 |
| JP | 06 152585 A | 5/1994 |
| JP | 06 161719 A | 6/1994 |
| JP | 06-175794 | 6/1994 |
| JP | 06-215010 | 8/1994 |
| JP | 06-225059 | 8/1994 |
| JP | 06 250924 | 9/1994 |
| JP | 07-056794 | 3/1995 |
| JP | 07-084852 | 3/1995 |
| JP | 07-141138 | 6/1995 |
| JP | 07-200317 | 8/1995 |
| JP | 07-200492 | 8/1995 |
| JP | 07-244639 | 9/1995 |
| JP | 07 319681 A | 12/1995 |
| JP | 0 696 798 A1 | 2/1996 |
| JP | 08-137795 | 5/1996 |
| JP | 08-152990 | 6/1996 |
| JP | 08-125292 | 7/1996 |
| JP | 08-185292 | 7/1996 |
| JP | 08-185298 | 7/1996 |
| WO | WO 85/02310 | 5/1985 |
| WO | WO 85/03584 | 8/1985 |
| WO | WO 90/02382 | 3/1990 |
| WO | WO 92/06438 | 4/1992 |
| WO | WO 92/22870 | 12/1992 |
| WO | WO 93/01550 | 1/1993 |
| WO | WO 94/01821 | 1/1994 |
| WO | WO 94/03859 | 2/1994 |
| WO | WO 94/06103 | 3/1994 |
| WO | WO 94/16395 | 7/1994 |
| WO | WO 94/18620 | 8/1994 |
| WO | WO 94/22266 | 9/1994 |
| WO | WO 94/27406 | 11/1994 |
| WO | WO 95/14289 | 5/1995 |
| WO | WO 96/00963 | 1/1996 |
| WO | WO 96/03835 | 2/1996 |
| WO | WO 96/05698 | 2/1996 |
| WO | WO 96/06503 | 2/1996 |
| WO | WO 96/13013 | 5/1996 |
| WO | WO 96/21192 | 7/1996 |
| WO | WO 96/24092 | 8/1996 |
| WO | WO 96/27155 | 9/1996 |
| WO | WO 97/03423 | 1/1997 |
| WO | WO 97/07656 | 3/1997 |
| WO | WO 97/25816 | 7/1997 |
| WO | WO 97/32251 | 9/1997 |
| WO | WO 97/43761 | 11/1997 |
| WO | WO 97/48203 | 12/1997 |
| WO | WO 98/09209 | 3/1998 |
| WO | WO 98/10381 | 3/1998 |
| WO | WO 98/37481 | 8/1998 |
| WO | WO 98/45768 | 10/1998 |
| WO | WO 99/01815 | 1/1999 |
| WO | WO 99/24928 | 5/1999 |
| WO | WO 99/48296 | 9/1999 |

OTHER PUBLICATIONS

Claude Baggett, *Cable's Emerging Role in the Information Superhighway*, Cable Labs, undated, 13 slides.

Theodore Sedgwick Barassi, Document from Internet: *Th Cybernotary: Public Key Registration and Certification and Authentication of International Legal Transactions*, undated, 4 pages.

Hugh Barnes, memo to Henry LaMuth, subject: George Gilder articles, May 31, 1994, 2 pages.

*Comments in the Matter of Public Hearing and Request for Comments on the International Aspects of the National Information Infrastructure*, Before the Department of Commerce, Aug. 12, 1994, pp. 1-15 (comments of Dan Bart).

Michael Baum, "*Worldwide Electronic Commerce: Law, Policy and Controls Conference,*" Nov. 11, 1993, 18 pages.

Robert M. Best, *Preventing Software Piracy With Crypto-Microprocessors*, Digest of Papers, VLSI: New Architectural Horizons, Feb. 1980, pp. 466-469.

Richard L. Bisbey, II and Gerald J. Popek, *Encapsulation: An Approach to Operating System Security*, (USC/Information Science Institute, Marina Del Rey, CA), Oct. 1973, pp. 666-675.

Rolf Blom, Robert Forchheimer, et al., *Encryption Methods in Data Networks*, Ericsson Technics, No. 2, Stockholm, Sweden, 1978.

Rick E. Bruner, Document from the Internet: *Power Agent, NetBot help advertisers reach Internet shoppers*, Aug. 1997, 3 pages.

Denise Caruso, *Technology, Digital Commerce: 2 plans for watermarks, which can bind proof of authorship to electronic works*, N.Y. Times, Aug. 7, 1995, p. D5.

A. K. Choudhury, N.F. Maxemchuck, et al., *Copyright Protection for Electronic Publishing Over Computer Networks*, (AT&T Bell Laboratories, Murray Hill, N.J.) Jun. 1994, 17 pages.

Tim Clark, *Ad service gives cash back*, Document from the Internet: www.news.com/News/Item/0,4,13050,00.html (visited Aug. 4, 1997), 2 pages.

Frederick B. Cohen, *Operating System Protection Through Program Evolution*, 8246 Computers & Security, No. 6, (Oxford, Great Britain) Oct. 1993, pp. 565-584.

Donna Cunningham, David Arneke, et al., Document from the Internet: *AT&T, VLSI Technology join to improve info highway security*, (News Release) Jan. 31, 1995, 3 pages.

Lorcan Dempsey and Stuart Weibel, *The Warwick Metadata Workshop: A Framework for the Deployment of Resource Description*, D-Lib Magazine, Jul. 15, 1996.

Dorothy E. Denning and Peter J. Denning, *Data Security*, 11 Computing Surveys No. 3, Sep. 1979, pp. 227-249.

Whitfield Diffie and Martin E. Hellman, *New Directions in Cryptography*, IEEE Transactions on Information Theory, vol. 22, No. 6, Nov. 1976, pp. 644-651.

Whitfield Diffie and Martin E. Hellman, *Privacy and Authentication: An Introduction to Cryptography*, Proceedings of the IEEE, vol. 67, No. 3, Mar. 1979, pp. 397-427.

Stephen R. Dussee and Burton S. Kaliski, *A Cryptographic Library for the Motorola 56000*, Advances in Cryptology-Proceedings of Eurocrypt 90, (I.M. Damgard, ed., Springer-Verlag) 1991, pp. 230-244.

Esther Dyson, *Intellectual Value*, WIRED Magazine, Jul. 1995, pp. 136-141 and 182-183.

*Science, space and technology, Hearing before Subcomm. On Technology, Environment, and Aviation*, May 26, 1994 (testimony of D. Linda Garcia).

James Gleick, *Dead as a Dollar*, The New York Times Magazine, Jun. 16, 1996, Sect. 6, pp. 26-30, 35, 42, 50, 54.

Fred Greguras, Document from Internet: *Softic Symposium '95, Copyright Clearances and Moral Rights*, Dec. 11, 1995, 3 pages.

Louis C. Guillou, *Smart Cards and Conditional Access*, Advances in Cryptography—Proceedings of EuroCrypt 84 (T. Beth et al, Ed., Springer-Veriag, 1985) pp. 480-490.

Harry H. Harman, *Modern Factor Analysis*, Third Edition Revised, University of Chicago Press, Chicago and London, 1976.

Amir Herzberg and Shlomit S. Pinter, *Public Protection of Software*, ACM Transactions on Computer Systems, vol. 5, No. 4, Nov. 1987, pp. 371-393.

Jud Hofmann, *Interfacing the NII to User Homes*, (Consumer Electronic Bus. Committee) NIST, Jul. 1994, 12 slides.

Jud Hofmann, *Interfacing the NII to User Homes, Electronic Industries Association*, (Consumer Electronic Bus Committee) undated, 14 slides.

Stannie Holt, Document from the Internet: *Start-up promises user confidentiality in Web marketing service*, InfoWorld Electric News (updated Aug. 13, 1997).

Jay J. Jiang and David W. Conrath, *A Concept-based Approach to Retrieval from an Electronic Industrial Directory*, International Journal of Electronic Commerce, vol. 1, No. 1 (Fall 1996) pp. 51-72.

Debra Jones, Document from the Internet: *Top Tech Stories, PowerAgent Introduces First Internet 'Informediary' to Empower and Protect Consumers*, (updated Aug. 13, 1997) 3 pages.

Kevin Kelly, *E-Money*, Whole earth Review, Summer 1993, pp. 40-59.

Stephen Thomas Kent, *Protecting Externally Supplied Software in Small Computers*, (MIT/LCS/TR-255) Sep. 1980 254 pages.

David M. Kristol, Steven H. Low and Nicholas F. Maxemchuk, *Anonymous Internet Mercantile Protocol*, (AT&T Bell Laboratories, Murray Hill, NJ) Draft: Mar. 17, 1994.

Carl Lagoze, *The Warwick Framework, A Container Architecture for Diverse Sets of Metadata*, D-Lib Magazine, Jul./Aug. 1996.

Mika Lanza, e-mail, *George Gilder's Fifth Article-Digital Darkhorse—Newspapers*, Feb. 21, 1994.

Steven Levy, *E-Money, That's What I Want*, WIRED, Dec. 1994, 10 pages.

Steven H. Low and Nicholas F. Maxemchuk, *Anonymous Credit Cards*, AT&T Bell Laboratories, Proceedings of the 2nd ACM Conference on Computer and Communication Security, Fairfax, VA, Nov. 2-4, 1994, 10 pages.

Steven H. Low, Nicholas F. Maxemchuk, and Sanjoy Paul, *Anonymous Credit Cards and its Collusion Analysis* (AT&T Bell Laboratories, Murray hill, N.J.) Oct. 10, 1994, 18 pages.

S.H. Low, N.F. Maxemchuk, et al., *Document Marking and Identification using both Line and word Shifting* (AT&T Bell Laboratories, Murray Hill, N.J.) Jul. 29, 1994, 22 pages.

Malcolm Maclachlan, Document from the Internet: *PowerAgent Debuts Spam-Free Marketing*, TechWire, Aug. 13, 1997, 3 pages.

N.F. Maxemchuk, *Electronic Document Distribution*, (AT&T Bell Laboratories, Murray Hill, N.J.) undated.

Eric Milbrandt, Document from the Internet: *Steganography Info and Archive*, 1996, 2 pages.

Ryoichi Mori and Masaji Kawahara, *Superdistribution: The Concept and the Architecture*, The Transactons of the EIEICE, V, E73, No. 7, Tokyo, Japan, Jul. 1990.

Walter S. Mossberg, *Personal Technology, Threats to Privacy On-Line Become More Worrisome*, The Wall Street Journal, Oct. 24, 1996.

Nicholas Negroponte, *Some Thoughts on Likely and Expected Communications Scenaries: A Rebuttal*, Telecommunications, Jan. 1993, pp. 41-42.

Nicholas Negroponte, *Electric Word of Mouth*, WIRED, Oct. 1996, p. 218.

Peter G. Neumann, Robert S. Boyer, et al., *A Provably Secure Operating System: The System, Its Applications, and Proofs*, Computer Science Laboratory Report CSL-116, Second Edition, SRI International, Jun. 1980.

Joseph n. Pelton (Dr.), *Why Nicholas Negroponte is Wrong About the Future of Telecommunications*, Telecommunications, Jan. 1993, pp. 35-40.

Gordon Rankine (Dr.), *Thomas—A Complete Single-Chip RSA Device*, Advances in Cryptography, Proceedings of CRYPTO 86, (A.M. Odiyzko Ed., Springer-Verlag) 1987, pp. 480-487.

Arthur K. Reilly, *Input to the 'International Telecommunications Hearings,' Panel 1: Component Technologies of the NII/GII*, Standards Committee T1-Telecommunications undated.

Paul Resnick and Hal R. Varion, *Recommender Systems*, Communications of the ACM, vol. 40, No. 3, Mar. 1997, pp. 56-89.

Lance Rose, *Cyberspace and the Legal Matrix: Laws or Confusion?*, 1991.

Steve Rosenthal, *Interactive Network: Viewers Get Involved*, New Media, Dec. 1992, pp. 30-31.

Steve Rosenthal, *Interactive TV: The Gold Rush is on*, New Media, Dec. 1992, pp. 27-29.

Steve Rosenthal, *Mega Channels*, New Media, Sep. 1993, pp. 36-46.

Edward Rothstein, *Technology Connections, Making the Internet come to you through 'push' technology*, N.Y. Times, Jan. 20, 1997, p. D5.

Ken Rutkowski, Document form Internet: *PowerAgent Introduces First Internet 'Informediary' to Empower and Protect Consumers*, Tech Talk News Story, Aug. 4, 1997, 1 page.

Ira Sager (Edited by), *Bits & Bytes*, Business Week, Sep. 23, 1996, p. 142E.

Schlosstein, Steven, *America: The G7's Comeback Kid*, International Economy, Jun./Jul. 1993, 5 pages.

Ingrid Scnaumueller-Bichl and Ernst Piller, *A method of Software Protection Based on the Use of Smart Cards and Cryptographic Techniques*, undated, 9 pages.

Jurgen Schumann, *Pattern Classification, a Unified View of Statistical and Neural Approaches*, John Wiley & Sons, Inc., 1996.

Victor Shear, *Solutions for CD-ROM Pricing and Data Security Problems*, CD ROM Yearbook 1988-1989 (Microsoft Press 1988 or 1989) pp. 530-533.

Olin Sibert et al., *DigiBox: A Self-Protecting Container for Information Commerce*, Proceedings of the First USENIX Workshop on Electronic Commerce, New York, NY, Jul. 1995, 9 pages.

Olin Sibert et al., *Securing the Content, Not the Wire, for Information Commerce*, InterTrust Technologies Corporation, 1996, 12 pages.
Karl Siuda, *Security Services in Telecommunications Networks*, Seminar: Mapping New Applications Onto New Technologies, edited by B. Plattner and P. Gunzburger; Zurich, Mar. 8-10, 1988, pp. 45-52, XP000215989.
Sean Smith and J.D. Tygar, *Signed Vector Timestamps: A Secure Protocol for Partial Order Time*, CMU-93-116, School of Computer Science Carnegie Mellon University, Pittsburgh, Pennsylvania, Oct. 1991; version of Feb. 1993, 15 pages.
Mark Stefik, *Letting Loose the Light: Igniting Commerce in Electronic Publication*, (Xerox PARC, Palo Alto, CA) 1994-1995, 35 pages.
Mark Stefik, *Letting Loose the Light: Igniting Commerce in Electronic Publication*, Internet Dreams: Archetypes, Myths. and Metaphors. Massachusetts Institute of Technology, 1996, pp. 219-253.
Mark Stefik, *Chapter 7, Classification*, Introduction to Knowledge Systems (Morgan Kaufmann Publishers, Inc., 1995) pp. 543-607.
Tom Stephenson, *The Info Infrastructure Initiative: Data Super Highways and You*, Advanced Imaging, May 1993, pp. 73-74.
Bruce Sterling, *Literary freeware: Not for Commercial Use*, remarks at Computers, Freedom and Private Conference IV, Chicago, IL, Mar. 26, 1994.
Bruno Struif, *the Use of Chipcards for Electronic Signatures and Encryption*, Proceedings for the 1989 Conference on VSLI and Computer Peripherals, IEEE Computer Society Press, 1989, pp. (4)155-(4)158.
J.D. Tygar and Bennet Yee, *Cryptography: It's Not Just for Electronic Mail Anymore*, CMU-CS-93-107, School of Computer Science Carnegie Mellon University, Pittsburgh, PA, Mar. 1, 1993, 21 pages.
J.D. Tygar and Bennet Yee, *Dyad: A System for Using Physically Secure Coprocessors*, School of Computer Science, Carnegie Mellon University, Pittsburgh, PA undated, 41 pages.
J. D. Tygar and Bennett Yee, *Dyad: A System for Using Physically Secure Coprocessors*, School of Computer Science, Carnegie Mellon University, Pittsburgh, PA, May 1991, 36 pages.
T. Valovic, *The Role of Computer Networking in the Emerging Virtual Marketplace*, Telecommunications, undated, pp. 40-44.
Joan Voight, *Beyond the Banner*, Wired, Dec. 1996, pp. 196, 200, 204.
Steven Vonder Haar, Document from the Internet: *PowerAgent Launches Commercial Service*, Interactive Week, Aug. 4, 1997, 1 page.
Robert Weber, *Metering Technologies for Digital Intellectual Property*, A Report to the International Federation of Reproduction Rights Organisations (Boston, MA), Oct. 1994, pp. 1-29.
Robert Weber, Document from the Internet: *Digital Rights Management Technologies*, Oct. 1995, 21 pages.
Robert Weber, *Digital Rights Management Technologies*, A Report to the International Federation of Reproduction Rights Organisations, Northeast Consulting Resources, Inc., Oct. 1995, 49 pages.
Adele Weder, *Life on the Infohighway*, INSITE, undated, pp. 23-25.
Steve H. Weingart, *Physical Security for the ABYSS System*, (IBM Thomas J. Watson Research Center, Yorktown Heights, NY), 1987, pp. 52-58.
Daniel J. Weitzner, *A Statement on EFF's Open Platform Campaign as of* Nov. 1993, 3 pages.
Steve R. White, *ABYSS: A Trusted Architecture for Software Protection*, (IBM Thomas J. Watson Research Center, Yorktown Heights, NY), 1987, pp. 38-50.
Bennet Yee, *Using Secure Coprocessors*, CMU-CS-94-149, School of Computer Science, Carnegie Mellon University, Pittsburgh, PA, 1994, 94 pages.
Frank Yellin, Document from the Internet: *Low Level Security in Java*, Sun Microsystems, 1996, 8 pages.
Symposium: *Applications Requirements for Innovative Video Programming: How to Foster (or Cripple) Program Development Opportunities for Interactive Video Programs Delivered on Optical Media: A Challenge for the Introduction of DVD (Digital Video Disc)* (Oct. 19-20, 1995, Sheraton Universal Hotel, Universal City CA).

*Argent Information, Q&A Sheet*, Document from the Internet: <http://www.digital-watermark.com/>, Copyright 1995, The DICE Company, (last modified Jun. 16, 1996), 7 pages.
*New Products, Systems and Services*, AT&T Technology, vol. 9, No. 4, undated, pp. 16-19.
*Cable Television and America's Telecommunications Infrastructure*, (National Cable Television Association, Washington, D.C.), Apr. 1993, 19 pages.
CD ROM: *Introducing . . . The Workflow CD-ROM Sampler* (Creative Networks, MCI Mail: Creative Networks, Inc.), undated.
*Codercard, Basic Coder Subsystem* (Interstate Electronics Corp., Anaheim, CA), undated 4 pages.
Collection of documents including: *Protecting Electronically Published Properties, Increasing Publishing Profits*, (Electronic Publishing Resources, Inc.,) Jan. 1993, 25 pages.
*Communications of the ACM*, vol. 39, No. 6, Jun. 1996, 130 pages.
*Communication of the ACM*, "Intelligent Agents," vol. 37, No. 7, Jul. 1994, 170 pages.
*Computer Systems Policy Project (CSSP), Perspectives on the National Information Infrastructure: Ensuring Interoperability*, Feb. 1994, 5 slides.
*DiscStore* (Electronic Publishing Resources, Chevy Chase, MD), 1991.
*DSP56000/DSP56001 Digital Signal Processor User's Manual*, (Motorola), 1990, p. 2-2.
A Supplement to Midrange Systems, Premenos Corp. White Paper: *The Future of Electronic Commerce, Document from Internet*: <webmaster@premenos.com>, Aug. 1995, 4 pages.
*CGI Common Gateway Interface*, Document from the Internet: cgi@ncsa.uiuc.edu, 1996, 1 page.
HotJava™: *The Security Story*, Document from the Internet: undated 4 pages.
*About the Digital Notary Service*, Document from the Internet: info@surety.com>, (Surety Technologies), 1994-5, 6 pages.
*Templar Overview: Premenos*, Document from the Internet: info@templar.net undated, 4 pages.
Templar Software and services, Secure, Reliable, Standards-Based EDI Over the Internet: Document from the Internet: info@templar.net. (premenos) undated, 1 page.
*JAVASOFT, Frequently Asked Questions-Applet Security*, Document from Internet: java@java.sun.com Jun. 7, 1996, 8 pages.
*News from The Document Company XEROX, Xerox Announces Software Kit for Creating 'Working Documents' with Dataglyphs* Document from Internet: Nov. 6, 1995, 13 pages.
Premenos Announces Templar 2.0—Next Generation Software for Secure Internet EDI, Document from Internet: <webmaster@templar.net>, Jan. 17, 1996, 1 page.
*WEPIN Store, Stenography (Hidden Writing)*. Document from the Internet: (Common Law), 1995, 1 page.
*Sag's durch die Blume*, Document from Internet: marit@schulung.netuse.de. (German), undated, 5 pages.
*A Publication of the Electronic Frontier Foundation*, EFFector Online vol. 6 No. 6., Dec. 6, 1993, 8 pages.
*EIA and TIA White Paper on National Information Infrastructure*, The Electronic Industries Association and the Telecommunications Industry Association, Washington, D.C., undated.
*Electronic Currency Requirements, XIWT* (Cross Industry Working Group), undated.
*Electronic Publishing Resources Inc. Protecting Electronically Published Properties Increasing Publishing Profits* (Electronic Publishing Resources, Chevy Chase, MD) 1991, 19 pages.
*What is Firefly?*, Document from the Internet: www.ffly.com, (Firefly Network, Inc.) Firefly revision: 41.4, (Copyright 1995, 1996), 1 page.
*First CII Honeywell Bull International Symposium on Computer Security and Confidentiality*, Conference Text, Jan. 26-28, 1981, pp. 1-21.
*Framework for National Information Infrastructure Services*, Draft, U.S. Department of Commerce, Jul. 1994.
*Framework for National Information Infrastructure Services*, NIST, Jul. 1994, 12 Slides.

*Intellectual Property and the National Information Infrastructure, a Preliminary Draft of the Report of the Working Group on Intellectual Property Rights*, Green paper, Jul. 1994, 141 pages.

*Multimedia Mixed Object Envelopes Supporting a Graduated Fee Scheme Via Encryption*, IBM Technical Disclosure Bulletin, vol. 37, No. 3, Mar. 1, 1994, pp. 413-417, XP000441522.

*Transformer Rules Strategy for Software Distribution Mechanism-Support Products*, IBM Technical Disclosure Bulletin, vol. 37, No. 48, Apr. 1994, pp. 523-525, XP000451335.

*IISP Break Out Session Report for Group No. 3, Standards Development and Tracking System*, undated.

*Information Infrastructure Standards Panel: NII "The Information Superhighway"*, NationsBank—HGDeal—ASC X9, undated, 15 pages.

*Invoice? What's an Invoice?*, Business week, Jun. 10, 1996, pp. 110-112.

*Micro Card* (Micro Card Technologies, Inc., Dallas, TX), undated, 4 pages.

*Background on the Administration's Telecommunications Policy Reform Initiative*, News Release, The White House, Office of the President, Jan. 11, 1994, 7 pages.

*NII, Architecture Requirements, XIWT*, undated.

Symposium: *Open System Environment Architectural Framework for National Information Infrastructure Services and Standards, in Support of National Class Distributed Systems*, Distributed System Engineering Program Sponsor Group, Draft 1.0, Aug. 5, 1994, 34 pages.

*Proper Use of Consumer Information on the Internet*, Document from the Internet, White Paper, (Power Agent Inc., Menlo Park, CA) Jun. 1997, 9 pages.

*What the Experts Are Reporting on PowerAgent*, Document from the Internet, PowerAgent Press Releases, Aug. 13, 1997, 6 pages.

*What the Experts are Reporting on PowerAgent*, Document from the Internet, PowerAgent Press Releases, Aug. 4, 1997, 5 pages.

*Portland Software's Ziplock*, Internet Information, Copyright Portland Software 1996-1997, 12 pages.

Press Release, National Semiconductor and EPR Partner for Information Metering/Data Security Cards (Mar. 4, 1994).

R01 (Personal Library Software, 1987 or 1988).

R01—Solving Critical Electronics Publishing Problems (Personal Library Software, 1987 or 1988).

*Serving the Community: A Public Interest Vision of the National Information Infrastructure*, Computer Professionals for Social Responsibility, Executive Summary undated.

Special Report, *The Internet: Fulfilling the Promise*: Lynch, Clifford, *The Internet Bringing Order from Chaos*: Resnick, Paul, *Search the Internet*, Hearst, Marti A., *Filtering Information on the Internet*; Stefik, Mark, *Interfaces for Searching the Web*; Scientific American, Mar. 1997, pp. 49-56, 62-67, 68-72, 78-81.

*The 1:1 Future of the Electronic Marketplace: Return to a Hunting and Gathering Society*, undated, 2 pages.

*The Benefits of RDI for database Protection and Usage Based Billing* (Personal Library Software, 1987 or 1988).

*The New Alexandria No. 1*, Alexandria Institute, Jul.-Aug. 1986, pp. 1-12.

*Is Advetising Really Dead?*, Wired 1.02, Part 2, 1994.

*How Can I Put an Access Counter on My Home Page?*, World Wide Web FAQ, 1996, 1 page.

XIWT Cross Industry Working Team, Jul. 1994, 5 pages.

A Brief History of the Green Project, viewed on Mar. 12, 2002 at <http://java.sun.com/people/jag/green/index.html> pp. 1-2.

A Guide to Understanding Security Modeling in Trusted Systems, National Security Agency, Oct. 1992, 122 pages.

A2b's Recent Press Coverage, 1998.

Abadi, M., et al., "A Calculus for Access Control in Distributed Systems", Digital Equipment Corporation, Feb. 28, 1991, revised Aug. 28, 1991.

Abrams, Marshall D, "Renewed Understanding of Access Control Policies", Proceedings of the 16th Computing Natioal Security Conference, 1993.

Access Control and Copyright Protection for Images Security Technology for Graphics and Communication Systems—RACE M1005: ACCOPI, webpage, Security Projects at Fraunhofer 1GD, 2002.

Achievements Archive, www.imprimatur.net/ web pages.

Aharonian, G., "Software Patents—Relative Comparison of EPO/PTO/JPO Software Searching Capabilities," Source Translation & Optimization.

An Introduction to Safety and Security in Telescript, undated, 8 pages.

Anderson, R., "Why Cryptosystems Fail," University Computer Laboratory, Cambridge, Massachusetts, undated, pp. 1-34.

Antonelli et al, "Access Control in a Workstation-Based Distributed Computing Environment," CITI Technical Report 90-2, Jul. 17, 1990.

Arms, W.Y., "Key Concepts in the Architecture of the Digital Library," D-Lib Magazine, Jul. 1995.

Atkins, D., et al., "The Magic Words are Squeamish Ossifrage," undated, 15 pages.

Atkinson, R., "Security Architecture for the Internet Protocol," Network Working Group RFC 1825, Aug. 1995.

Aucsmith, D., et al., "Common Data Security Architecture," Intel Architecture Lab, Presentation Material, Jan. 22, 1996, pp. 1-16.

Aucsmith, David, "Tamper Resistant Software: An Implementation", IAL.

Authentification dans les environnements de traitement distributes, Information Systems Audit and Control Association-Montreal Chapter, viewed on Mar. 25, 2002 at <http:www.apvcsi-montreal.ca/en/publications/contact133.html> pp. 1-15.

Avery, et al., "Recommender Systems for Evaluating Computer Messages," Communications of the ACM, Mar. 1997, pp. 88-89.

Baker, R.H., The Computer Security Handbook, Tab Books, Inc., 1985.

Balbanovic, et al., Content-based, Collaborative Recommendation, Communications of the ACM, Mar. 1997, pp. 66-72.

Bartock, P.F., et al., "Guide to Securing Microsoft Windows NT Networks," National Security Agency, Sep. 18, 2001, pp. 1-132.

Bellare, M., "iKP-A Family of Secure Electronic Payment Protocols," Apr. 16, 1995, pp. 1-19.

Bell-Labs Secure Technologies, "Information Vending Encryption System (IVES)™," Lucent Technologies, May 31, 2002, pp. 1-16.

Bellovin, S.M., "Encrypted Key Exchange: Password-Based Protocols Secure Against Dictionary Attacks," Proceedings of the IEEE Symposium on Research in Security and Privacy, Oakland, California, May 1992, 13 pages.

Bellovin, S.M., "There Be Dragons," AT&T Bell Laboratories, Aug. 15, 1992, 16 pages.

Bender et al. "Techniques for Data Hiding," IBM Systems Journal, vol. 35, Nos. 3&4, 1996.

Berghal et al., "Protecting Ownership Rights Through Digital Watermaking," IEEE Computing, vol. 29, No. 7, Jul. 1996.

Berkovitz, S. et al., "Authentication of Mobile Agents," Mobile Agents and Security, Springer-Verlag, Giovanni Vigna, Ed., 1998, pp. 114-136.

Berners-Lee, T.J., et al., "Networked Information Services: The World-Wide Web," Computer Networks and ISDN Systems, 1992, pp. 454-459.

Bernstein et al., "Copyrights, Distribution Chains, Integrity, and Privacy: The Need for a Standards-Based Solution," Electronic Publishing Resources.

Bertino, Elisa, "Data Hiding and Security in Object-Oriented Databases," Dipartimento di Matematica, Universita di Genova, IEEE, 1992, pp. 338-347.

Bickel, R., et al., "Guide to Securing Microsoft Windows XP," National Security Agency, Oct. 30, 2002, pp. 1-129.

Birrell, Andrew, D., et al., "A Global Authentication Service Without Global Trust," Proceedings of the IEEE Symposium on Security and Privacy, Oakland, California, Apr. 1986, pp. 1-11.

Bishop, M., "Anatomy of a Proactive Password Changer," Department of Mathematics and Computer Science, Dartmouth College, undated, 15 pages.

Bishop, M., "Privacy-Enhanced Electronic Mail," Privacy and Security research Group, IAB.

Blaze, M. et al., "Decentralized Trust Management," Proc. IEEE Conference on Security and Privacy, 1996, pp. 164-173.

Blaze, Matt, et al., "The Architecture and Implementation of Network Layer Security Under Unix", Columbia University and AT&T Bell Laboratories, 1994.

Boisson, Jean-Francois, "1-Business Perspectives and Requirements, 2-The CITED Project: Keys and Knowledge," CITED 5469.

Boisson, Jean-Francois, "How to CITEDise Application: Guidelines and Examples," CITED 5469.

Boisson, Jean-Francois, "Management of Intellectual Property Rights in the Electronic Commerce: Textile Design Sales and Other Similar Initiatives," EURITIS.

Boisson, Jean-Francois, "Software Components; Deliverable Trial Offer," CITED 5469.

Boly, J.P., et al., "The ESPRIT Project CAFÉ: High Security Digital Payment Systems," ESCORICS 94, European Symposium on Research Computer Security, Springer-Verlas Berlin, 1994, pp. 217-230.

Boone, J.V., et al., "The Start of Digital Revolution: SIGSALLY Secure Digital Voice Communications in World War II," Dec. 10, 2002.

Borenstein, N., "MIME Extensions for Mail-Enabled Applications: Application/Safe-Tel and Multipart/Enabled-Mail," Nov. 1993, 24 pages.

Born, E, et al., "Discretionary Access Control by Means of Usage Conditions," Computers & Security, vol. 13, No. 5, 1994, pp. 437-450.

Bos et al., "SmartCash: a Practical electronic payment System," Center for Mathematics and Computer Science, Report CS-R9035.

Brands, S., "Untraceable Off-line Cash in Wallets with Observers," CWI, undated, 17 pages.

Brassil et al., "Electronic Marking and Identification Techniques to Discourage Document Copying," AT&T Bell Laboratories, Proc. Infocom 94, 1994.

Breon, R., et al., "Microsoft Office 97 Executable Content Security Risks and Countermeasures," National Security Agency, Dec. 20, 1999, pp. 1-44.

Brickell, E.F., et al., "The SKIPJACK Algorithm," Jul. 28, 1993, pp. 1-7.

Brin, Sergey, et al., "Copy Detection Mechanism for Digital Documents", Stanford University.

Brockschmidt, Kraig, "A Primer on Designing Custom Controls," Microsoft Systems Journal, Mar./Apr. 1992, pp. 87-101.

Brockschmidt, Kraig, "Implementing OLE 2.0, Part III: Uniform Data Transfer with Data Objects," Microsoft Systems Journal, Dec. 1993, pp. 47-77.

Brockschmidt, Kraig, "Introducing OLE 2.0, Part 1: Windows Objects and the Component Object Model," Microsoft Systems Journal, Aug. 1993, pp. 15-23.

Brockschmidt, Kraig, "OLE 2.0 Part II: Implementing a Simple Windows Object Using Either C or C++," Microsoft Systems Journal, Oct. 1993, pp. 45-62.

Brockschmidt, Kraig, Inside OLE 2, Microsoft Press Programming Series, 1994.

Brown, C.W., "Security for Minicomputers and Microcomputers," undated, pp. 285-298.

Brown, Patrick W., "Digital Signatures: Can They Be Accepted as Legal Signatures in EDI?," 1st Conference on Computer and Communication Security, Nov. 1993, pp. 86-92.

Brumm, P., et al., 80386/80486 Assembly Language Programming, Windcrest/McGraw-Hill, 1993.

Brunnstein et al., "Intellectual Property Rights and new Technologies," Proceedings of the KnowRight '95 Conference, Aug. 1995.

Bureau Van Dijk, Gestion Des Contrats; 497C.C.C.E.: Cited (Suite), Feb. 1993.

Bureau Van Dijk, Management Report for Task 4.5: Feasibility Study of the Cited Agency, 1992-1993.

Bureau Van Dijk, CITED: Preparation of the CITED Model Functional Requirements Specifications; Discussion Paper (Revision 1), Jan. 16, 1991.

Bureau Van Dijk, CITED: Preparation of the CITED Model Functional Requirements Specifications; Reports of the Interviews with Five CITED Partners, (Partners: Sagem, Telesystemes, NTE, Elsevier, Oxford University Press), Apr. 5, 1991.

Byte.com, "Speaking the Same Language," May 1994, pp. 1-2.

Cabell, D., et al., "Software Protection," May 1985, pp. 35-37.

Calas, C., "Distributed File System Over a Multilevel Secure Architecture Problems and Solutions," Computer Security, ESCORICS 94, Brighton, United Kingdom, Nov. 7-9, 1994, pp. 281-297.

CardTech/SecurTech 94 Conference Proceedings, "Building Foundations for Innovation," CardTech/SecurTech, Inc., Apr. 1994, 1,031 pages.

Case, J., "A Simple Network Management Protocol (SNMP)," Network Working Group, May 1990, pp. 1-21.

Chase, Chevy, M.D., "DiscStore", Electronic Publishing Resources, 1991.

Chaum, David L., "Privacy and Social Protection in Electronic Payment Systems," Chapter 12, The Future of Money in the Information Age.

Chaum, David L., "Smart Card 2000," Selected Papers from the Second International Smart Card 2000 Conference, Oct. 4-6, 1989.

Chaum, David L., "Untraceable Electronic Cash," Extended Abstract, Center for Mathematics and Computer Science, 1988, pp. 319-327.

Chaum, David L., et al., "Implementing Capability-Based Protection Using Encryption," College of Engineering, University of California, Berkeley, Jul. 17, 1978, 12 pages.

Chess, D., "Security Issues in Mobile Code Systems," Mobile Agents and Security, Springer-Verlag, Giovanni Vigna, Ed., 1998, 14 pages.

Chor et al., "Tracing Traitors," Crypto 94, 1994, p. 257.

Choy, D.M., et al., "A Digital Library System for Periodicals Distribution", May 1996.

Cine Jr. et al., "ABYSS: A Basic Yorktown Security System PC Software Asset Protection Concepts," IBM Research Report No. RC 12401, IBM Thomas J. Watson Research Center, Dec. 18, 1986.

CITED: Copyright in Transmitted Electronic Documents, Special Interest Group, CITED Meeting, Heathrow, Sep. 22, 1993.

CITED: Final Report: A Guide to CITED Documentation, ESPIRIT, Project 5469, ISBN 0-7123-2115-2, The CITED Consortium, Sep. 1994.

Clark, Paul C., et al., "BITS: A Smartcard Protected Operating System," Communications of the ACM, vol. 37, No. 11, Nov. 1994, pp. 66-70 & 94.

Clarke et al., "Cryptography Issues in Plain Text," Privacy Law and Policy Reporter, 1996.

Coad, Peter, "Object-Oriented Patterns," Communications of the ACM, vol. 35, No. 9, Sep. 1992, pp. 152-159.

Cohen, F.B., Protection and Security on the Information Superhighway, John Wiley & Sons, Inc., 1995.

Competitive Analysis AT&T/a2b music, Jun. 16, 1998.

Constructing a High Assurance Mail Guard, Secure Computing, 1994, pp. 1-10.

Cook, S., "Net Results," PC World, Dec. 1985, pp. 270-328.

Copyright Ownership Projection in Computer-Assisted Training, Copicat—8195, Esprit, Dec. 1993.

Copysmart—20517: "CITED Based Multi-media IPR Management on Cost Effective Smart Device," European Inforamtion Technology for Information Science, start date Dec. 1, 1995.

CopySmart (CSM) suit, European Information technology for Information Science.

Corbato. F.J., et al., "Introduction and Overview of the Multics System," viewed on Nov. 13, 2001 at <http://www.multicians.org/fjcc1.html> pp. 1-18.

Cornish, Graham, "Copyright Management of Document Supply in an Electronic Age," The CITED™ Solution, Interlending & Document Supply, vol. 21, No. 2, 1993, pp. 13-20.

Cousins, Steve B. et al., "InterPay: Managing Multiple Payment Mechanisms in Digital Libraries."

Coutrot, Francois, et al., "A Single FConditional Access System for Satellite-Cable and Terrestrial TV", IEEE Transactions on Consumer Electronics, vol. 35, No. 3, Aug. 1989.

Cox, B., "Superdistribution," Wired, Sep. 1994, 2 pages.

Cox, Benjamin et al., "NetBill Security and Transaction Protocol," Carnegie Mellon University.

CREANET—Creative Rights European Agency NETwork—Project Profile, Information Society Technologies, Feb. 18, 2000.

Crocker et al., "MIME Object Security Services," Network Working Group RFC 1848, Oct. 1995.

Cryptographic API Specification, Version 0.6, Microsoft, Mar. 1995.

Cryptolope Containers Technology: A White Paper, IBM InfoMarket Business Development Group.

Curry, D.A., UNIX System Security: A Guide for Users and System Administrators, Addison-Wesley Publishing Company, Inc., 1992.

Curry, David A., "Improving the Security of Your Unix System," Final Report Apr. 1990, pp. 1-74.

Custer, H., Inside the Windows NT File System, Microsoft Press, 1994.

Cybenko, G, et al., "Cognitive Hacking: A Battle for the Mind," Computer, Aug. 2002, 0018-9162/02ã2002 IEEE, pp. 50-56.

Data Network and Open System Communications, Directory: Information Technology—Open Systems Interconnection—The Directory: Overview of Concepts, Models, and Services, ITU-T Recommendation X.500, International Telecommunication Union, Nov. 1993.

Data Widgets 2.0: Programmer's Guide, Sheridan Software Systems, Inc., 1993-1995.

Date, C.J., "An Introduction to Database Systems," 4th. Ed., vol. 1, Addison-Wesley Publishing Company, 1987.

Davin, J., et al., "SNMP Administrative Model," Network Working Group, Jul. 1992, pp. 1-22.

Davis, D., et al., "Network Security via Private-Key Certificates," MIT Project Athena, undated, pp. 1-4.

DCE Technology at Work, Distributed Computing Environment, http://www.opengroup.org/tech/dce/tech/tech.htm, Nov. 7, 2000, pp. 1-3.

Deering, S.E., "Host Extensions for IP Multicasting," Network Working Group, RFC 1112, Aug. 1989.

Deliverable D3: Specification of the Infrastructure and Explanation of Trust and Confidence Building Solutions, Ver. 0.1, Telenet, Jul. 18, 2000.

Denning, A., OLE Controls Inside Out, Microsoft Press, 1995.

Denning, P.J., Computer Under Attack: Intruders, Worms, and Viruses, ACM Press, 1990.

Department of Defense Computer Security Center, "Department of Defense Password Management Guideline," Department of Defense Computer Security Center, Apr. 12, 1985, pp. 1-34.

Department of Defense Standard, "Department of Defense Trusted Computer System Evaluation Criteria," Dec. 1985, pp. 1-72.

Deutsch, P., "GZIP File Format Specification Version 4.3," Network Working Group, May 1996, pp. 12.

Diffie, Whitfield, "Authentification and Authenticated Key Exchanges", Sun Microsystems and Bell-Northern Research, Mar. 6, 1992.

Diffie, Whitfield, "The First Ten Years of Public-Key Cryptography", Proceedings of the IEEE, vol. 76, No. 5, May 1988.

Diffie, Whitfield, et al., Privacy on the Line: The Politics of Wiretapping and Encryption, Massachusetts Institute of Technology, 1998.

Digital Broadband Delivery System, Phase 1.0, System Overview, Revision 1.0, Scientific Atlanta, 1997.

Digital Rights Enforcement and Management: SuperDistribution of Cryptolopes, IBM.

DiLascia, Paul, "OLE Made Almost Easy: Creating Containers and Servers Using MFC 2.5," Microsoft Systems Journal, Apr. 1994, pp. 13-33.

Doster et al., "Third-Party Authentication in the Institutional File System," Center for Information Technology Integration.

Dougherty, D., et al., The Mosaic Handbook for the X Window System, O' Reilly & Associates, 1994.

Downs, D.D., et al., "Issues in Discretionary Access Control," Proceedings of the 1985 Symposium on Security and Privacy, Apr. 22-24, 1985, Oakland, California, pp. 208-218.

Dukach, S., "SNPP: A Simple Network Payment Protocol," MIT Laboratory for Computer Science, undated, 7 pages.

Eastlake III, D., "Physical Link Security Type of Service," Network Working Group RFC 1455, May 1993.

Eastlake III, D., et al., "Randomness Recommendations for Security," Network Working Group RFC 1750, Dec. 1994.

EFT Network Data Book; 1993 Edition, Bank Network News, vol. 11, No. 13, Nov. 1992.

Eizenberg, G., "Contribution of Information Technology Security to Intellectual Property Protection," CERT-DERI.

Electronic Reverse Copyright Management System (ERCOMS), International Institute for Electronic Library Research, website updated by Ramsden, Anne, Jul. 22, 1996.

Ellison, C. et al., "SPKI Certificate Theory," Internet Engineering Task Force (IETF) RFC 2693, Sep. 1999, 38 pages, available at http://www.ietf.org/rfc/rfc26939.txt?number=2693.

Email from Chris Drost-Hansen re press release: "AT&T Launches A2B Music Trial for Delivering Songs Over the Internet," Business Wire, Nov. 3, 1997.

Email from Edmond Kouka to Jean-Francois Boisson re TELENET TELEtraining platform—Bogdan Lutkiewicz, Poland, Gdansk, Mar. 4, 2001.

Enterprise Solutions Announces RSA Mail, RSA Security News, viewed at <http://rsasecurity.com/news/pr/940112-2.html.>, dated Jan. 12, 1994, pp. 1-2.

Epstein, J., "A Trusted X Window System Server for Trusted Mach," Usenix Association Proceedings, Mach Workshop, Oct. 4-5, 1990, Burlington, Vermont, pp. 141-155.

Erickson, John S., "A Copyright Management System for Networke Interactive Multimedia", Proceedings of the 1995 Dartmouth Institute for Advanced Graduate Studies, 1995.

Erickson, John S., "Rights Management Through Enhanced Attribution", Presented at INET 96 Proceedings, Jun. 1996.

ESPRIT Project 20517—Copysmart Cited based multi-media IPR management on cost effective smart device, Summaries of Projects (FP III/IV)—Part I, European Information technology for Information Science, Oct. 1998.

ESPRIT Project 20676—IMPRIMATUR—Intellectual Multimedia Property Rights Model and Terminology for Universal Reference, IMPRIMATUR Consortium, Oct. 1998.

ESPRIT Project 22226—Muse—Developing Standardized Digital media Management, Signaling and encryption Systems for the European Music Sector, International Federation of the Phonographic Industry, Oct. 1998.

ESPRIT Project 24378—MENHIR European Multimedia Network of High Quality Image Registration, Museums On Line, Feb. 1, 1997.

ESPRIT Project: 5469: Contract Amendment No. 2; Commission of the European Communities, Sep. 16, 1993.

Europe and The Global Information Society Recommendations to the European Council, Bamgemann Report, www.medicif.org web pages, Global Information Society, May 1994.

Everett, David B., "Smart Card Tutorial-Part 1," Sep. 1992.

Farmer, D., "The COPS Security Checker System," Jul. 10, 1992.

Federal Criteria for Information Technology, Security, vol. II, Version 1.0, National Institute of Standards and Technology and National Security Agency, Dec. 1992, 270 pages.

Feistel, H. "Cryptographic Coding for Data-Bank Privacy," IBM document RC 2827, Mar. 18, 1970.

Ferraiolo, D., et al., "Role-Based Access Control," Reprinted from the Proceedings of the 15th National Computer Security Conference, 1992, pp. 1-11.

Financial Transaction Card Originated Messages—Interchange Message Specifications—Part 2: Application and registration Procedures for Institution Identification Codes (IIC), ISO 8583-2, Jul. 1, 1998.

Financial Transaction Card Originated Messages—Interchange Message Specifications—Part 3: Maintenance Procedures for Codes, ISO 8583-3, Jul. 1, 1998.

Fine, T.,et al, "Assuring Distributed Trusted Mach," Secure Computing Corporation, 1993, 13 pages.

Finin et al., "A Language and Protocol to Support Intelligent Agent Interoperability," Proceedings of the CE & CALS, Washington '92 Conference, Apr. 1992.

Forcht, K.A., Computer Security Management, Boyd & Fraser Publishing Company, 1994.

Forum on Risks to the Public in Computers and Related Systems, The Risks Digest, vol. 15; Issue 39, Jan. 21, 1994, pp. 1-12.

Forum on Technology-Based Intellectual Property Management—Electronic Commerce for Content, IMA INtellectual Property Proceedings, vol. 2, Jun. 1996.

Franklin, M., et al., "An Overview of Secure Distribution Computing," Mar. 24, 1992, pp. 1-46.

Franz, M., "Technological Steps Toward a Software Component Industry," Institut fur Computersysteme, Zurich, Switzerland, undated, 23 pages.

Frederick, Keith P., "Certification and Accreditation Approach", Air Force Cryptologic Support Center (OL-FP).

FreeBSD System Manager's Manual "LDCONFIG", Oct. 3, 1993.

Fuchsberger et al., "Public-key Cryptography on Smart Cards," Information Security Group.

Fugini, M.G., et al., "Authorization and Access Control in the Office-Net System," Computer Security in the Age of Information, 1989, pp. 147-162.

Fugini, M.G., et al., "Security Management in Office Information Systems," Computer Security: A Global Challenge, 1984, pp. 487-498.

Galvin, J., et al., "Security Protocols for version 2 of the Simple Network Management Protocol (SNMPv2)," Network Working Group RFC 1446, Apr. 1993.

Galvin, J., et al., "SNMP Security Protocols," Network Working Group, Jul. 1992, pp. 1-26.

Gamble, Todd, "Implementing Execution Controls in Unix," Usenix Association, Proceedings of the Seventh Systems Administration Conference, Nov. 1-5, 1993, Monterey, California, pp. 237-242.

Garfinkel, Simson, et al., Practical UNIX Security, O' Reilly & Associates, Inc., 1991.

Garfinkel, Simson, PGP: Pretty Good Privacy, O' Reilly & Associates, Inc., undated.

Gasser, M., et al., "The Digital Distributed System Security Archtecture," Reprint from the Proceedings of 1989 National Computer Security Conference, 1989, pp. 1-13.

Gaster, J. L., "Authors' Rights and Neighboring Rights in the Information Society," DG XV/E/4, European Commission.

Gemplus, MCOS: Multi Application Chip Operating System—Introduction, Gemplus Card International, 1990.

General Magic Picks RSA, RSA Security News, viewed at <http://rsasecurity.com/news/pr/940112-3.html.>, dated Jan. 12, 1994, pp. 1-2.

Gifford, D.K., "Cryptographic Sealing for Information Secrecy and Authentication," Communications of the ACM, vol. 25, No. 4, Apr. 1982, pp. 274-286.

Gifford, D.K., et al., "The Cirrus Banking Network," Communications of the ACM, vol. 28, No. 4, Aug. 1985, pp. 798-807.

Gilde, R., "DAT-Heads: Frequently Asked Questions," 1991, Release 3.1, Sep. 2, 1992.

Gircys, G.R., Understanding and Using COFF, O'Reilly & Associates, Inc., Nov. 1988.

Glatzer, H., "The Promise of LANs MIS Back in Control," Software News, Mar. 1985, pp. 51-58.

Gligor, V.D., et al., "Object Migration and Authentication," IEEE Transactions on Software Engineering, vol. SE-5, No. 6, Nov. 1979, pp. 607-611.

Gong, Li, "A Secure Identity-Based Capability System," University of Cambridge Computer Laboratory, Jan. 1989, pp. 1-15.

Gong, Li, et al., "Signing, Sealing and Guarding Java Objects," Mobile Agents and Security, G. Vigna, editor, Springer-Verlag, 1998, vol. 1419 of LNCS, pp. 206-216.

Gosler, James, "Software Protection: Myth or Reality", Lecture Notes in Computer Science, Advances in Cryptography—Crypto '85 Proceedings, 1985.

Gosling, J., "Oak Intermediate Bytecodes," 1995, 5 pages.

Gozani et al., "GAFFES: The Design of a Globally Distributed File System," Report No. UCB/CSD 87/361; Computer Science Division (EECS), U.C. Berkley, Jun. 1997.

Greenwald et al., "The Distributed Compartment Model for resource management and Access Control," Technical report No. TR94-035, The University of Florida, Oct. 1994.

Griswold, Gary N., "A Method for Protecting Copyright on Networks", IMA Intellectual Property Proceedings, vol. 1, Issue 1, Jan. 1994.

Gruber, R., et al., "Disconnected Operation in the Thor Object-Oriented Database System," Laboratory of Computer Science, Massachusetts Institute of Technology, undated, pp. 1-6.

Guide to the Secure Configuration and Administration of Microsoft Exchange 5.x®, National Security Agency, Jun. 20, 2002, pp. 1-58.

Halfhill, Tom R., et al.,"Agents on the Loose," Byte.com, Feb. 1994, pp. 1-2.

Halfhill, Tom R., et al., "Just Like Magic?," Byte.com, Feb. 12, 1994, pp. 1-5.

Haller, N., "The S/KEY One-Time Password System," Network Working Group RFC 1760, Feb. 1995.

Handwritten note re: GVS and AJL, Mar. 2, 1994.

Hansen, S.E., et al., "Automated System Monitoring and Notification with Swatch," Proceedings of the 1993 LISA, Monterey, California, Nov. 1-5, 1993, pp. 101-108.

Hardjono, Thomas, "Record Encryption in Distributed Databases," Department of Comuter Science, University of New South Wales, Jan. 1990, pp. 386-395.

Hardy, N., "The Keykos Architecture," Eighth Edition, Dec. 1990, pp. 1-8.

Harn, Lein, et al., "A Software Authentication System for the Prevention of Computer Viruses," ACM, 1992, pp. 447-450.

Harris, J., et al., "Bento Specification," Apple Computer, Inc., Jul. 15, 1993, 106 pages.

Harty, K., et al., "Case Study: The VISA Transaction Processing System," May 30, 1988, pp. 1-23.

Hauser, Ralf C., et al., "LTTP Portection—A Pragmatic Approach to Licenseing", Institut fur Informatik, Universitat Zurich, Jan. 13, 1994.

Hauser, Ralf, "Control Information Distribution and Access," Dissertation Der Wirtschaftswissenschaftlichen Fakultat Der Universitat Zurich, May 31, 1995.

Hauser, Ralf, C., "Does Licensing Require New Access Control Techniques?," Institut fur Informatik, Universitat Zurich, Aug. 12, 1993, 9 pages.

Hawk, H.S., "RSA & General Magic," email to Good Guys, Jan. 6, 1994, 1 page.

Hearst, M.A., "Interfaces for Searching the Web," Scientific American, Mar. 1997, pp. 68-72.

Hellman, "Multi-user Cryptographic Techniques".

Herzberg, Amir, et al., "On Software Protection", Proceedings of the 4th Jerusalem Conference on Information Technology (JCIT), IEE Computer Society Proes., Apr. 1984.

Hewlett-Packard Chooses RSA, RSA Security News, viewed at <http://rsasecurity.com/news/pr/940112-5.html.>, dated Jan. 12, 1994, pp. 1-2.

Hickman, Kipp, E.B., SSL 2.0 Protocol Specificatoin.

Hilgraeve Ships Secure Version of HyperACCESS/5, RSA Security News, viewed at <http://rsasecurity.com/news/pr/940112-8.html.>, dated Jan. 12, 1994, pp. 1-2.

Hill, William et al., "Edit Wear and Read Wear," Computer Graphics and Interactive Media Research Group, ACM; May 3-7, 1992.

Hill, William et al., "History-Enriched Digital Objects," Computer Graphics and Interactive Media Research Group; Bell Communications Research, 1993.

History of Computer Security: Early Computer Security Papers, Part 1, National Institute of Standards and Technology, Sep. 4, 2002, viewed at <http://csrc.nist.gov/publications/history/index.html> pp. 1-27.

Hoffman, L.J., Modern Methods for Computer Security and Privacy, Prentice-Hall, Inc., 1977.

Hohl, F., "Time Limited Blackbox Security: Protecting Mobile Agents from Malicious Hosts," Lecture Notes in Computer Science, vol. 1419: Mobile Agents and Security, Springer-Verlag, 1998, G. Vigna Ed., pp. 90-111.

Holsinger, E., How Music and Computers Work, Ziff-Davis Press, 1994.

Holzner, S., Heavy Metal OLE 2.0 Programming, IDG Books Worldwide, Inc., 1994.

Honeyman, P., "Digest of the First UNSENIX Workshop on Electronic Commerce (EC 95)," Jul. 1995.

Horster, P., Communications and Multimedia Security II, Chapman & Hall, 1996.

Hsiao, D., et al., Computer Security, Academic Press, Inc., 1979.

Hutt, A.E., et al., Computer Security Handbook Second Edition, Macmillan Publishing Company, 1988, pp. 201-217.

IBM Cryptolope Technology-Executive Summary, IBM, viewed on Mar. 13, 2002 at <http://www-3.ibm.com/software/security/cryptolope.about.html> pp. 1-3.

Imprimatur News, imprimatur, Dec. 1998.

Interchange Message Specification for Debit and Credit Card Message Exchange Among Financial Institutions, American National Standard, Accredited Standards Committee X9-Financial Services Committee, ANSI X9.2-1988, American Bankers Association, May 16, 11.

International Infrastructure Standards Panel, "IISP Need #31-Containers or Secure Packaging," Electronic Publishing Research, Sep. 18, 1995, pp. 1-3.

International Infrastructure Standards Panel, "IISP Need #32-Authentication of Content," Electronic Publishing Research, Sep. 18, 1995, pp. 1-3.

International Infrastructure Standards Panel, "IISP Need #33-Control Enforcement," Electronic Publishing Research, Sep. 18, 1995, pp. 1-3.

International Infrastructure Standards Panel, "IISP Need #34-Billing and Payment," Electronic Publishing Research, Sep. 18, 1995, pp. 1-3.

International Infrastructure Standards Panel, "IISP Need #35-Reporting," Electronic Publishing Research, Sep. 18, 1995, pp. 1-3.

International Standard ISO8583, "Bank Card Originated Messages—Interchange Message Specifications—Content for Financial Transactions," International Organization for Standardization, Aug. 15, 1987, pp. 1-33.

Internet Billing Server, Carnegie Mellon University, Prototype Scope Document, INI Tech Report, Oct. 14, 1993, pp. 1-29.

Introduction to Smart Cards v. 1.0, Gemplus Card Internatioal, Mar. 21, 1991.

iOpener, Registered Trademark of National Semiconductor Corporation, Registration date Oct. 4, 1994, 1 page.

iOpener, U.S. Patent and Trademark Prosecution History for National Semiconductor Corporation, Registration date, Oct. 4, 1994, 27 pages, TULIP Final Report.

iPower's Data Security Approach, RSA Security News, viewed at <http://rsasecurity.com/news/pr/940112-10.html.>, dated Jan. 12, 1994.

"iPower Technology," National Semiconductor, undated, 11 pages.

Jaeger, T, et al., "Support for the File System Security Requirements of Computational E-Mail Systems," Nov. 1994, ACM 0-89791-732-4/94/0011, 9 pages.

Johnson, H.L., et al., "A Secure Distributed Capability Based System," ACM, 1985, pp. 392-402.

Johnson, R., "Info on Telescript," 1994 Software Agents List Archieve, Dec. 6, 1994, pp. 1-4.

Jones et al., "Credentials for Privacy and Interoperation," University of Illinois at Urbana-Champaign.

JUKEBOX—Music Across Borders, LIB-JUKEBOX/4-1049.

Kahn, D., The Codebreakers: The Story of Secret Writing, The Macmillan Company, 1967.

Kahn, R., et al., A Framework for Distgributed Digital Object Services, Corporation for National Research Initiatives, May 13, 1995.

Kaliski, Jr., et al. "A Layman's Guide to a Subset of ASN.1, BER, and DER", RSA Laborato4ries Technical Note, 1991, Revised Nov. 1, 1993.

Kamens, J.I., "Retrofitting Network Security to Third-Party Applications-The SecureBase Experience," Symposium Proceedings, Unix Security IV, Oct. 4-6, 1993, Santa Clara, California, pp. 41-57.

Kaner, Cem et al., Testing Computer Software, Second Edition, Van Nostrand Reinhold, 1988.

Kaplan, M., "IBM Cryptolopes, Super Distribution and Digital Rights Management," viewed at < <http://www.research.ibm.com/people/k/kaplan/cryptolope-docs/crypap.html>on Dec. 30, 1996, pp. 1-10.

Karger, P.A., et al., "A VMM Security Kernel for the VAX Architecture," CH2884-5/90/0000/0002, IEEE 1990, pp. 2-19.

Karger, P.A., et al., "Multics Security Evaluation: Vulnerability Analysis," HQ Electronic Systems Division, Hanscom AFB, Technical Report 19, Jun. 1974, 14 pages.

Kastenholz, F., "The Definitions of Managed Objects for the Security Protocols of the Point-to-Point Protocol," Network Working Group RFC 1472, Jun. 1993.

Katzan, Harry, Jr., Computer Data Security, Litton Educational Publishing Company, 1973.

Keefe, T.F., et al., "Prototyping the SODA Security Model," Department of Computer Science, University of Minnesota, 1990, pp. 211-235.

Kelman, Alistair, "Electronic Copyright Management: Possibilities and Problems", Scientists for Labor Presentation, Nov. 14, 1996.

Kelter, U., "Discretionary Access Controls in a High-Performance Object Management System," 1991 IEEE Computer Society Symposium on Research in Security and Privacy, May 20-22, 1991, Oakland, California, pp. 288-299.

Kelter, U., et al., "Type Level Access Controls for Distributed Structurally Object-Oriented Database Systems," Computer Security, ESCORICS 92, Second European Symposium on Research in Computer Security, Toulouse, France, Nov. 23-25, 1992, pp. 21-40.

Kent, S., et al., "Privacy Enhancement for Internet Electronic Mail: Part II—Certificate-Based Key Management," Network Working Group, Aug. 1989, pp. 1-22.

Kent, S.T., "U.S. Department of Defense Security Options for the Internet Protocol," Network Working Group RFC 1108, Nov. 1991.

Ketchpel, Steve P., et al. "Shopping Models: A Flexible Architecture for Information Commerce", Stanford University.

Key Cryptolope Components, IBM, viewed on Mar. 13, 2002 at <http://www-3.ibm.com/software/security/cryptolope.about.html> pp. 1-2.

Key Management (retail)—Part I: Introduction to Key Management; Part II: Key Management Techniques for Symmetric Ciphers, ISO 11568-1 and -2, Dec. 1, 1994.

Key Management Using ANSI X9.17, Federal Information Processing Standards Publication 171, U.S. Department of Commerce, Apr. 1992.

KeyKOS Principles of Operation, Key Logic document KL002-04, 1985, Fourth Edition, Jan. 1987.

Kim, G.H., et al. "Experiences with Tripwire: Using Integrity Checkers for Intrusion Detection," Purdue Technical Report CSD-TR-94-012, Feb. 21, 1994.

Kim, G.H., et al., "The Design and Implementation of Tripwire: A File System Integrity Checker," Nov. 19, 1993.

Kim, L., et al., "Novell Cuisine," Proceedings of the ACM SIGUCCS User Services Conference XIX, Nov. 3-6, 1991, Seattle, Washington, pp. 183-184.

Kim, W., et al., "Features of the ORION Object-Oriented Database System," 1989, pp. 251-282.

Kim, W., et al., "Object-Oriented Concepts, Databases, and Applications," ACM Press, 1989.

Klemond, P., "Investigating Object Linking and Embedding, Part II: Adding Server Support," Microsoft Systems Journal, May/Jun. 1992, pp. 87-94.

Klemond, P., "Taking the Bull by the Horns: Investigating Object Linking and Embedding, Part I," Microsoft Systems Journal, Mar./Apr. 1992, pp. 19-38.

Kluepfel, H.M., "Securing a Global Village and its Resources: Baseline Security for Interconnected Signaling System #7 Telecommunications Networks," 1993, pp. 195-212.

Koenig, A., "Automatic Software Distribution," Usenix Association Software Tools Users Group, Summer Conference, Salt Lake City, Jun. 12-15, 1984, pp. 312-322.

Kohl, J.T., et al., "The Evolution of the Kerberos Authentication Service," Digital Equipment Corporation, 1991, pp. 1-15.

Konheim, Alan, G., et al.,Cryptography: A Primer, John Wiley & Sons, Inc., 1981.

Krajewski, Jr., M., "Applicability of Smart Cards to Network User Authentication," Computing Systems, vol. 7, No. 1, Winter 1994, pp. 75-89.

Krajewski, Jr., M., "Smart Card Augmentation of Kerberos,". The Mitre Corporation, undated, 6 pages.

Krajewski, Jr., M., et al., "Concept for a Smart Card Kerberos," The Mitre Corporation, undated, 7 pages.

Kramer, M., "Strength in Numbers," PC Week, Jul. 22, 1986, pp. 57-58.

Kreutzer, A.N., "An On-Line System for Controlling and Monitoring Software Usage in a Microcomputer Laboratory," SIGUCCS Newsletter, vol. 18, No. 2, 1988, pp. 29-32.

Krol, E., The Whole Internet User's Guide and Catalog, 2nd. Ed., O' Reilly & Associates, Inc., 1992.

Kurak, C., et al., "A Cautionary Note On Image Downgrading," Proceedings of the 1992 Computer Security Applications Conference, San Antonio, TX, Dec. 1992, 7 pages.

Lacy, Jack, et al., "Music on the Internet and the Intellectual Property Protection Problem".

Lagoze et al., "A Design for Inter-Operable Secure Object Stores (ISOS)," Cornell University, NCSA, CNRI, Nov. 1995.

Lagoze, Carl, "A Secure Repository Design for Digital Libraries", D-Lib Magazine, Dec. 1995.

LaLonde Wilf, R., et al., Inside Smalltalk: vol. 1, Prentice-Hall, Inc., 1990.

Lampson, B.W., "A Note on the Confinement Problem," Communications of the ACM, Oct. 1973, pp. 1-5.

Lampson, B.W., "Computer Security," Digital Equipment Corporation, 1991, pp. 1-54.

Landwehr, C.E, et al., "A Taxonomy of Computer Program Security Flaws," ACM Computer Surveys, vol. 26, No. 3, Sep. 1994, pp. 211-254.

Landwehr, C.E., "Formal Models for Computer Security," Computer Surveys, vol. 13, No. 3, Sep. 1981, pp. 247-278.

Langelaar, G.C. "Overview of Protection Methods in Existing TV and Storage Devices," SMS-TUD-609-1, Final Ver. 1,2, Feb. 26, 1996.

Leary, P., "Are There Ciphers in Shakespeare?," 1995, pp. 1-18.

Lehman, B., "Intellectual Property and the National Information Infrastructure, A Preliminary Draft of the Report of the Working Group on Intellectual Property Rights," Jul. 1994, 4 introductory pages and pp. 1-141.

Leiss, E., "On Authorization Systems with Grantor-Controlled Propagation on Privileges," Compcon 83, Feb. 28-Mar. 3, 1983, San Francisco, California, pp. 499-502.

Lesk, M., "Digital Libraries Meet Electronic Commerce: On-Screen Intellectual Property," Dec. 15, 1998.

Levine, P.H., et al., "Network License Server," Apollo, Oct. 1987, pp. 1-19.

Lewontin, S., et al., "The DCE Web Project: Providing Authorization and Other Distributed Services to the World Wide Web," Feb. 22, 2002.

Lin, P., "The Encapsulated Security Services Interface (ESSI)," Computer Security (A-37), 1993, pp. 119-135.

Linn, J., "Privacy Enhancement for Internet Electronic Mail: Part I—Message Encipherment and Authentication Procedures," Network Working Group, Aug. 1989, pp. 1-30.

Lipson, S., "Little Black Box 'Blocks' Illicit Software Copying," Stamford Advocate, Sep. 14, 1986, pp. E1-E2.

List of Articles, <www.chaum.com/articles/list-of-articles.htm>, as on Aug. 23, 2002, 4 pages.

Lockhart, Jr., H.W., OSF DCE Guide to Developing Distributed Applications, McGraw-Hill, Inc., 1994.

Lord et al., "Access Management in Multi-Administration Networks," IEE 2nd International Conference on Secure Communication Systems, 1986.

Lunt, Teresa, "Multilevel Security for Object-Oriented Database Systems," SRI International Computer Science Laboratory, 1990, pp. 199-209.

Lynch, C., "Searching the Internet," Scientific American, Mar. 1997, pp. 52-56.

Mach Books, viewed on Feb. 6, 2002 at http://www2.cs.cmu.edu/afs/cs/project/mach/public/www/doc/books.html., pp. 1-3.

Manager's Guide to MPE/iX Security, Hewlett-Packard Company, Apr. 1994.

Mann, C.C., "Homeland Insecurity," Sep. 2002.

Mathy, Laurent, "Features of the ACCOPI Multimedia Transport Service", Lecture Notes in Computer Science, No. 1045, Proc. of European Workshop IDMS' 96, Mar. 1996.

Maude, T., et al., "Hardware Protection Against Software Piracy," Communications of the ACM, vol. 27, No. 9, Sep. 1984, pp. 951-959.

McCloghrie, K., et al., "Definitions of Managed Objects for Administration of SNMP Parties," Network Working Group, Jul. 1992, pp. 1-17.

McCloghrie, K., et al., "Management Information Base for Network Management of TCP/IP-based Internets," Network Working Group, RFC 1156 (May 1990).

McCollum, C.J., et al., "Beyond the Pale of MAC and DAC-Defining New Forms of Access Control,", Unisys Defense Systems, 1990, pp. 190-200.

McGraw, G., et al., Java Security, John Wiley & Sons, Inc., 1997.

Medvinsky, G., et al., "NetCash: A Design for Practical Electronic Currency on the Internet," 1st Conference on Computer and Communications Security, Nov. 1993, pp. 102-106.

Merkle, Ralph C., "Protocols for Public Key Cryptosystems", IEEE, 1980.

Merkle, Ralph C., "Secure Communications Over Insecure Channels," Communications of the ACM, vol. 21, No. 4, Apr. 1978, pp. 294-296.

Meyer, C.H., et al., Cryptography: A New Dimension in Computer Data Security, John Wiley & Sons, Inc., 1982.

Microsoft Authenticode Technology, Microsoft Corporation, Oct. 1996.

Millen, J.K., et al., "Security for Object-Oriented Database Systems," Proceedings of the 1992 IEREE Computer Society Symposium on Research in Security and Privacy, May 4-6, 1992, Oakland, California, pp. 260-272.

Miller, S.P., et al., "Kerberos Authentication and Authorization System," Massachusetts Institute of Technology, Oct. 27, 1998, pp. 1-36.

Minear, S.E., "Providing Policy Control Over Object Operations in a Mach Based System," Secure Computing Corporation, Apr. 28, 1995, 15 pages.

Miscellaneous letter from Georges Van Slype at Bureau Van Dijik, Feb. 28, 1994.

Miscellaneous Letters from Georges Van Slype at Bureau Van Dijk, Apr. 19, 1994, Apr. 18, 1994, Apr. 11, 1994, Apr. 6, 1994..

Miscellaneous Letters from Georges Van Slype at Bureau Van Dijk, Feb. 13, 1995 and Nov. 2, 1994.

Miscellaneous Letters from Georges Van Slype at Bureau Van Dijk, Feb. 9, 1994, Jan. 27, 1994, Jan. 19, 1994, Jan. 12, 1994, Dec. 22, 1993, Nov. 30, 1993, Nov. 22, 1993, Dec. 6, 1993, Nov. 16, 1993, Oct. 15, 1993, Oct. 7, 1993, Oct. 4, 1993, Sep. 20, 1993.

Miscellaneous Letters from Georges Van Slype at Bureau Van Dijk, Mar. 30, 1994, Mar. 24, 1994, Feb. 10, 1994.

Miscellaneous Letters from Georges Van Slype at Bureau Van Dijk, Mar. 30, 1995.

Miscellaneous Letters from Georges Van Slype at Bureau Van Dijk, Sep. 12, 1994, May 11, 1994, May 10, 1994, May 6, 1994, May 4, 1994, Apr. 21, 1994, Apr. 20, 1994.

Moens, Jan, "Case of Application of the Generic CITED Model to the CITEDisation of a Directory Database on CD-ROM, Ver. 2.0," ESPRIT II, Project 5469, The CITED Consortium, Nov. 30, 1992.

Moens, Jan, "Report on the Users Requirements, Ver. 1.0," ESPIRIT II, Project 5469, The Cited Consortium, Nov. 27, 1991.

Moffett, Jonathan D., "Delegation of Authority Using Domain-Based Access Rules," thesis Imperial College of Science, Technology & Medicine, University of London, Jul. 1990.

Moffett, Jonathan D., "Specification of Management Policies and Discretionary Access Control," Department of Computer Science, University of York, Jun. 28, 1994, pp. 1-28.

Moffett, Jonathan D., et al., "An Introduction to Security Distributed Systems," Department of Computer Science, University of York, England, Aug. 1993, pp. 1-14.

Moffett, Jonathan D., et al., "Policy Hierarchies for Distributed Systems Management," IEEE JSAC Special Issue on Network Management, vol. 11, No. 9, Dec. 1993, pp. 1-4.

Moffett, Jonathan D., et al., "Specifying Discretionary Access Control Policy for Distributed Systems," Computer Communications, vol. 13, No. 9, Nov. 1990, pp. 1-17.

Moffett, Jonathan D., et al., "The Representation of Policies as System Objects," Proceedings of the Conference on Organizational Computer Systems (COCS '91), Atlanta, Georgia, Nov. 5-8, 1991, 16 pages.

Montini, G, et al., "Access Control Models and Office Structures," Computer Security: A Global Challenge, 1984, pp. 473-485.

Motorola MC68030 Enhanced 32-bit Microprocessor User's Manual, 2nd Ed., Prentice-Hall, 1989.

MSDN-INF: LAN Manager 2.1 Server Autotuning (Part2), PSS ID No. 080078, Microsoft, Feb. 1993.

MSDN-Licence Service Application Programming Interface, API Specification v1.02, Microsoft, Jan. 1993.

Muftic, Sead, Security Mechanisms for Computer Networks, Ellis Horwood Limited, 1989.

Mullender, S., Distributed Systems, ACM Press, 1989.

Multics, Home; viewed on Nov. 12, 2001 at <http://www.multicians.org> pp. 1-3.

Multimedia System Services Ver. 1.0, Hewlett-POackard, IBM, & SunSoft, 1993.

National Semiconductor and EPR Partner for Information Metering/Data Security Cards, Press Release, (Mar. 4, 1994), 4 pages.

Needham, R.M., "Ading Capability Access to Conventional File Servers," Xerox Palo Alto Research Center, undated, pp. 3-4.

Neuman B.C.,et al. "Kerberos: An Authentication Service for Computer Networks," IEEE Communications magazine, Sep. 1994.

Neuman, B.C., "Proxy-Based Authorization and Accounting for Distributed Systems," Information Sciences Institute, University of Southern California, 1993, pp. 283-291.

Nguyen, Thanh et al., "Guidelines for Validation of a CITED System," CITED 5469, SA-21-40-003, Jul. 4, 1994.

NSA Korean War 1950-1953 Commemoration, History Papers, National Security Agency, http://www.nsa.gov/korea/papers.htm, pp. 1-2.

O'Connor, MaryAnn, "New Distribution Option for Electronic Publishers," Information Access Co., Mar. 1994, pp. 1-6.

OLE 2.0 Draft Content: Object Linking & embedding, Microsoft, Jun. 5, 1991.

Olivier, M.S., "A Multilevel Secure Federated Database," Database Security, VIII (A-60), 1994, pp. 183-198.

Olivier, M.S., et al., "Building a Secure Database using Self-protecting Objects," Computers & Security, vol. 11, No. 3, 259-271, 1992.

Olson, M.S., et al., "Concurrent Access Licensing," vol. 6, No. 9, Unix Review, 1988, pp. 67-74.

OMG Security Working Group, "OMG White Paper on Security," OMG Security Working Group, Apr. 1994, pp. 1-24.

OOPSLA 1993: Addendum to the Proceedings, "Security for Object-Oriented Systems," Sep. 26-Oct. 1, 1993, pp. 77-78.

Open Systems Interconnection: Security Architecture, ISO 7498/1, 1988.

Open Systems Interconnection: Security Architecture, ISO 7498/2, 1988.

OpenDoc vs. OLE 2.0: Superior by Design, IBM, Jan. 1994, pp. 1-4.

Orfali, R., et al., The Essential Distributed Objects Survival Guide, John Wiley & Sons, Inc., 1996.

Organick, E.I., The Multics System: An Examination of Its Structure, MIT Press, 1972.

OSF DCE Administration Guide-Core Components, Open Software Foundation, PTR Prmtoce Hall, 1993.

Paepcke, Andreas, "Summary of Stanford's Digital Library Testbed and Status," Stanford University, D-Lib Magazine, Jul. 1996

Paradinas, Pierre et al., "New Directions for Integrated Circuit Cards Operating Systems".

Park, J.S., AS/400 Security in a Client/Server Environment, John Wiley & Sons, Inc., 1995.

Payment Systems; Strategic Choices for the Future, Hitachi Research Institute; Institute of Advanced Business Systems, Hitachi, Ltd., 1993.

Perlman, Bill, "A Working Anti-Taping System for Cable Pay-Per-View," IEEE Trans. On Consumer Electronics, vol. 35, No. 3, Aug. 1989.

Personal Identification Number (PIN) management and security—Part I: Basic Priniciples and Requirements for online PIN Handling in ATM and POS Systems; & -2 Approved Algorithm(s) for PIN Encipherment, ISO 9564-1 & -2, (Apr. 15, 2002 & Dec. 15, 1991).

Pethia et al., "Guidelines for the Secure Operation of the Internet," Network Working Group, RFC 1281, Nov. 1991.

Picciotto, J., et al., "Extended Labeling Policies for Enhanced Application Support," Computers & Security, vol. 13, No. 7, 1994, pp. 587-599.

Pietreck, M., Windows Internals: The Implementation of the Windows Opeartion Environment, Addison-Wesley, 1993.

Pijenborg, Mari F.J., "Auteursrecht En De Digitale Bibliotheek," 195 Open, Jan. 1995.

Pijnenborg, Mari F.J., "CITED Final Report," Elsevier Science B.V., Apr. 1994.

PKCS #1:RSA Encryption Standard, RSA Laboratories Technical Note, Ver. 1.5, revised Nov. 1, 1993.

PKCS #10: Certification Request Syntax Stanard, An RSA Laboratories Technical Note, Ver. 1.0, Nov. 1, 1993.

PKCS #11: Cryptographic Token Interface Standard, An RSA Laboratories Technocal Note, Ver. 2.0, Apr. 15, 1997.

PKCS #12 v 1.0: Personal Information Echange Syntax, RSA Laboratories, Jun. 24, 1999.

PKCS #13: Elliptic Curve Crytography Standard, RSA Security, Jan. 12, 1998.

PKCS #15 v 1.0: Cryptographic Token Information Formant Standard, RSA Laboratories, Apr. 23, 1999.

PKCS #3: Duffie-Hellman Key-Agreement Standard, RSA Laboratories Technical Note, Ver. 1.4, revised Nov. 1, 1993.

PKCS #5: Password-Based Encryption Standard, An RSA Laboratories Technical Note, Ver. 1.5, 1991-1993, Revised Nov. 1, 1993.

PKCS #6: Extended-Certificate Syntax Standard, RSA Laboratories Technical Note, Ver. 1.5, revised, Nov. 1, 1993.

PKCS #8: Private-Key Information Syntax Standard, An RSA Laboratories Technical Note, Ver. 1.2, 1991-1993, Revised Nov. 1, 1993.

PKCS #9: Selected Attribute Types, RSA Laboratories Technical Note, Ver. 1.1, revised Nov. 1, 1993.

Polk, T.W., "Approximating Clark-Wilson "Access Triples" with Basic UNIX Controls," Symposium Proceedings, Unix Security IV, Oct. 4-6, 1993, Santa Clara, California, pp. 145-154.

Popek, Gerald, J., et al., "Encryption and Secure Computer Networks," Computing Surveys, vol. 11, No. 4, Dec. 1979, pp. 331-356.

Press, Jim, "Secure Transfer of Identity and Privilege Attributes in an Open Systems Environment," Computers & Security, vol. 10, No. 2, 1991, pp. 117-127.

Press, Jim, et al, "A New Approach to Crytographic Facility Design", ICL Mid-Range Systems Division Reading, Berks, UK.

Privacy and the NII: Safeguarding Telecommunications—Related Personal Information, U.S. Dept. of Commerce, Oct. 1995.

Proceedings: Technological Strategies for Protecting Intellectual Property in the Networked Multimedia Environment, 1994, Coalition for Networked Information, Interactive Multimedia Association, John F. Kennedy School of Government, Journal of the Inte.

Purdy, G.B., et al., "A Software Protection Scheme," Proceedings of the 1982 Symposium on Security and Privacy, Apr. 26-28, 1982, Oakland California, pp. 99-103.

Rashid, R.F., CMU Computer Science: A 25th Anniversary Commemorative, Addison-Wesley Publishing Company, 1991.

Reali, Patti, "Copy Protection: The answer to pay per view's Prayers?," TVRO Dealer, Dec. 1994.

Reiher, et al., "Truffles—A Secure Service for Widespread File Sharing," UCLA, Trusted Information Systems.
Reiher, et al., "Truffles—Secure File Sharing With minimal system Administrator Intervention," UCLA, Trusted Information Systems.
Request for Technology: Multimedia System Services, Ver. 2.0, Interactive Multimedia Association Compatability Project, Nov. 9, 1992.
Request for Technology: Multimedia System Services, Draft, Ver. 1.1, Interactive Multimedia Association Compatibility Project, Oct. 16, 1992.
Requirements for the Software License Management System, System Management Work Group, Rev. 3, Unix International, Jul. 23, 1992.
Rescorla, E., et al., "The Secure HyperText Transfer Protocol," Enterprise Integration Technologies, Jun. 1994, pp. 1-23.
Resnick, P., "Filtering Information on the Internet," Scientific American, Mar. 1997, pp. 62-64.
Resnick, P., et al., "Recommender Systems," Communications of the ACM, vol. 40, No. 3, Mar. 1997, pp. 56-58.
Richardson, D.W., Electronic Money: Evolution of an Electronic Funds-Transfer System, The MIT Press, 1970.
Rindfrey J., "Security in the World Wide Web," Fraunhofer Institute for Computer Graphics, Dec. 1996.
Rindfrey, Jochen, "Towards an Equitable System for Access Control and Copyright Protection in Broadcast Image Services; The Equicrypt Approach," Fraunhofer Institute for Computer Graphics.
Rivest, Ronald L., "The MD5 Message-Digest Algorithm," Network Working Group, Apr. 1992, pp. 1-21.
Rivest, Ronald L., et al., "A Method for Obtaining Digital Signatures and Public-Key Cryptosystems," Communications of the ACM, vol. 21, No. 2, Feb. 1978, pp. 120-126b.
Rivest, Ronald L., et al., "SDSI—A Simple Distributed Security Infrastructure", MIT and Microsoft Corporation, Apr. 30, 1996.
Roberts, R., et al., Compute!'s Computer Security, Compute! Publications, Inc., 1989.
Robinson et al., "Encoding Header Field for Internet Messages," Network Working Group RPC 1154, Apr. 1990.
Rose et al., "Structure and Identification of management Information for TCP/IP-based Internets," Network Working Group RFC 1155, May 1990.
Rosenberry, W., et al., "Distributing Applications Across DCE and Windows NT," 1993.
Rosenberry, W., et al., Understanding DCE, O'Reilly & Associates, Inc., 1992.
Rosenthal, Doug, "EINet: A secure, Open Network for Electronic Commerce", IEEE, 1994.
Ross, P.E., "Cops versus robbers in cyberspace," Forbes, Sep. 9, 1996.
Rouaix, F., "A Web Navigator with Applets in Cami," INRIA.
Rozenblit, Moshe, "Secure Software Distribution", IEEE 0-7803-1811-0/94, 1994.
RSA Enters Wireless Arena, RSA Security News, viewed at <http://rsasecurity.com/news/pr/940112-6.html.>, dated Jan. 12, 1994, pp. 1-2.
RSA Security; News; <http://rsasecurity.com/news/pr/9401.html.>, dated Jan. 12, 1994, pp. 1-2.
RSA's Developer's Suite for Secure Electronic transactions (SET), S/PAY, RSA Data Security, Inc., 1997.
rubin et al., "Formal Methods for he Analysis of Authentication Protocols CITI Technical Report 93-7," Center for Information Technology Integration, Nov. 8, 1993.
Rubin et al., "Long Running Jobs in an Authenticated Environment" CITI Technical Report 93-1, Center for Information Technolody Integration, Mar. 1993.
Rubin, A.D., "Trusted Distribution of Software Over the Internet," Bellcore, 1995, pp. 1-9.
Rucker, et al., "Personalized Navigation for the Web," Communications of the ACM, pp. 73-75, Mar. 1997.
Rushby, J.M., "Design and Verification of Secure Systems," ACM, 1981, pp. 12-21.
Russell, D., et al., Computer Security Basics, O'Reilly & Associates, Inc., 1991.

Russell, S., "Paradigms for Verification of Authorization at Source of Electronic Documents in an Integrated Environment", Computers & Security, vol. 12, No. 6, 1993, pp. 542-549.
Russell, S., "Planning for the EDI of Tomorrow Using Electronic Document Authorization," Computer Security (A-37), 1993, pp. 243-251.
Sammer et al., "New Tools for the Internet," Jeanneum Research, Graz University of Technology.
Sander, T. et al., "Protecting Mobile Agents Against Malicious Hosts," Mobile Agents and Security: Lecture Notes in Computer Science, Springer-Verlag, G. Vigna, Ed., vol. 1419, No. 11, 1997, 16 pages.
Sander, T. et al., "Towards Mobile Cryptography," IEEE Proceedings of Security and Privacy, May 1998, 10 pages.
Sandhu, Ravi S., "The Typed Access Matrix Model," Proceedings of the IEEE Symposium on Security and Privacy, Oakland California, May 4-6, 1992, pp. 122-136.
Sandhu, Ravi, S., et al., "A Secure Kernelized Archecture for Multilevel Object-Oriented Databases," Proceedings of the IEEE Computer Security Foundations Workshop IV, Jun. 1991, Franconia, NH, pp. 139-152.
Sandhu, Ravi S., et al., "Data and Database Security and Controls," Handbook of Information Security Management, Auerbach Publishers, 1993, pp. 1-37.
Sandhu, Ravi, S., et al., "Implementation Considerations for the Typed Access Matrix Model in a Distributed Environment," Proceedings of the 15th NIST-SCSC National Computer Security Conference, Baltimore, Maryland, Oct. 1992, pp. 221-235.
Saydjari, O.S., et al., "LOCK Trek: Navigating Unchartered Space," National Computer security Center, 1989, pp. 167-175.
Schaumüller-Bichl, S., "IC-Cards in High-Security Applications," Voest-Alpine AG, (undated), pp. 177-199.
Schill, A.B., et al., "DC++: Distributed Object-Oriented System Support on top of OSF DCE," 1993.
Schill, A.B., et al., "DCE-The OSF Distributed Computing Environment Client Server Model and Beyond," Oct. 1993.
Schill, A.B., et al., "Mobility Aware Multimedia X. 400 e-mail: A Sample Application Based on a Support Platform for Distributed Mobile Computing," Dresden University of Technology, Faculty of Computer Science, (undated), pp. 1-7.
Schneier, B., "Description of New Variable-Length Key, 64-bit block cipher (Blowfish)," Fast Software Encryption, Cambridge Security Workshop Proceedings, 1994.
Schneier, Bruce, Applied Cryptography: Protocols, Algorithms, and Source Code in C, John Wiley & Sons, Inc., 1994.
Schulze, Dr. J., "Case of Application of the Generic CITED Model to the CITEDisation in the Software Distribution Process," ESPIRIT II, Project, Jan. 12, 1993.
Schutzer, D., "A Need for a Common Infrastructure: Digital Libraries and Electronic Commerce," Citibank, D-Lib Magazine, Arp. 1996.
Sebes, E.J., "Overview of the Architecture of Distributed Trusted Mach," (undated), pp. 1-10.
Sebes, E.J., et al., "The Architecture of Triad: A Distributed, Real-Time, Trusted System," (undated), pp. 1-12.
Sebes, E.J., et al., "The Triad System: The Design of a Distributed, Real-Time, Trusted System," (undated), pp. 1-12.
Secure Cryptographic Devices (retail)—Part I: Concepts, Requirements and Evaluation Methods, ISO 13491-1, Jun. 15, 1998.
Security Enhanced LINUX, National Security Agency, http://www.nsa.gov/selinux/, pp. 1-2.
Security in KeyKOS.
Security Requirements for Cryptographic Modules, U.S. Department of Commerce (NIST), Jan. 11, 1994, pp. 1-53.
Shaffer, S.L., et al., Network Security, Academic Press, Inc., 1994.
Shirley, J., "Guide to Writing DCE Applications," 1st Ed. 1992.
Shirley, J., et al., "Guide to Writing DCE Applications," 2nd Ed. 1994.
Short, K.L., Microprocessors and Programmed Logic, Prentice-Hall, Inc., 1981.
Sibert, Olin, et al., "The Intel 80×86 Processor Architecture: Pitfalls for Secure Systems," (undated), 12 pages.

SIGSALY Secure Digital Voice Communications in World War II, National Security Agency, http://www.nsa.gov/wwii/papers/sigsaly.htm, Oct. 13, 2000, pp. 1-2.

Simon et al., "Digital Images Protection Management in a Broadcast Framework: Overview/TALISMAN Solution," Thomson-CSF, RTBF, ART3000, UCL.

Sirbu et al., "NetBill: An Internet Commerce System Optimized for Network Delivered Services," Carnegie Mellon University.

Smart Card 1993 Conference Proceedings, "Day 1: Communications and Marketing Systems & Market Overview," Lowndes Exhibition Organisers, Ltd., 1993, pp. 1-79.

Smart Card Technology International: The Global Journal of Advanced Card Technology, Global Projects Group, undated, pp. 1-151.

Smith, Mary Grace, et al., "A New Set of Rules for Information Commerce: Rights-Protection Technologies and Personalized-Information Commerce Will Affect All Knowledge Workers", CommunicationsWeek, Nov. 6, 1995.

Solomon, A., PC Viruses: Detection, Analysis and Cure, Springer-Verlag, (undated).

Solomon, Daniel J., "Processing Multilevel Secure Objects," Proceedings of the 1981 Symposium on Security and Privacy, Apr. 27-29, 1981, Oakland, California, pp. 56-61.

Specification for Financial Message Exchange Between Card Acceptor and Acquirer, X9.15, American National Standard, American Banker's Association, 1990.

SSL 2.0 Protocol Specification, viewed at http://home.netscape.com/eng/security/SSL.2html, Jan. 23, 2003.

St. Johns, M., "Draft Revised IP Security Option", Network Working Group, RFC, 1038, Jan. 1998.

Stallings, W., Cryptography and Network Security: Principles and Practice, Prentice-Hall, Inc., 1999.

STARFISH State of the Art Financial Services for the in Habitants of Isolated Areas—Project Profile, Information Society technologies, time schedule, Jan. 21, 2000-Jun. 30, 2002.

Stefik, M., "Trusted Systems," Scientific American, Mar. 1997, pp. 78-81.

Stepney et al., "Formal specification of an Access Control System," Software-Practice and Experience, vol. 17, No. 9, 1987.

Strack, Hermann, "Extended Access Control in UNIX System V-ACLs and Context," Usenix Association, Proceedings of the Unix Security II Workshop, Aug. 27-28, 1990, Portland, Oregon, pp. 87-101.

Stubblebine, S.G., "Security Services for Multimedia Conferencing," Proceedings of the 16th National Computer Security Conference, Baltimore, Maryland, Sep. 20-23, 1993, pp. 1-5.

Swedlow, Tracy, "2000: Interactive Enhanced Television: A Historical and Critical Perspective," Interactive TV Today.

TALISMAN: Tracing Authors' Rights by Labeling Image Services and Monitoring Access Network, ACTS, Swiss Participation in European Research Programs, Sep. 1, 1995, Aug. 31, 1998.

Tanenbaum, A.S., et al., "Amoeba System," Communications of the ACM, vol. 33, No. 12, Dec. 1990.

Tanenbaum, A.S., et al., "Distributed Operating Systems," Computing Surveys, vol. 17, No. 4, Dec. 1985, pp. 419-470.

Tanenbaum, A.S., et al., "Experiences with the Amoeba Distributed Operating System," Vrije Universiteit and Centrum voor Wiskunde en Informatica, 1990.

Tanenbaum, A.S., et al., "The Amoeba Distributed Operating System," 1990.

Tanenbaum, A.S., et al., "The Amoeba Distributed Operating System-A Status Report," 1991.

Tanenbaum, A.S., et al., "Using Sparse Capabilities in a Distributed Operating System," Vrije Universiteit and Centre for Mathematics and Computer Science.

Tanenbaum, A.S., Modern Operating Systems, Prentice-Hall, Inc. 1992.

Tanenbaum, A.S., Operating Systems: Design and Implementation, Prentice-Hall, Inc. 1987.

Tardo et al., "Mobile Agent Security and Telescript," General Magic, Inc.

Technical Description: Pay-Per-View Copy Protection, Macrovision, Jun. 1994.

Technical Rationale Behind CSC-STD-003-85: Computer Security Requirements, http://www.radium.ncsc.mil/tpep/library/rainbow/CSC-STD-004-85.html, Jun. 25, 1985, pp. 1-40.

Technical Strategies for Protecting Intellectual Property in the Networked Multimedia Environment, IMA Intellectual Property Proceedings, vol. I Issue 1, Jan. 1994.

TELENET TELEtraining Platform (on NETworks)—Project Profile, Information Society Technologies, time schedule, Mar. 6, 2000-Mar. 30, 2000.

Telescript Security, BYTE.com, Oct. 1994.

The Armide Products, web page.

The First USENIX Workshop on Electronic Commerce Proceedings, New York, New York, Jul. 11-12, 1995, Usenix Association.

The Future of Cited: A Feasibility Study, ESPIRIT II, Project 5469, CITED Project Review, Apr. 15, 1994.

The PowerTV White Paper, powertv.com website, Oct. 11, 1996.

The Risks Digest, "Forum on Risks to the Public in Computers and Related Systems," vol. 15; Issue 39, Jan. 21, 1994, pp. 1-12.

The Risks Digest, "Forum on Risks to the Public in Computers and Related Systems," vol. 15; Issue 47, Feb. 9, 1994, pp. 1-12.

The Standard Business:Time for Change, European Commision DG111 Espirit Project 5th Consensus Forum, Nov. 3-4, 1998.

Think C: Object-Oriented Programming Manual, Symantec Corporation, 1989.

THINK Pascal: The Fastest Way to Finished Software, Symantec Corporation, 1990, pp. 93-123.

Thomas, R.K., et al., "Implementing the Message Filter Object-Oriented Security Model without Trusted Subjects," Proceedings of the IFIP Workshop on Database Security, Aug. 19-21, 1992, Vancouver, Canada, 21 pages.

Thompson, Victoria P., et al., "A Concept for Certification of an Army MLS Management Information System", Proceedings of the 16th National Computer Security Conference, Sep. 20-23, 1993.

Thor, "A Distributed Object-Oriented Database System," MIT.

Thuraisingham, M.B., "Mandatory Security in Object-Oriented Database Systems," OOPSLA '89 Proceedings, Oct. 1-6, 1989, pp. 203-210.

Thuraisingham, M.B., et al., "Parallel Processing and Trusted Database Management Systems," ACM, 1993.

Ting, T.C., et al., "Requirements, Capabilities and Functionalities of User Role Based Security for an Object-Oriented Design Model," Database Security, V: Status and Prospectus, 1992, pp. 275-297.

Tirkel, A.Z. et al., "Electronic Water Mark," (undated), 5 pages.

Toohey, J., Using OLE 2.X in Application Development, Que Corporation, 1994.

Townsend, J.E., "NIST on Internet Security," Mar. 22, 1994, pp. 1-15.

Trusted Unix Working Group (TRUSIX) Rationale for Selecting Access Control List Features for the UNIX (R) System, National Computer Security Center, Aug. 18, 1989.

Tuck, Bill, "Electronic Copyright Management Systems: Final Report of a Scoping Study for Elib," Jul. 1996.

TULIP Final Report, ISBN 0-444-82540-1, revised Sep. 18, 1996.

Uhler, Stephen A., "PhoneStation, Moving the Telephone onto the Virtual Desktop," 1993 Winter USENIX, San Diego, California, Jan. 25-29, 1993, pp. 131-140.

UniverCD: The InterActive, Online Library of Product Information From Cisco Systems, Cisco Systems 1993.

Unix System v. Release 3.2. Programmer's Guide. vol. II, AT&T, Prentice Hall, 1989.

van Gilluwe, F., The Undocumented PC: A Programmer's Guide to I/O, Cpus, and Fixed Memory Areas, Addison-Wesley Publishing Company, 1994.

van Schyndel, R.G., et al., "A Digital Watermark," (undated), 3 pages.

Van Slype, Georges et al, "The Future of CITED; a Feasibility Study," ESPRIT II, Project 5469, The CITED Consortium, Nov. 15, 1993.

Van Slype, Georges et al., "Natural Language Version of the Generic CITED Model, Ver. 4.2, vol. I: Presentation of the Generic Model," ESPRIT II, Project 5469, The CITED Consortium, May 8, 1995.

Van Slype, Georges et al., "The Future of CITED: A Feasibility Study, Ver. 1.0, vol. II: Full Report," ESPRIT II, Project 5469, The CITED Consortium, Feb. 28, 1994.
Van Slype, Georges, "Draft CITED Interchange Formats, Ver. 1.0", ESPRIT II, Project 5469, the CITED Consortium, Jan. 28, 1994.
Van Slype, Georges, "Knowledge Economy; Future Trends," CITED 5469.
Van Slype, Georges, "Natural Language Version of the Generic CITED Model, Ver. 2.1, vol. II ECMS (Electric Copyright Management System) Design for Computer Based Applications," ESPIRIT II, Project 5469, The CITED Consortium, May 8, 1995.
Van Slype, Georges, "PL4 RACE/ACCOPI Workshop on Conditional Access and Copyright Protection," ESPRIT II, Project 5469, Presentation of the CITED, Nov. 9, 1994.
Van Slype, Georges, "the CITED Approach, Ver. 4.0," ESPRIT II, Project 5469, The CITED Consoritum, Apr. 20, 1994.
Van Slype, Georges, "The Future of CITED: A Feasibility Study, Ver. 1.0, vol. I: Summary Report and Recommendations," ESPRIT II, Project 5469, The CITED Consortium, Feb. 28, 1994.
Van Slype, Georges, "The Future of CITED: A Feasibility Study, Ver. 1.1, vol. I: Summary Report and Recommendations," ESPRIT II, Project 5469, The CITED Consortium, Mar. 28, 1994.
Van Slype, Georges, "The Future of CITED: A Feasibility Study, Ver. 1.1, vol. III: Draft CITED Interchange Formats," ESPRIT II, Project 5469, The CITED Consortium, Feb. 28, 1994.
Vickers Benzel, T.C., et al., "Identification of Subjects and Objects in a Trusted Extensible Client Server Architecture," (undated), pp. 1-17.
Vittal, J., "Active Message Processing: Messages as Messengers," Bolt, Beranek and Newman, Inc., 1980, pp. 175-195.
Voydock, V.L., et al., "Security Mechanisms in High-Level Network Protocols," Computing Surveys, vol. 15, No. 2, Jun. 1983, pp. 135-171.
Wagner, N. "Fingerprinting," Drexel University, IEEE Symp. On Info. and Privacy, Apr. 1993.
Walker, Bruce, J., et al., Computer Security and Protection Structures, Dowden, Hutchinson, & Ross, Inc., 1977.
Walker, S., "Notes from RSA Data Security Conference," Jan. 18, 1994, pp. 1-3.
Ware, W., Chairman RAND Corporation "Panel: The InterTrust Commerce Architecture," 1997, 6 pages.
Wayner, P., "Agents Away," Byte.com, May 1994, pp. 1-9.
Wayner, Peter, Digital Copyright Protection, Academic Press, 1997.
Weadon, P.D., "The SIGSALY Story," Dec. 10, 2002.
Wells, Rob, Odyssey of Plastic Purchase; 20-Second Round Trip, Associated Press, Dec. 1993.
White, James E., "Telescript: The Foundation for the Electronic Marketplace", Ver. 5.0, General Magic, Inc., Nov. 30, 1993, pp. 1-13.
Willett, S., "Metered PCs: Is Your System Watching You?, Wave Systems Beta Tests New Technology," IDG Communications, Inc., May 2, 1994, pp. 1-6.
Williams, S., "An MSJ Interview with Microsoft's Chief Architect of OLE, Tony Williams," Microsoft Systems Journal, Oct. 1993, pp. 55-66.
Williams, Tony, "Microsoft Object Strategy", Microsoft PowerPoint Presentation, 1990.
Winslet et al., "Formal Query Languages for Secure Relational Databases," ACM Transactions on Database Systems, vol. 19, No. 4, Dec. 1994.
Wong, R., et al., "The SIDOS System: A Secure Distributed Operating System Prototype," Odyssey Research Associates, Oct. 1989, pp. 172-183.
Woo, Thomas, Y.C., et al., "A Framework for Distributed Authorization," Proceedings of the 1st Conference Computer and Communication Security, Nov. 1993, pp. 112-118.
Wood, P.H., et al., UNIX System Security, Pipline Associates, Inc., 1985.
Working with Windows Objects, Microsoft Press, OLE 2 Programmer's Reference; vol. 1, 1994.
Yee, B., et al., "Secure Coprocessors in Electronic Commerce Applications," Proceedings of the First Usenix Workshop on Electornic Commerce, New York, New York, Jul. 1995, 16 pages.
Young, W.D., "Verifiable Computer Security and Hardware: Issues," Technical Report, Computational Logic Inc., Sep. 1991, 43 pages.
Zeleznick, M.P., "Security Design in Distributed Computing Applications," Department of Computer Science, University of Utah, Dec. 1993, 16 pages.
Zelnick, Nate, "Keeping Business Safe on the Internet," PC Magazine, Apr. 25, 1995, pp. 1-2.
Zurko, M.E., "Panels at the 1997 IEEE Symposium on Security and Privacy," Oakland, CA, May 1997, 12 pages.
Birrell, Andrew D., et al., "A Global Authentication Service without Global Trust", Proc. IEEE Symp on Security and Privacy, Apr. 1986. [See, for example, pp. 18].
Department of Defense Standard, "Department of Defense Trusted Computer System Evaluation Criteria" DoD5200.28-STD, Dec. 1985, [See, for example, paragraphs 3.3, 4.1, 4.2 and 6].
Diffie, Whitfield, et al., "Authentication and Authenticated Key Exchanges", (1992 Kluwer Academic Publishers).
Diffie, Whitfield, "The First Ten Years of Public Key Cryptography," vol. 76, No. 5 (IEEE Proceedings. May 1988).
Everett, David, B., "Smart Card Tutorial" published in sections between Sep. 1992 and Sep. 1994 at http://www.smartcard.co.uk/resources/tutorials/. [See, for example, parts 2, 9-24 and 26].
Frederick, Keith P., "Certification and Accreditation Approach". Proceedings of the 16th National Computer Security Conference, Sep. 20-23, 1993 [See, for example, pp. 266 and 270-271].
Fuchsberger, Andreas, et al., "Public-key Cryptography on Smart Cards", Lecture Notes in Computer Science, 1995, pp. 250-269 [See, e.g., pp. 265-266].
Gasser, Morrie, et al., "The Digital Distributed System Security Architecture", 1989 [See, for example, pp. 1-5, 7-9 and 12].
Kaner, Cem, "Testing Computer Software", New York, van Nostrand Reinhold, 1993.
Kim, Gene H., et al., "The Design and Implementation of Tripwire: A File System Integrity Checker", Purdue Technical Report CSD-TR-93-071, Nov. 19, 1993. [See, for example, pp. 1-6, Fig. 1, and paragraphs 4.4, 5.1 and 5.3.
Kim, Gene H., et al., "Writing, Supporting, and Evaluating Tripwire: A Publicly Available Security Tool". Purdue Technical Report CSD-TR-91—019. Mar. 12, 1991. [See, for example, paragraphs 1.1, 1.2. 2.2, 3.1, 3.2, 3.3, and 4.1].
Lampson, Butler W., "Protection", ACM Operating Systems Rev. 8, 1 (Jan. 1974). [See, for example, pp. 2-9].
Lampson, Butler W., "Personal Distributed Computing: The Alto and Ethernet Software" 1988. [See, for example, section title "Communication"].
Merkle, Ralph C., "Protocol for Public Key Cryptosystems", Proc. of IEEE Symp. on Security and Privacy, pp. 122-134, 1980. [See, for example, pp. 122-131 J.
"Microsoft and Verisign Provide First Technology for Secure Downloading of Software over the Internet, 20 Software Vendors Lead Industry in Adopting Microsoft Authenticode", Verisign Press Release, Technology, Aug. 7, 1996.
National Institute of Standards and Technology, "Capstone Chip Technology", Apr. 30, 1993.
Naccache, David, et al., "Cryptographic Smart Cards" IIEE Micro 16(3):14-24, Jun. 1996. [See, for example, pp. 1-2, 5 and 9-11].
Press, Jim, "A New Approach to Cryptographic Facility Design", ICL Technical Journal, 8(3), May 1993, pp. 492-505.
Rivest, R.L., et al., "A Method for Obtaining Digital Signatures and Public-Key CryptoSystems", Communications of the ACM. 21(2), pp. 120-126 (Feb. 1978). [See, for example, pp. 1-6).
Rouaix, Francois, "A Web navigator with applets in Cam]", May 8, 1996 [All sections relevant], and Rouaix, F., MMM Documentation V 0.30 beta, undated [See, for example, section titled "Applets"], and Rouaix, F., "Cami Applets in MMM", undated [See, for example, section titled "Security Issues"].
Rozenblit, Moshe, "Secure Software Distribution," 0-7803-1811-0/94 IEEE (1994). [See, for example, pp. 486-496].
Schneier, Bruce, "Applied Cryptography", Second Edition, Dec. 1995.[See, for example, pp. 47-74, 357-359, 367-368, 436-411, 466-474. 483-502 and 584-595].

Sibert, Olin, et al., DigiBox: A Self-Protecting Container for Information Commerce, Proceedings of the First USENIX Workshop on Electronic Commerce, New York, NY, Jul. 1995, 9 pages.

Sibert, Olin, et al., Securing the Content, Not the Wire, for Information Commerce, InterTrust Technologies Corporation, 1996, 12 pages.

Tardo, Joseph, "An Introduction to Safety and Security in Telescript". General Magic Inc., 1995.

Tardo, Joseph, et al. "Mobile Agent Security and Telescript", COMPCON Spring '96—41 st IEEE International Computer Conference, Feb. 25 to 28, 1996 [See, for example, paragraphs 1.0, 2.0, 5.0 to 8.2 and 10.0].

Thompson, Victoria, et al, "A Concept for Certification of an Army MLS Management Information System", Proceedings of the 16th National Computer Security Conference, Sep. 20-23, 1993 [See, for example, pp. 254-258).

Van Slype, Georges, "Natural Language Version of the Generic CITED model, vol. 1: Presentation of the generic model", Sep. 6, 1993. [See, for example, paragraphs 2.1.4, 2_1.5, 2.2.2, 2.2.3, 2.2.4, 2.2.6, 2.3.2.2, 2.3.2.3 and 2.3.2.4.

Van Slype, Georges, "Natural Language Version of the Generic CITED model, vol. 2: CITED usage monitoring system design for computer based applications", Sep. 6, 1993 [See, for example, paragraphs 2.1 and 2.3].

Zimmerman, Philip, Pretty Good Privacy: PGP User's Guide, revised Oct. 11, 1994. [See, for example, vol. 1, pp. 2, 4, 5, 7 ("Encrypting a Message to Multiple Recipients"), 10, 11, 14 and 16 and vol. 2, pp. 3, 6, 7, 8 and 21-29].

"Information Society Facing a Turning Point, Information Flood, How to Stand Against Flood of Copies," *Nikkei Byte*, 92:316-319, 1991.

Garrett et al., "Toward an electronic Copyright Management System," *J. of the Amer. Soc. for Info.*, 44(8):468-473, 1993.

Kozuka et al., "Electronic Magazine Editing Software for 3DO," *National Technical Report, Matsushita Electric Industrial Co., Ltd.*, 40(6):88-97, 1994.

Rosenblit, Moshe, "Secure Software Distribution," *IEEE Network Operations and Management Symposium*, 2:486-496, 1994.

Seki et al., "A Proposal for New Software Distribution System Using a Secret Code," *Research Report of Information Processing Societies*, 93(64):19-28, 1993.

Terada, Minoru, "Exhausting Software," *bit, Kyoritsu Shuppan Co., Ltd.*, 26(10):12-18, 1994.

Torii et al., "System Architecture for Super Distribution," *Technical Research Report of Institute of Electronics, Information and Communication Engineers*, 94(240):59-66, 1994.

Ueki et al., "Accounting Processing in Right Management Mechanism for Super Distribution," *Study Report of Information Processing Societies*, 90(1):1-10, 1990.

Abadi, M., et al., "Authentication and Delegation with Smartcards," Technical Report 67, DEC Systems Research Center, Oct. 1990, available at <http://citeseer.nj.nec.com/article/abadi92authentication.html>, pp. 1-19.

Blaze, M., "A Cryptographic file System for Unix," pre-print of paper for First ACM Conference on Computer and Communications Security, Fairfax, Virginia, Nov. 3-5, 1993, pp. 1-8.

Blaze, M., "Key Management in an Encrypting File System," Proc. Summer '94 USENIX Tech. Conference, Boston, MA. Jun. 1994, available at <http://www.usenix.org/publicaitons/libratry/proceedings/bos94/full_papers/blaze.asp>, pp. 1-12.

Castano, S., et al., *Database Security*, Addison-Wesley & Acm Press, 1995.

Champine, G., *MIT Project Athena: A Model for Distributed Campus Computing*, Digital Equipment Corporation, 1991.

Chaum, D., "Achieving Electronic Privacy," Scientific American, Aug. 1992, pp. 96-101.

Chaum, D., et al. "Wallet databases with observers," Ernest F. Brickell, editor, Advances in Cryptologt—CRYPTO '92, 12th Annual International Cryptology Conference, Santa Barbara, CA, Aug. 16-20, 1992, Proceedings, pp. 89-105.

Chaum, D., "Security Without Identification Card Computers to Make Big Brother Obsolete," Communications of the ACM, vol. 28., No. 10, Oct. 1985, pp. 1-24.

"List of Articles," <www.chaum.com/articles/list-of-articles.htm>, as on Aug. 23, 2002, 4 pages.

Choudhury, A.K., et al., "Copyright Protection for Electronic Publishing Over Computer Networks," AT&T Bell Laboratories, Murray Hill, N.J., submitted to IEEE Network Magazine, Jun. 1994, pp. 1-17.

Cox, B., "What if there is a Silver Bullet and the competition gets it first?" Journal of Object-Oriented Programming, Jun. 1992, available at <http://virtualschool.edu/cox/CoxWhatIfSilverBullet.html>, pp. 1-5.

CUPID Protocols and Services (Version 1): "an Architectural Overview," Nov. 1992, available at <http//www.cni.org/projects/CUPID>, 25 pages.

Custer, H. *Inside Windows NT*, Microsoft Press, Redmond WA, 1993.

Davies, D., et al., *Security for Computer Networks*, John Wiley & Sons, Inc., 1989.

Denning, D.E., *Cryptography and Data Security*, Addison-Wesley, 1982.

Denning, D. E., et al., "Data Security," 11 Computing Surveys, vol. 11, No. 3, Sep. 1979, pp. 227-249.

Denning, D. E., "Secure Personal Computing in an Insecure Network," Communications of the ACM, Aug. 1979, vol. 22, No. 8, pp. 476-482.

Ioannidis, J., et al., "The Architecture and Implementation of Network-Layer Security Under Unix," Fourth USENIX Security Symposium Proceedings (Oct.), USENIX, Berkeley, Calif. 1993, pp. 1-11.

Kohl, J., et al., The Kerberos Network Authentication Service (V 5), Network Working Group Request for Comments RFC-1510, Sep. 1993, pp. 1-104.

Kohl, U, et al., "Safeguarding Digital Library Contents and Protecting Documents Rather Than Channels," in *D-lib Magazine*, Sep. 1997, available at <http://www.dlib.org/dlib/september97/ibm/09lotspiech.html>, pp. 1-9.

Lampson, B., et al., "Authentication in Distributed Systems: Theory and Practice,"0 ACM Trans. Computer Systems, vol. 10, No. 4 (Nov. 1992), pp. 265-310.

Mori, R. et al., "Superdistribution The Concept and the Architecture," The Transactions of the IEICE, vol. E73, No. 7, Tokyo Japan, Jul. 1990, pp. 1133-1146.

Olivier, MS, et al., "A Taxonomy for Secure Object-oriented Databases," ACM Transactions on Database Systems, vol. 19, No. 1, Mar. 1994, pp. 3-46.

Olivier, MS, et al., "Building a Secure Database using Self-protecting Objects," Computers & Security, vol. 11, No. 3, pp. 259-271, 1992.

Olivier, MS, et al., "Secure Object-oriented Databases," Ph.D. Thesis, Rand Afrikaans University, Johannesburg, Dec. 1991, pp. 1 to xiv and 1-183.

Olivier, MS, et al., "DISCO: A Discretionary Security Model for Object-oriented Databases," in GG Gable and WJ Caelli, Eds., IT Security: The Need for International Cooperation, pp. 345-357, Elsevier Science Publishers B.V. (North Holland), 1992.

Coalition for Networked Information, Interactive Multimedia Association, John F. Kennedy School of Government, "Proceedings: Technological Strategies for Protecting Intellectual Property in the Networked Multimedia Environment," 1994, Journal of the Interactive Multimedia Association, available at <http://www.cni.org/docs/ima.ip-workshop>, 308 pages.

Siebert, O., et al. "Digibox: A Self-Protecting Container for Information Commerce," Proceedings of the First USENIX Workshop on Electronic Commerce, New York, NY, Jul. 1995, pp. 1-13.

Stefik, M., "Letting Loose the Light: Igniting Commerce in Electronic Publication," Xerox PARC, Palo Alto, CA, 1994-1995, 35 pages.

Stefik, M., "Letting Loose the Light: Igniting Commerce in Electronic Publication, in Internet Dreams: Archetypes, Myths, and Metaphors," Massachusetts Institute of Technology, 1996, pp. 219-253.

Stefik, M., Chapter 7, Classification in "Introduction to Knowledge Systems," Morgan Kaufmann Publishers, Inc., 1995, pp. 543-607.

Tygar, J.D., et al., "Cryptography: It's Not Just for Electronic Mail Anymore," CMU-CS-93-107, School of Computer Science Carnegie Mellon University, Pittsburgh, PA, Mar. 1, 1993, pp. 1-21.

Tygar, J.D., et al., "Dyad: A System for Using Physically Secure Coprocessors," School of Computer Science, Carnegie Mellon University, Pittsburgh, PA, pp. 1-41.

Tygar, J.D., et al., "Strongbox: A System for Self Securing Programs," CMU Computer Science: 25th Anniversary Commemorative, R. Rashid (ed.) Addison-Wesley, 1991.

White, J.E., "Telescript Technology: The Foundation for the Electronic Marketplace," General Magic, 1994.

Wobber, E., et al., "Authentication in the Taos Operating System," an extended version of a paper presented at the 14th ACM Symposium on Operating System Principles, Dec. 1993, pp. 1-38.

Cohen, F.B., "Operating System Protection Through Program Evolution," 8246 Computers & Security, No. 6, (Oxford, Great Britain) Oct. 1993, pp. 565-584.

Kohl, J., et al., "The Kerberos Network Authentication Service (V 5)," Network Working Group Request for Comments RFC-1510, Sep. 1993, pp. 1-104.

Haar, S.V., Document from the Internet: "PowerAgent Launches Commercial Service," Interactive Week, Aug. 4, 1997, 1 page.

Siebert, O., et al., "Securing the Content, Not the Wire, for Information Commerce," InterTrust Technologies Corporation, 1992, 12 pages.

Yellin, F., Document from the Internet: "Low Level Security in Java," Sun Microsystems, 1996, 8 pages.

HotJava™: "The Security Story," Document from the Internet: (undated) 4 pages.

"About the Digital Notary Service," Document from the Internet: info@surety.com>, (Surety Technologies), 1994-5, 6 pages.

"JAVASOFT, Frequently Asked Questions-Applet Security," Document from Internet: java@java.sun.com Jun. 7, 1996, 8 pages.

"News from The Document Company XEROX, Xerox Announces Software Kit for Creating 'Working Documents' with Dataglyphs" Document from Internet: Nov. 6, 1995, 13 pages.

"Sag's durch die Blume," Document from Internet: marit@schulung.netuse.de. (German), (undated), 5 pages.

"Information Society Facing a Turning Point, Information Flood, How to Stand Against Flood of Copeis," *Nikkei Byte*, 92:316-319, 1991.

Garrett et al., "Toward an electronic Copyright Management System," *J. of the Amer. Soc. for Info.*, 44(8):468-473, 1993.

Kozuka et al., "Electronic Magazine Editing Software for 3DO," *National Technical Report, Matsushita Electric Industrial Co., Ltd.*, 40(6):88-97, 1994.

Rosenblit, Moshe, "Secure Software Distribution," *IEEE Network Operations and Management Symposium*, 2:486-496, 1994.

Seki et al., "A Proposal for New Software Distribution System Using a Secret Code," *Research Report of Information Processing Societies*, 93(64):19-28, 1993.

Terada, Minoru, "Exhausting Software," *bit*, Kyoritsu Shuppan Co., Ltd., 26(10):12-18, 1994.

Torii et al., "System Architecture for Super Distribution," *Technical Research Report of Institute of Electronics, Information and Communication Engineers*, 94(240):59-66, 1994.

Ueki et al., "Accounting Processing in Right Management Mechanism for Super Distribution," *Study Report of Information Processing Societies*, 90(1):1-10, 1990.

* cited by examiner

FIG. 1 Defective or "Bogus" Load Modules Can Cause Problems

FIG. 2 Verifying Load Modules

FIG. 3 Before Protected Processing Environment Uses A Load Module, It Checks To See If Load Module Has Been Verified

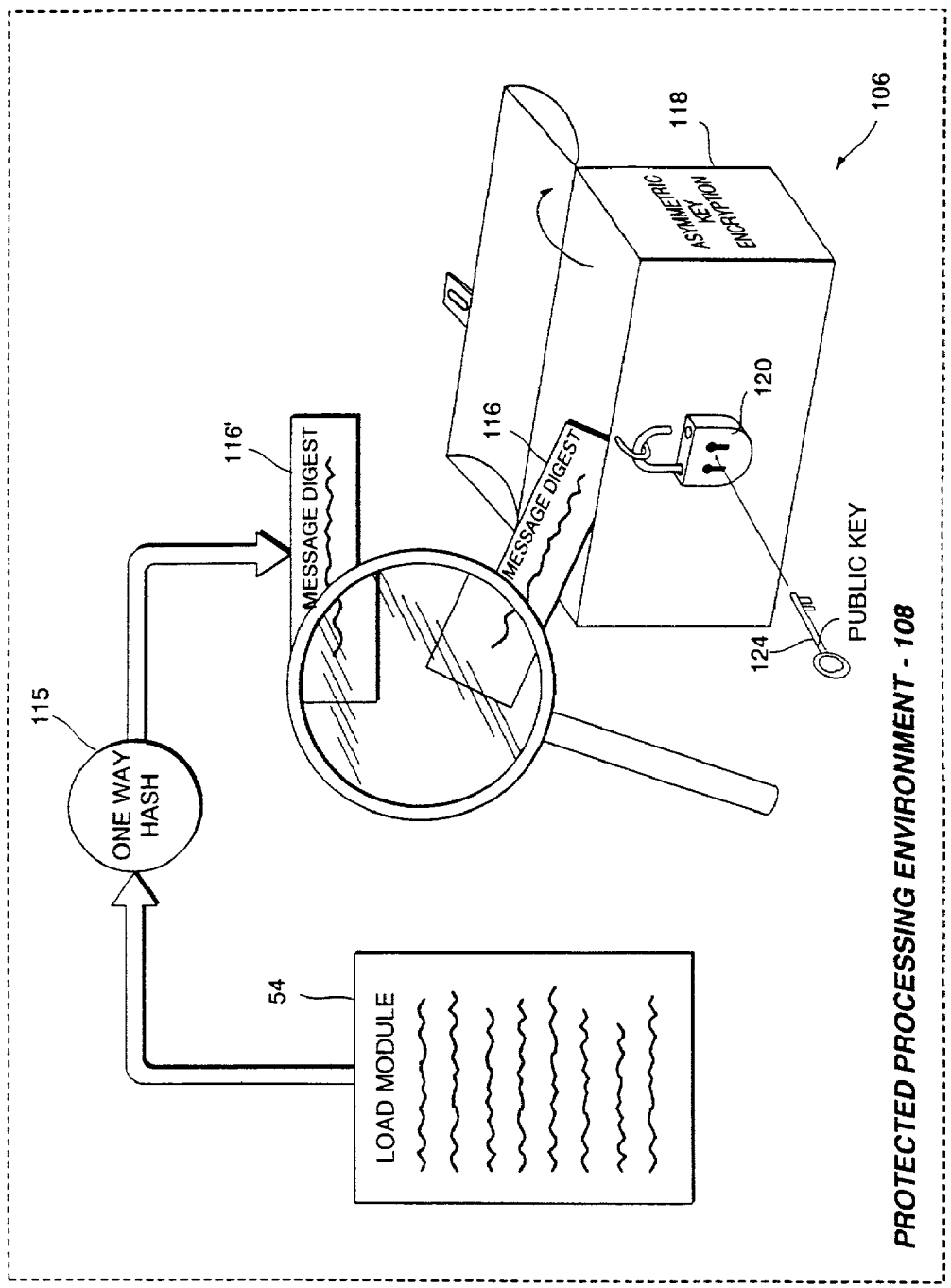
FIG. 6 Authenticating a Digital Signature

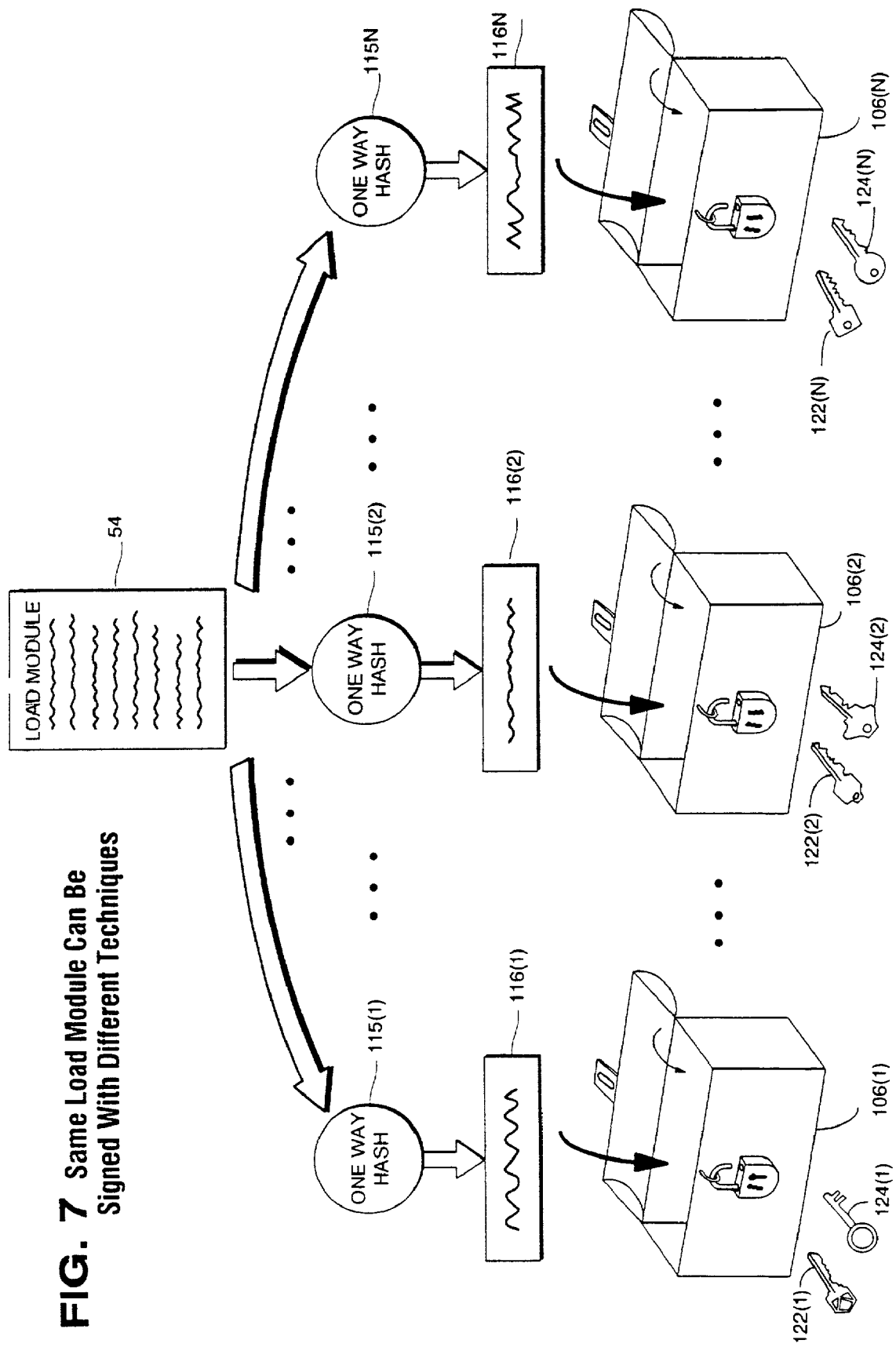
FIG. 7 Same Load Module Can Be Signed With Different Techniques

FIG. 8 Same Load Module Can Be Distributed with Multiple Signatures
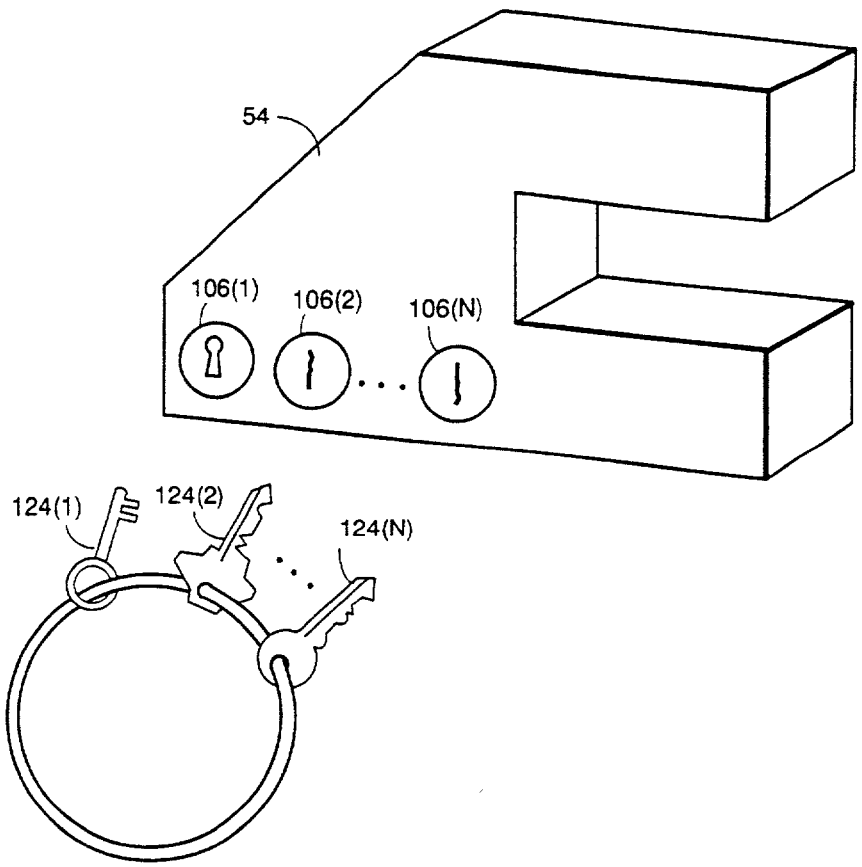
FIG. 8A Different Processing Environments Can Have Different Subsets of Keys
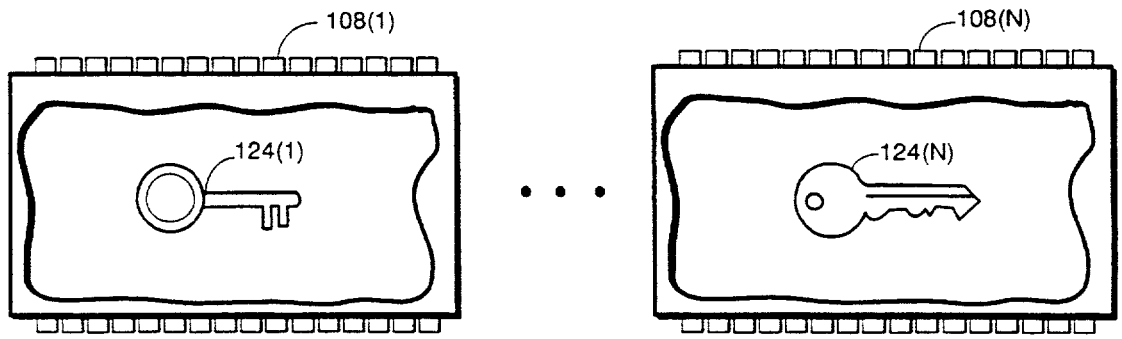

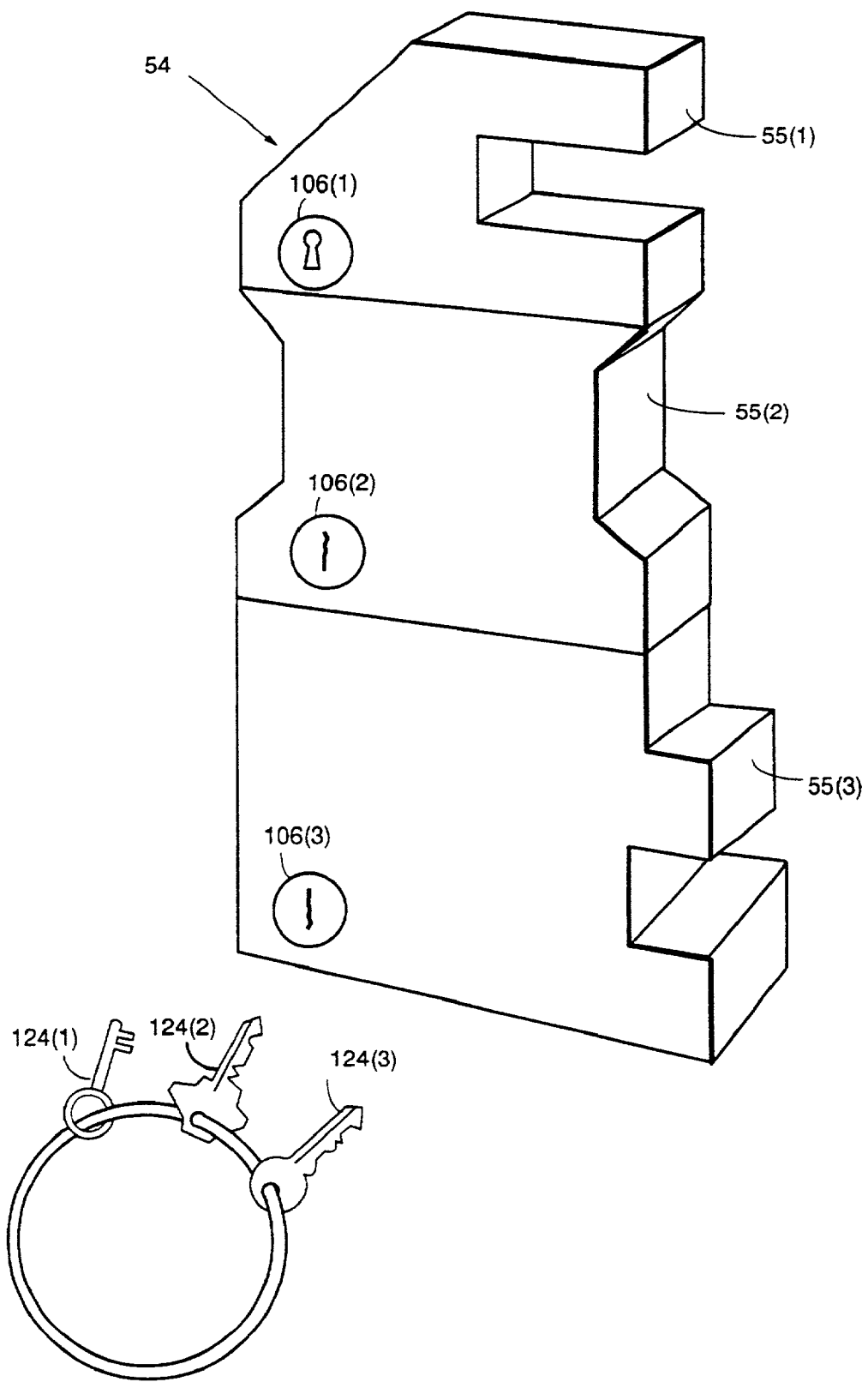
FIG. 9 Load Module Can Have Several Independently Signed Portions

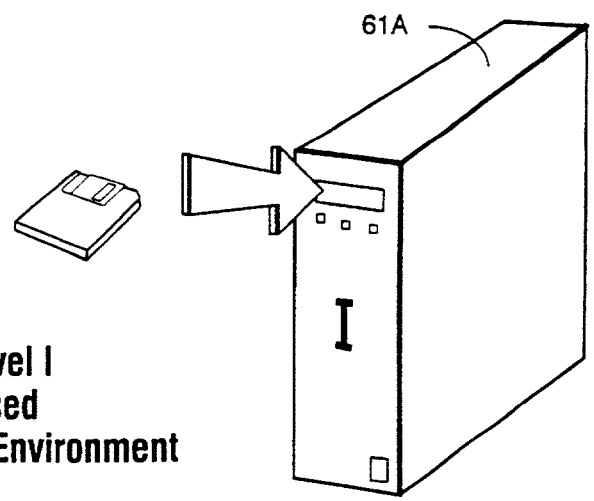
FIG. 10A Assurance Level I
Software-Based
Protected Processing Environment
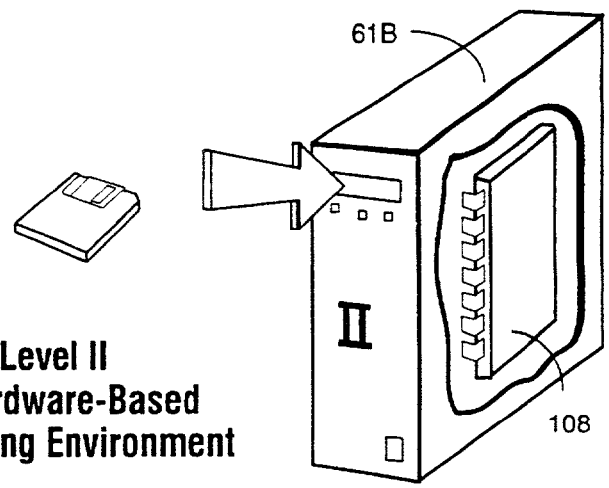
FIG. 10B Assurance Level II
Software and Hardware-Based
Protected Processing Environment
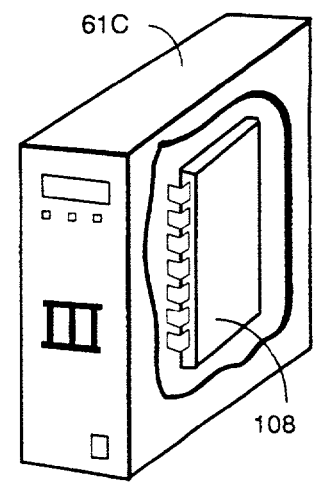
FIG. 10C Assurance Level III
Hardware-Based
Protected Processing Environment

FIG. 11A  Level I
Digital Signature
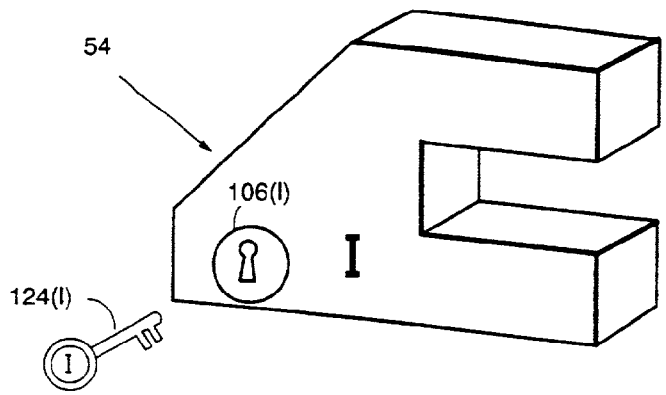
FIG. 11B  Level II
Digital Signature
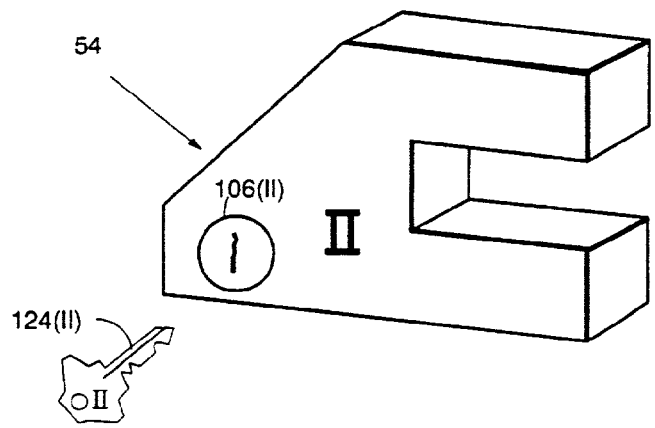
FIG. 11C  Level III
Digital Signature
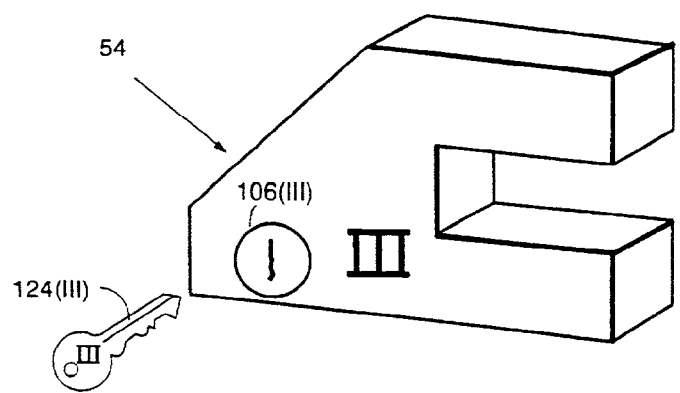

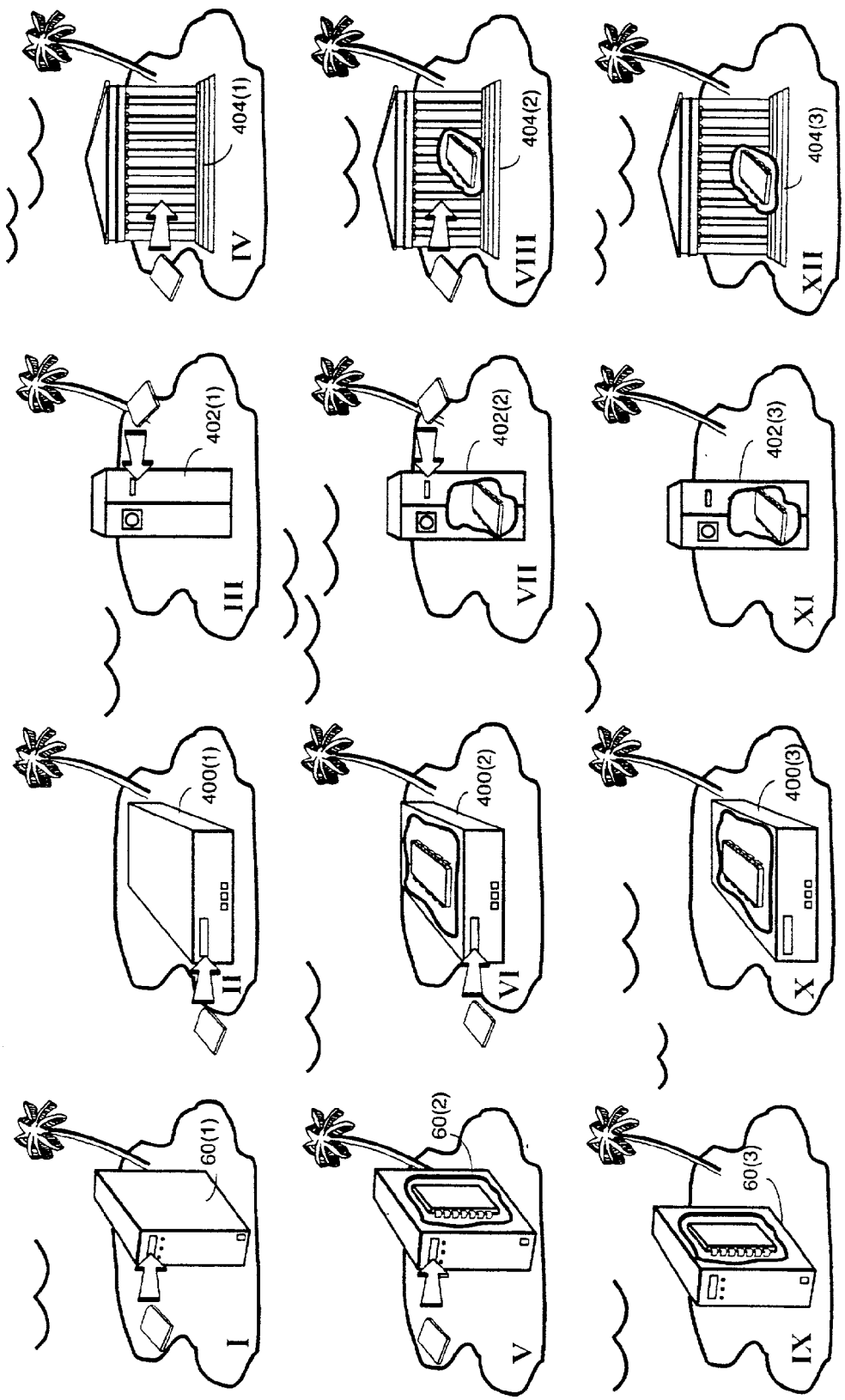
FIG. 12 Using Digital Signatures For Compartmentalizing Different Assurance Levels

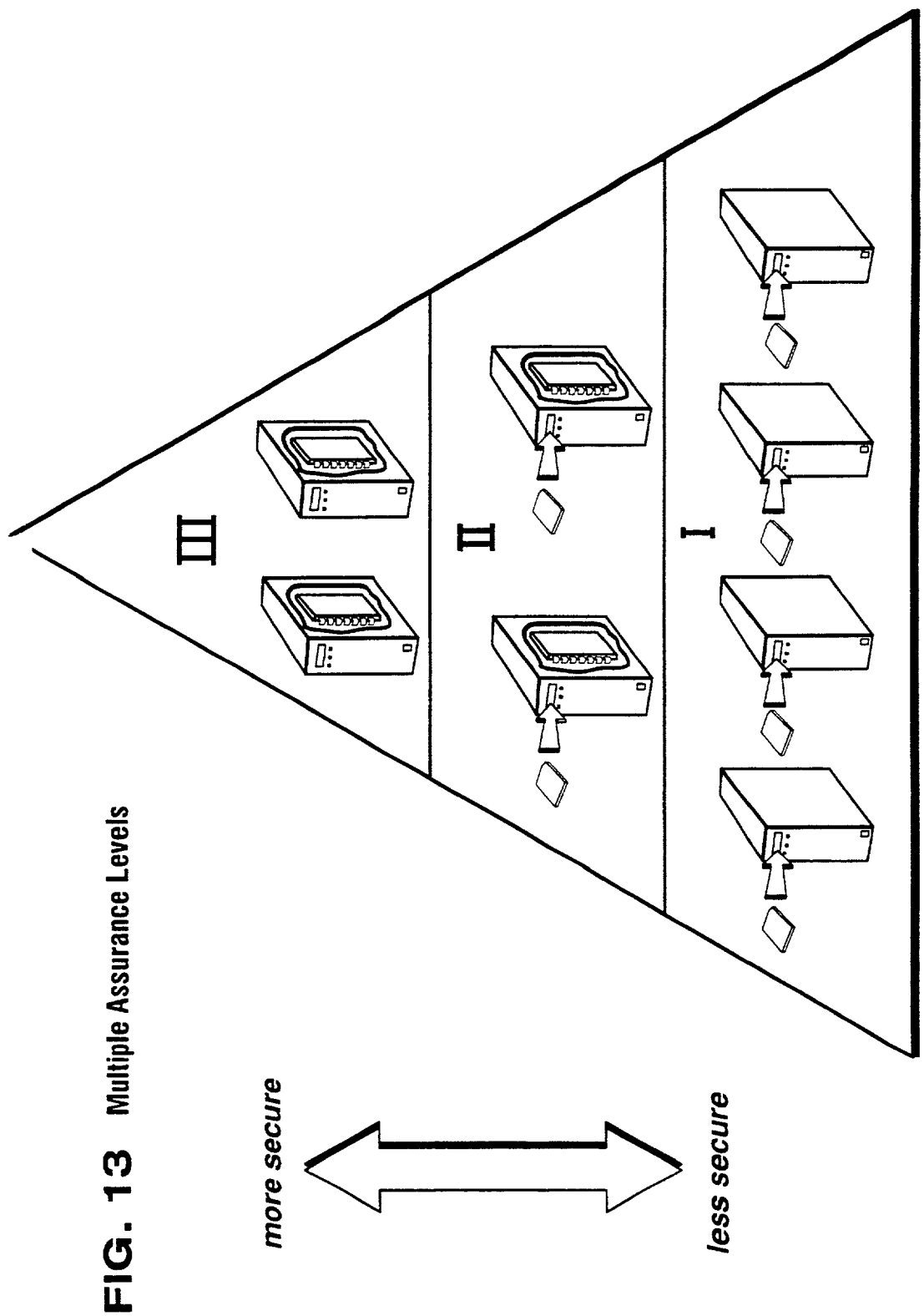
FIG. 13 Multiple Assurance Levels

SYSTEMS AND METHODS FOR USING CRYPTOGRAPHY TO PROTECT SECURE COMPUTING ENVIRONMENTS

CROSS REFERENCE TO RELATED APPLICATION

This is a continuation of application Ser. No. 09/678,830, filed Oct. 4, 2000 now U.S. Pat. No. 6,292,569, which is a continuation of application Ser. No. 08/689,754 filed Aug. 12, 1996, now U.S. Pat. No. 6,157,721, all of which are incorporated herein by reference.

This application is related to commonly assigned copending application Ser. No. 08/388,107 of Ginter et al., filed Feb. 13, 1995, entitled "SYSTEMS AND METHODS FOR SECURE TRANSACTION MANAGEMENT AND ELECTRONIC RIGHTS PROTECTION". We incorporate by reference, into this application, the entire disclosure of this prior-filed Ginter et al. patent application just as if its entire written specification and drawings were expressly set forth in this application.

FIELD OF THE INVENTION(S)

This invention relates to computer security, and more particularly to secure and/or protected computer execution environments. Still more specifically, the present invention relates to computer security techniques based at least in part on cryptography, that protect a computer processing environment against potentially harmful computer executables, programs and/or data; and to techniques for certifying load modules such as executable computer programs or fragments thereof as being authorized for use by a protected or secure processing environment.

BACKGROUND AND SUMMARY OF THE INVENTION(S)

Computers have become increasingly central to business, finance and other important aspects of our lives. It is now more important than ever to protect computers from "bad" or harmful computer programs. Unfortunately, since many of our most critical business, financial and governmental tasks now rely heavily on computers, dishonest people have a great incentive to use increasingly sophisticated and ingenious computer attacks.

Imagine, for example, if a dishonest customer of a major bank could reprogram the bank's computer so it adds to instead of subtracts from the customer's account—or diverts a penny to the customer's account from anyone else's bank deposit in excess of $10,000. If successful, such attacks would not only allow dishonest people to steal, but could also undermine society's confidence in the integrity and reliability of the banking system.

Terrorists can also try to attack us through our computers. We cannot afford to have harmful computer programs destroy the computers driving the greater San Francisco metropolitan air traffic controller network, the New York Stock Exchange, the life support systems of a major hospital, or the Northern Virginia metropolitan area fire and paramedic emergency dispatch service.

There are many different kinds of "bad" computer programs, which in general are termed "Trojan horses"—programs that cause a computer to act in a manner not intended by its operator, named after the famous wooden horse of Troy that delivered an attacking army disguised as an attractive gift. One of the most notorious kinds is so-called "computer viruses"—"diseases" that a computer can "catch" from another computer. A computer virus is a computer program that instructs the computer to do harmful or spurious things instead of useful things—and can also replicate itself to spread from one computer to another. Since the computer does whatever its instructions tell it to do, it will carry out the bad intent of a malicious human programmer who wrote the computer virus program—unless the computer is protected from the computer virus program. Special "anti-virus" protection software exists, but it unfortunately is only partially effective—for example, because new viruses can escape detection until they become widely known and recognized, and because sophisticated viruses can escape detection by masquerading as tasks the computer is supposed to be performing.

Computer security risks of all sorts—including the risks from computer viruses—have increased dramatically as computers have become increasingly connected to one another over the Internet and by other means. Increased computer connectivity provides increased capabilities, but also creates a host of computer security problems that haven't been fully solved. For example, electronic networks are an obvious path for spreading computer viruses. In October 1988, a university student used the Internet (a network of computer networks connected to millions of computers worldwide) to infect thousands of university and business computers with a self-replicating "worm" virus that took over the infected computers and caused them to execute the computer virus instead of performing the tasks they were supposed to perform. This computer virus outbreak (which resulted in a criminal prosecution) caused widespread panic throughout the electronic community.

Computer viruses are by no means the only computer security risk made even more significant by increased computer connectivity. For example, a significant percentage of the online electronic community has recently become committed to a new "portable" computer language called Java™ developed by Sun Microsystems of Mountain View, Calif. Java was designed to allow computers to interactively and dynamically download computer program code fragments (called "applets") over an electronic network such as the internet, and execute the downloaded code fragments locally. Java's "download and execute" capability is valuable because it allows certain tasks to be performed locally on local equipment using local resources. For example, a user's computer could run a particularly computationally or data-intensive routine—relieving the provider's computer from having to run the task and/or eliminating the need to transmit large amounts of data over the communications path.

While Java's "download and execute" capability has great potential, it raises significant computer security concerns. For example, Java applets could be written to damage hardware, software or information on the recipient computer, make the computer unstable by depleting its resources, and/or access confidential information on the computer and send it to someone else without first getting the computer owner's permission. People have expended lots of time and effort trying to solve Java's security problems. To alleviate some of these concerns, Sun Microsystems has developed a Java interpreter providing certain built-in security features such as:

a Java verifier that will not let an applet execute until the verifier verifies the applet doesn't violate certain rules, a Java class loader that treats applets originating remotely differently from those originating locally, a Java security manager that controls access to resources such as files and network access, and promised to come soon—the use of digital signatures for authenticating applets.

Numerous security flaws have been found despite these techniques. Moreover, a philosophy underlying this overall security design is that a user will have no incentive to compromise the security of her own locally installed Java interpreter—and that any such compromise is inconsequential from a system security standpoint because only the user's own computer (and its contents) are at risk. This philosophy—which is typical of many security system designs—is seriously flawed in many useful electronic commerce contexts for reasons described below in connection with the above-referenced Ginter et al. patent specification.

The Ginter et al. specification describes a "virtual distribution environment" comprehensively providing overall systems and wide arrays of methods, techniques, structures and arrangements that enable secure, efficient electronic commerce and rights management, including on the Internet or other "Information Super Highway."

The Ginter et al. patent disclosure describes, among other things, techniques for providing a secure, tamper resistant execution spaces within a "protected processing environment" for computer programs and data. The protected processing environment described in Ginter et al. may be hardware-based, software-based, or a hybrid. It can execute computer code the Ginter et al. disclosure refers to as "load modules." See, for example, Ginter et al. FIG. 23 and corresponding text. These load modules—which can be transmitted from remote locations within secure cryptographic wrappers or "containers"—are used to perform the basic operations of the "virtual distribution environment." Load modules may contain algorithms, data, cryptographic keys, shared secrets, and/or other information that permits a load module to interact with other system components (e.g., other load modules and/or computer programs operating in the same or different protected processing environment). For a load module to operate and interact as intended, it must execute without unauthorized modification and its contents may need to be protected from disclosure.

Unlike many other computer security scenarios, there may be a significant incentive for an owner of a Ginter et al. type protected processing environment to attack his or her own protected processing environment. For example:

the owner may wish to "turn off" payment mechanisms necessary to ensure that people delivering content and other value receive adequate compensation; or the owner may wish to defeat other electronic controls preventing him or her from performing certain tasks (for example, copying content without authorization); or the owner may wish to access someone else's confidential information embodied within electronic controls present in the owner's protected processing environment; or the owner may wish to change the identity of a payment recipient indicated within controls such that they receive payments themselves, or to interfere with commerce; or the owner may wish to defeat the mechanism(s) that disable some or all functions when budget has been exhausted, or audit trails have not been delivered.

Security experts can often be heard to say that to competently do their job, they must "think like an attacker." For example, a successful home security system installer must try to put herself in the place of a burglar trying to break in. Only by anticipating how a burglar might try to break into a house can the installer successfully defend the house against burglary. Similarly, computer security experts must try to anticipate the sorts of attacks that might be brought against a presumably secure computer system.

From this "think like an attacker" viewpoint, introducing a bogus load module is one of the strongest possible forms of attack (by a protected processing environment user or anyone else) on the virtual distribution environment disclosed in the Ginter et al. patent specification. Because load modules have access to internal protected data structures within protected processing environments and also (at least to an extent) control the results brought about by those protected processing environments, bogus load modules can (putting aside for the moment additional possible local protections such as addressing and/or ring protection and also putting aside system level fraud and other security related checks) perform almost any action possible in the virtual distribution environment without being subject to intended electronic controls. Especially likely attacks may range from straightforward changes to protected data (for example, adding budget, billing for nothing instead of the desired amount, etc.) to wholesale compromise (for example, using a load module to expose a protected processing environment's cryptographic keys). For at least these reasons, the methods for validating the origin and soundness of a load module are critically important.

The Ginter et al. patent specification discloses important techniques for securing protected processing environments against inauthentic load modules introduced by the computer owner, user, or any other party, including for example:

Encrypting and authenticating load modules whenever they are shared between protected processing environments via a communications path outside of a tamper-resistant barrier and/or passed between different virtual distribution environment participants;

Using digital signatures to determine if load module executable content is intact and was created by a trusted source (i.e., one with a correct certificate for creating load modules);

Strictly controlling initiation of load module execution by use of encryption keys, digital signatures and/or tags;

Carefully controlling the process of creating, replacing, updating or deleting load modules; and Maintaining shared secrets (e.g., cryptographic keys) within a tamper resistant enclosure that the owner of the electronic appliance cannot easily tamper with.

Although the Ginter et al. patent specification comprehensively solves a host of load module (and other) security related problems, any computer system—no matter how secure—can be "cracked" if enough time, money and effort is devoted to the project. Therefore, even a very secure system such as that disclosed in Ginter et al. can be improved to provide even greater security and protection against attack.

The present invention provides improved techniques for protecting secure computation and/or execution spaces (as one important but non-limiting example, the protected processing environments as disclosed in Ginter et al) from unauthorized (and potentially harmful) load modules or other "executables" or associated data. In one particular preferred embodiment, these techniques build upon, enhance and/or extend in certain respects, the load module security techniques, arrangements and systems provided in the Ginter et al. specification.

In accordance with one aspect provided by the present invention, one or more trusted verifying authorities validate load modules or other executables by analyzing and/or testing them. A verifying authority digitally "signs" and "certifies" those load modules or other executables it has verified (using a public key based digital signature and/or certificate based thereon, for example).

Protected execution spaces such as protected processing environments can be programmed or otherwise conditioned to accept only those load modules or other executables bearing a digital signature/certificate of an accredited (or particular) verifying authority. Tamper resistant barriers may be used to protect this programming or other conditioning. The assurance levels described below are a measure or assessment of the effectiveness with which this programming or other conditioning is protected.

A web of trust may stand behind a verifying authority. For example, a verifying authority may be an independent organization that can be trusted by all electronic value chain participants not to collaborate with any particular participant to the disadvantage of other participants. A given load module or other executable may be independently certified by any number of authorized verifying authority participants. If a load module or other executable is signed, for example, by five different verifying authority participants, a user will have (potentially) a higher likelihood of finding one that they trust. General commercial users may insist on several different certifiers, and government users, large corporations, and international trading partners may each have their own unique "web of trust" requirements. This "web of trust" prevents value chain participants from conspiring to defraud other value chain participants.

In accordance with another aspect provided by this invention, each load module or other executable has specifications associated with it describing the executable, its operations, content, and functions. Such specifications could be represented by any combination of specifications, formal mathematical descriptions that can be verified in an automated or other well-defined manner, or any other forms of description that can be processed, verified, and/or tested in an automated or other well-defined manner. The load module or other executable is preferably constructed using a programming language (e.g., languages such as Java and Python) and/or design/implementation methodology (e.g., Gypsy, FDM) that can facilitate automated analysis, validation, verification, inspection, and/or testing.

A verifying authority analyzes, validates, verifies, inspects, and/or tests the load module or other executable, and compares its results with the specifications associated with the load module or other executable. A verifying authority may digitally sign or certify only those load modules or other executables having proper specifications— and may include the specifications as part of the material being signed or certified.

A verifying authority may instead, or in addition, selectively be given the responsibility for analyzing the load module and generating a specification for it. Such a specification could be reviewed by the load module's originator and/or any potential users of the load module.

A verifying authority may selectively be given the authority to generate an additional specification for the load module, for example by translating a formal mathematical specification to other kinds of specifications. This authority could be granted, for example, by a load module originator wishing to have a more accessible, but verified (certified), description of the load module for purposes of informing other potential users of the load module.

Additionally, a verifying authority may selectively be empowered to modify the specifications to make it accurate—but may refuse to sign or certify load modules or other executables that are harmful or dangerous irrespective of the accuracy of their associated specifications. The specifications may in some instances be viewable by ultimate users or other value chain participants—providing a high degree of assurance that load modules or other executables are not subverting the system and/or the legitimate interest of any participant in an electronic value chain the system supports.

In accordance with another aspect provided by the present invention, an execution environment protects itself by deciding—based on digital signatures, for example—which load modules or other executables it is willing to execute. A digital signature allows the execution environment to test both the authenticity and the integrity of the load module or other executables, as well permitting a user of such executables to determine their correctness with respect to their associated specifications or other description of their behavior, if such descriptions are included in the verification process.

A hierarchy of assurance levels may be provided for different protected processing environment security levels. Load modules or other executables can be provided with digital signatures associated with particular assurance levels. Appliances assigned to particular assurance levels can protect themselves from executing load modules or other executables associated with different assurance levels. Different digital signatures and/or certificates may be used to distinguish between load modules or other executables intended for different assurance levels. This strict assurance level hierarchy provides a framework to help ensure that a more trusted environment can protect itself from load modules or other executables exposed to environments with different work factors (e.g., less trusted or tamper resistant environments). This can be used to provide a high degree of security compartmentalization that helps protect the remainder of the system should parts of the system become compromised.

For example, protected processing environments or other secure execution spaces that are more impervious to tampering (such as those providing a higher degree of physical security) may use an assurance level that isolates it from protected processing environments or other secure execution spaces that are relatively more susceptible to tampering (such as those constructed solely by software executing on a general purpose digital computer in a non-secure location).

A verifying authority may digitally sign load modules or other executables with a digital signature that indicates or implies assurance level. A verifying authority can use digital signature techniques to distinguish between assurance levels. As one example, each different digital signature may be encrypted using a different verification key and/or fundamentally different encryption, one-way hash and/or other techniques. A protected processing environment or other secure execution space protects itself by executing only those load modules or other executables that have been digitally signed for its corresponding assurance level.

The present invention may use a verifying authority and the digital signatures it provides to compartmentalize the different electronic appliances depending on their level of security (e.g., work factor or relative tamper resistance). In particular, a verifying authority and the digital signatures it provides isolate appliances with significantly different work factors—preventing the security of high work factor appliances from collapsing into the security of low work factor appliances due to free exchange of load modules or other executables.

Encryption can be used in combination with the assurance level scheme discussed above to ensure that load modules or other executables can be executed only in specific environments or types of environments. The secure way to ensure that a load module or other executable can't execute in a particular environment is to ensure that the environment doesn't have the key(s) necessary to decrypt it. Encryption can rely on multiple public keys and/or algorithms to transport basic key(s). Such encryption protects the load module or other executable from disclosure to environments (or assurance levels of environments) other than the one it is intended to execute in.

In accordance with another aspect provided by this invention, a verifying authority can digitally sign a load module or other executable with several different digital signatures and/or signature schemes. A protected processing environment or other secure execution space may require a load module or other executable to present multiple digital signatures before accepting it. An attacker would have to "break" each (all) of the several digital signatures and/or signature schemes to create an unauthorized load module or other executable that would be accepted by the protected processing environment or other secure execution space. Different protected processing environments (secure execution spaces) might examine different subsets of the multiple digital signatures—so that compromising one protected processing environment (secure execution space) will not compromise all of them. As an optimization, a protected processing environment or other secure execution space might verify only one of the several digital signatures (for example, chosen at random each time an executable is used)—thereby speeding up the digital signature verification while still maintaining a high degree of security.

BRIEF DESCRIPTION OF THE DRAWINGS

These and other features and advantages provided in accordance with this invention may be better and more completely understood by referring to the following detailed description of example preferred embodiments in conjunction with the drawings, of which:

FIG. 6 shows how a protected processing environment can securely authenticate a verifying authority's digital signature to guarantee the integrity of the corresponding load module;

FIG. 7 shows how several different digital signatures can be applied to the same load module;

FIG. 8 shows how a load module can be distributed with multiple digital signatures;

FIG. 8A shows how key management can be used to compartmentalize protected processing environments;

FIGS. 9 shows how a load module can be segmented and each segment protected with a different digital signature;

FIGS. 10A–10C show how different assurance level electronic appliances can be provided with different cryptographic keys for authenticating verifying authority digital signatures;

FIGS. 11A–11C show how a verifying authority can use different digital signatures to designate the same or different load modules as being appropriate for execution by different assurance level electronic appliances;

FIGS. 12, 13 and 13A show how assurance level digital signatures can be used to isolate electronic appliances or appliance types based on work factor and/or tamper resistance to reduce overall security risks.

DETAILED DESCRIPTION OF EXAMPLE EMBODIMENTS

Figure 1:
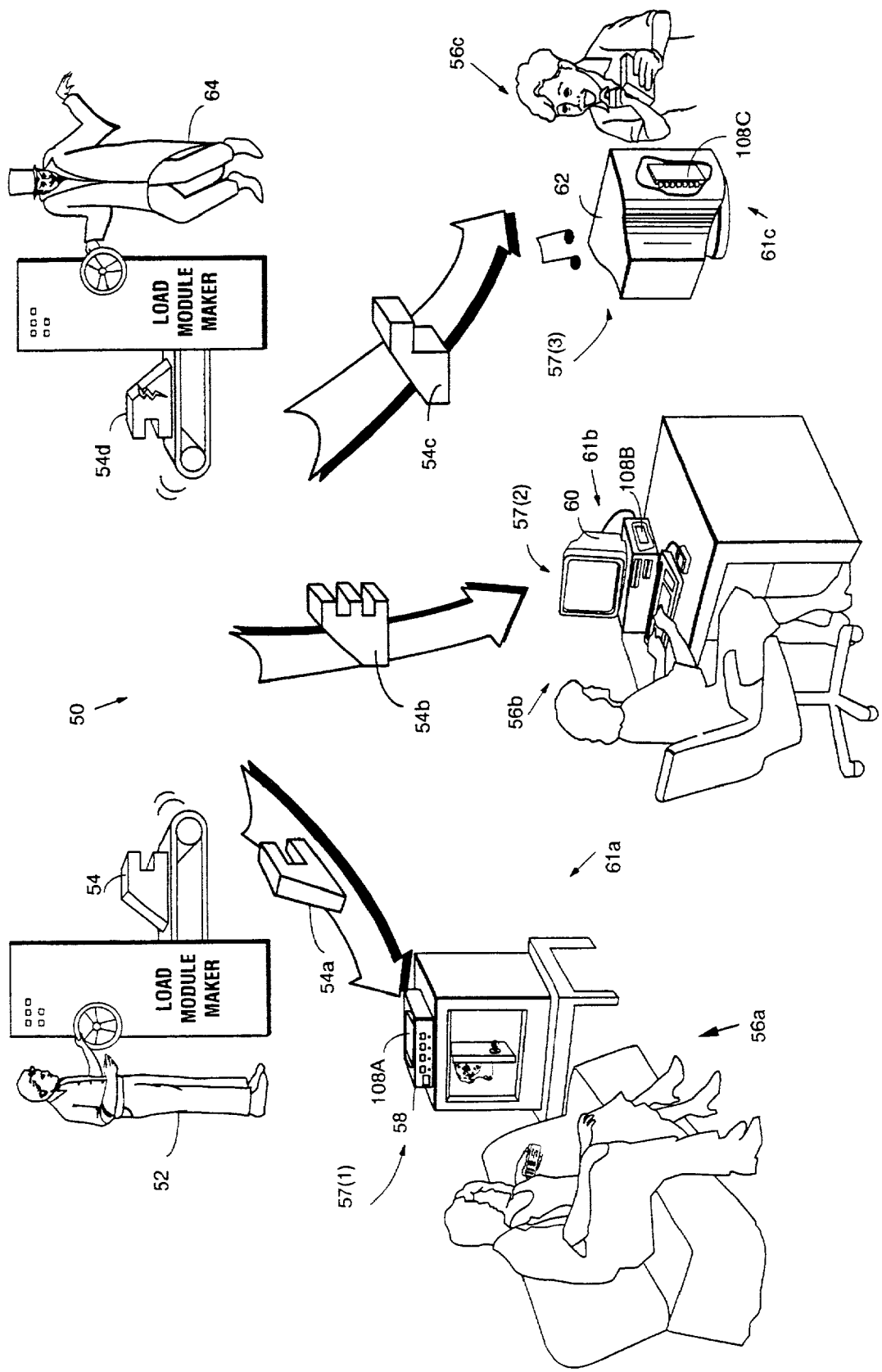
FIG. 1 illustrates how defective or bogus load modules can wreak havoc in the electronic community.

FIG. 1 shows how defective, bogus and/or unauthorized computer information can wreak havoc within an electronic system 50. In this example, provider 52 is authorized to produce and distribute "load modules" 54 for use by different users or consumers 56. FIG. 1 shows "load module" 54 as a complicated looking machine part for purposes of illustration only; the load module preferably comprises one or more computer instructions and/or data elements used to assist, allow, prohibit, direct, control or facilitate at least one task performed at least in part by an electronic appliance such as a computer. For example, load module 54 may comprise all or part of an executable computer program and/or associated data ("executable"), and may constitute a sequence of instructions or steps that bring about a certain result within a computer or other computation element.

FIG. 1 shows a number of electronic appliances 61 such as, for example, a set top box or home media player 58, a personal computer 60, and a multi-media player 62. Each of appliances 58, 60, 62 may include a secure execution space. One particular example of a secure execution space is a "protected processing environment" 108 of the type shown in Ginter et al. (see FIGS. 6–12) and described in associated text. Protected processing environments 108 provide a secure execution environment in which appliances 58, 60, 62 may securely execute load modules 54 to perform useful tasks. For example:

Provider 52 might produce a load module 54a for use by the protected processing environment 108A within set top box or home media player 58. Load module 54a could, for example, enable the set top box/home media player 58 to play a movie, concert or other interesting program, charge users 56a a "pay per view" fee, and ensure that the fee is paid to the appropriate rights holder (for example, the film studio, concert promoter or other organization that produced the program material).

Provider 52 might produce another load module 54b for delivery to personal computer 60's protected processing environment 108B. The load module 54b might enable personal computer 60 to perform a financial transaction, such as, for example, home banking, a stock trade or an income tax payment or reporting.

Provider 52 could produce a load module 54c for delivery to multi-media player 62's protected processing environment 108c. This load module 54c might allow user 56c to view a particular multi-media presentation while preventing the user from making a copy of the presentation—or it could control a portion of a transaction (e.g. a meter that records usage, and is incorporated into a larger transaction involving other load modules associated with interacting with a multi-media piece). (As described in the Ginter et al. specification, load modules associated with the financial portion of a transaction, for example, may often be self contained and independent).

FIG. 1 also shows an unauthorized and/or disreputable load module provider 64. Unauthorized provider 64 knows how to make load modules that look a lot like the load modules produced by authorized load module provider 52—but are defective or even destructive. Unless precautions are taken, the unauthorized load module 54d made by unauthorized producer 64 will be able to run on protected processing environments 108 within appliances 58, 60 and 62, and may cause serious harm to users 56 and/or to the integrity of system 50. For example:

unauthorized provider 64 could produce a load module 54d that is quite similar to authorized load module 54a intended to be used by set top box or home media player 58. The unauthorized load module 54d might allow protected processing environment 108A within set top box/home media player 58 to present the very same program material—but divert some or all of the user's payment to unauthorized producer 64—thereby defrauding the rights holders in the program material the users watch.

Unauthorized provider 64 might produce an unauthorized version of load module 54b that could, if run by personal computer 60's protected processing environment 108b, disclose the user 64b's bank and credit card account numbers to unauthorized provider 64 and/or divert electronic or other funds to the unauthorized provider.

Unauthorized provider 64 could produce an unauthorized version of load module 54c that could damage the protected processing environment 108c within multi media player 62—erasing data it needs for its operation and making it unusable. Alternatively, an unauthorized version of load module 54c could defeat the copy protection provided by multi media player 62's protected processing environment, causing the makers of multi media programs to lose substantial revenues through unauthorized copying—or defeat or alter the part of the transaction provided by the load module (e.g., billing, metering, maintaining an audit trail, etc.)

Figure 2:
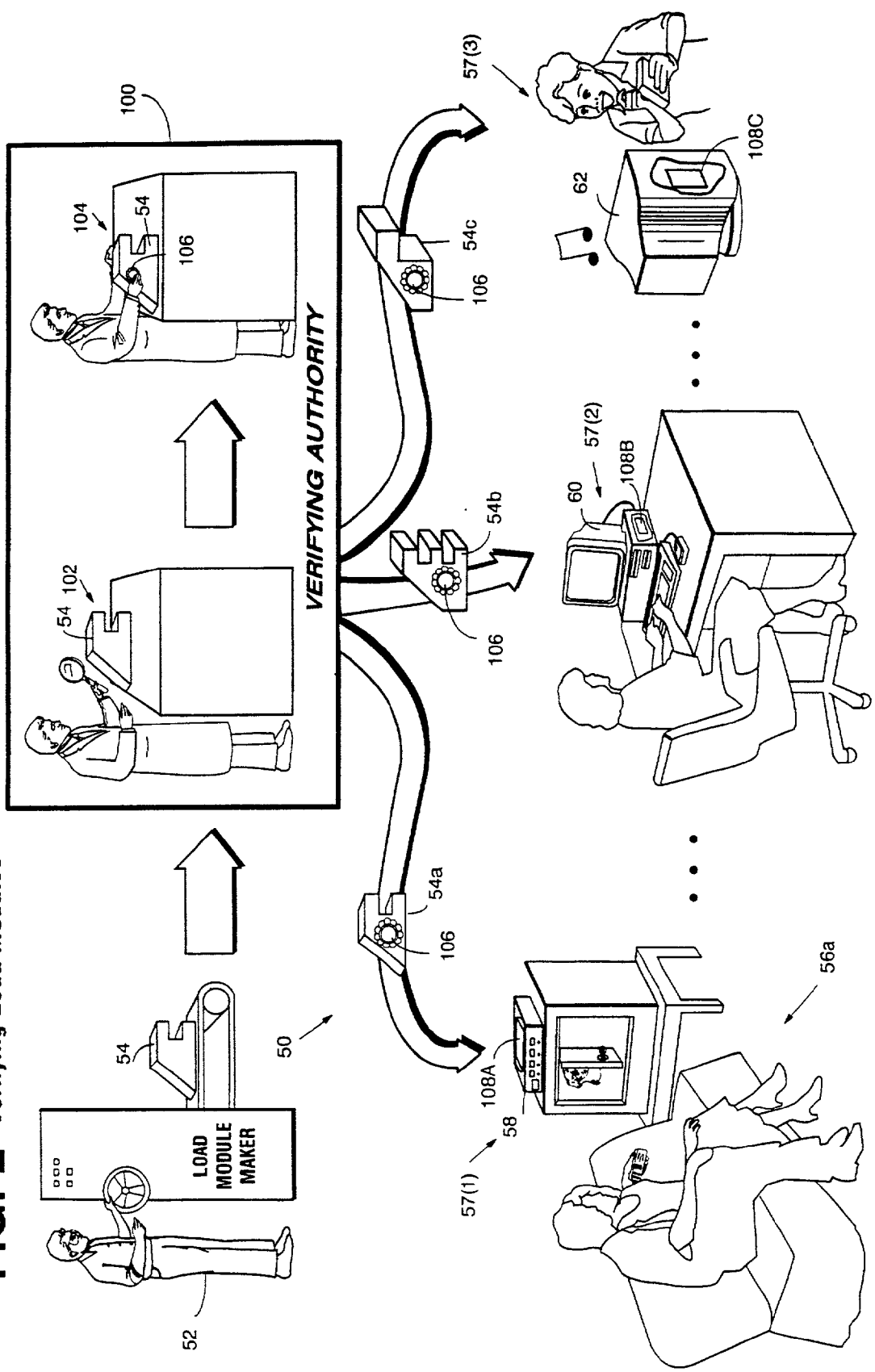
FIG. 2 shows an example verification authority that protects the electronic community from unauthorized load modules.

FIG. 2 shows how a verifying authority 100 can prevent the problems shown in FIG. 1. In this example, authorized provider 52 submits load modules 54 to verifying authority 100. Verifying authority 100 carefully analyzes the load modules 54 (see 102), testing them to make sure they do what they are supposed to do and do not compromise or harm system 50. If a load module 54 passes the tests verifying authority 100 subjects it to, a verifying authority may affix a digital "seal of approval" (see 104) to the load module.

Figure 3:
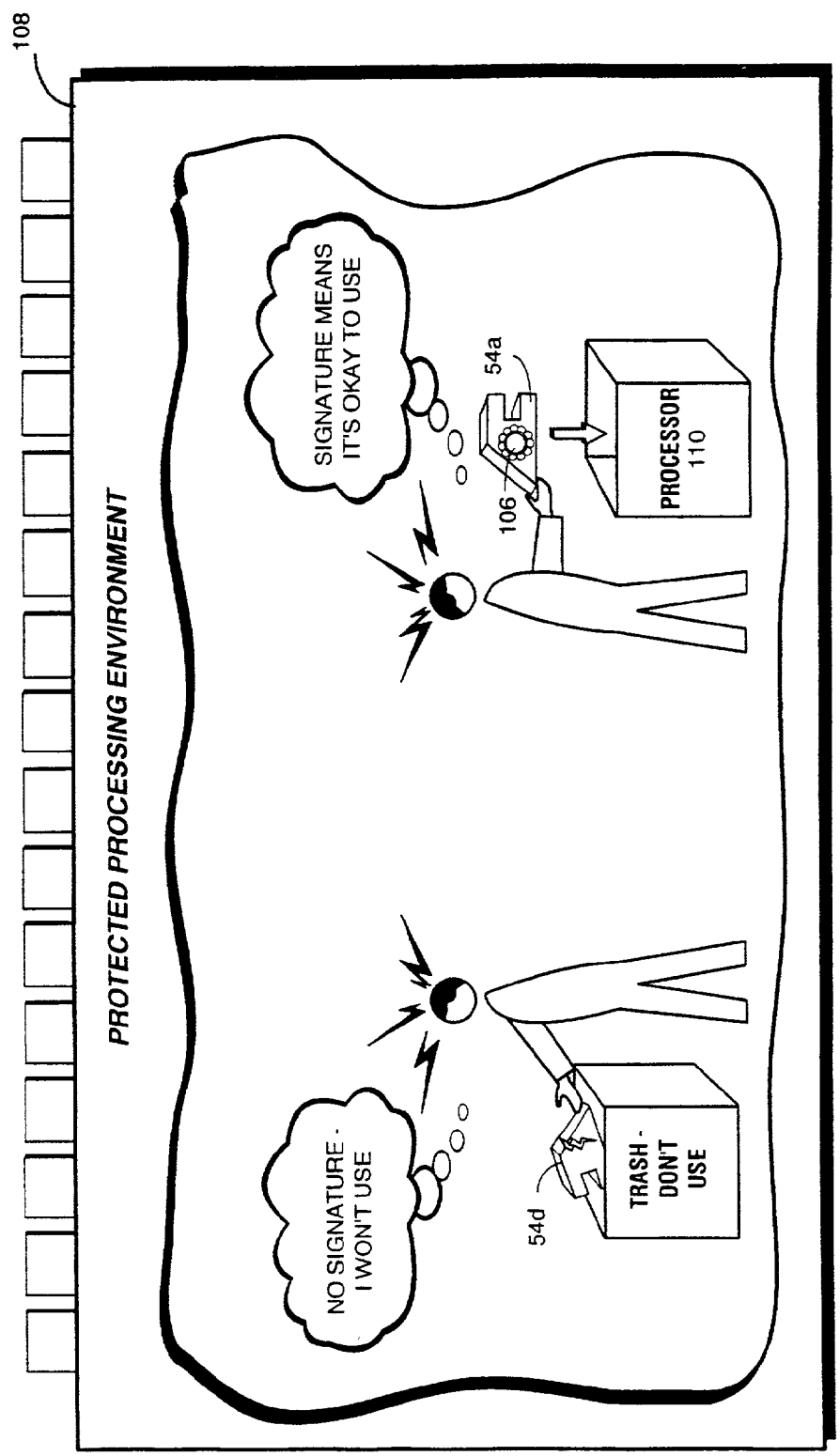
FIG. 3 shows how a protected processing environment can distinguish between load modules that have been approved by a verifying authority and those that have not been approved.

Protected processing environments 108 can use this digital "seal of approval" 106 (which may comprise one or more "digital signatures") to distinguish between authorized and unauthorized load modules 54. FIG. 3 illustrates how an electronic protected processing environment 108 can use and rely on a verifying authority's digital seal of approval 106. In this example, the protected processing environment 108 can distinguish between authorized and unauthorized load modules 54 by examining the load module to see whether it bears the seal of verifying authority 100. Protected processing environment 108 will execute the load module 54a with its processor 110 only if the load module bears a verifying authority's seal 106. Protected processing environment 108 discards and does not use any load module 54 that does not bear this seal 106. In this way, protected processing environment 108 securely protects itself against unauthorized load modules 54 such as, for example, the defective load module 54d made by disreputable load module provider 64.

Figure 4:
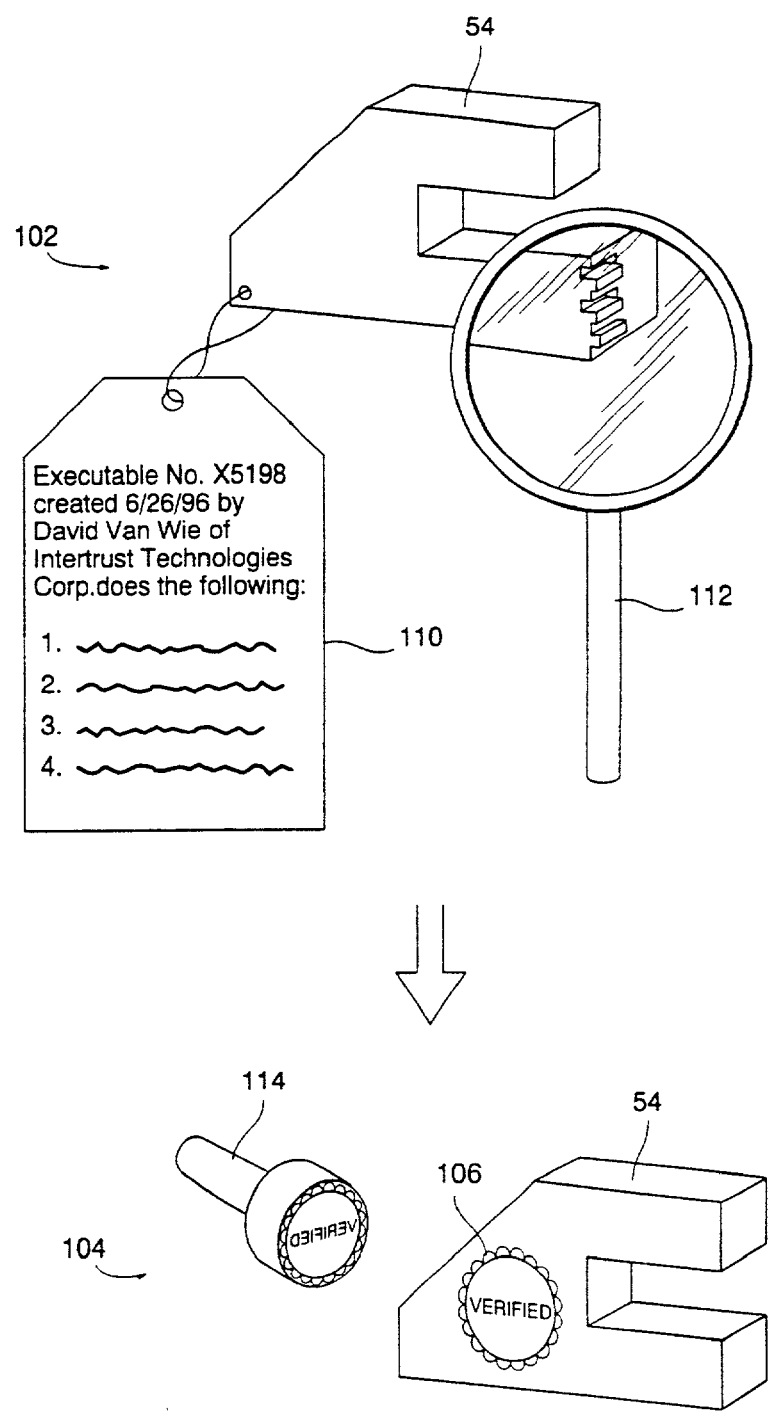
FIG. 4 shows an example process a verifying authority may perform to authenticate load modules.

FIG. 4 shows the analysis and digital signing steps 102, 104 performed by verifying authority 100 in this example. Provider 54 may provide, with each load module 54, associated specifications 110 identifying the load module and describing the functions the load module performs. In this example, these specifications 110 are illustrated as a manufacturing tag, but preferably comprises a data file associated with and/or attached to the load module 54.

Verifying authority 100 uses an analyzing tool(s) 112 to analyze and test load module 54 and determine whether it performs as specified by its associated specifications 110—that is, whether the specifications are both accurate and complete. FIG. 4 illustrates an analysis tool 112 as a magnifying glass; verifying authority 100 may not rely on visual inspection only, but instead preferably uses one or more computer-based software testing techniques and/or tools to verify that the load module performs as expected, matches specifications 110, is not a "virus," and includes no significant detectable "bugs" or other harmful functionality. See for example Pressman, *Software Engineering: A Practitioner's Approach* (3d Ed., McGraw-Hill 1992) at chapters 18 and 19 ("Software Testing Techniques") (pages 595–661) and the various books and papers referenced there. Although it has been said that "testing can show only the presence of bugs, not their absence," such testing (in addition to ensuring that the load module 54 satisfies its specifications 110) can provide added degrees of assurance that the load module isn't harmful and will work as it is supposed to.

Verifying authority 100 is preferably a trusted, independent third party such as an impartial, well respected independent testing laboratory. Therefore, all participants in an electronic transaction involving load module 54 can trust a verifying authority 100 as performing its testing and analysis functions competently and completely objectively and impartially. As described above, there may be several different verifying authorities 100 that together provide a "web of trust". Several different verifying authorities may each verify and digitally sign the same load module—increasing the likelihood that a particular value chain participant will trust one of them and decreasing the likelihood of collusion or fraud. Electronic value chain participants may rely upon different verifying authorities 100 to certify different types of load modules. For example, one verifying authority 100 trusted by and known to financial participants might verify load modules relating to financial aspects of a transaction (e.g., billing), whereas another verifying authority 100' trusted by and known to participants involved in using the "information exhaust" provided by an electronic transaction might be used to verify load modules relating to usage metering aspects of the same transaction.

Once verifying authority 100 is satisfied with load module 54, it affixes its digital "seal of approval" 106 to the load module. FIG. 4 illustrates the digital sealing process as being performed by a stamp 114—but in the preferred embodiment the digital sealing process is actually performed by creating a "digital signature" using a well known process. See Schneier, *Applied Cryptography* (2d Ed. John Wiley & Sons 1996) at Chapter 20 (pages 483–502). This digital signature, certificate or seal creation process is illustrated in FIG. 5.

Figure 5:
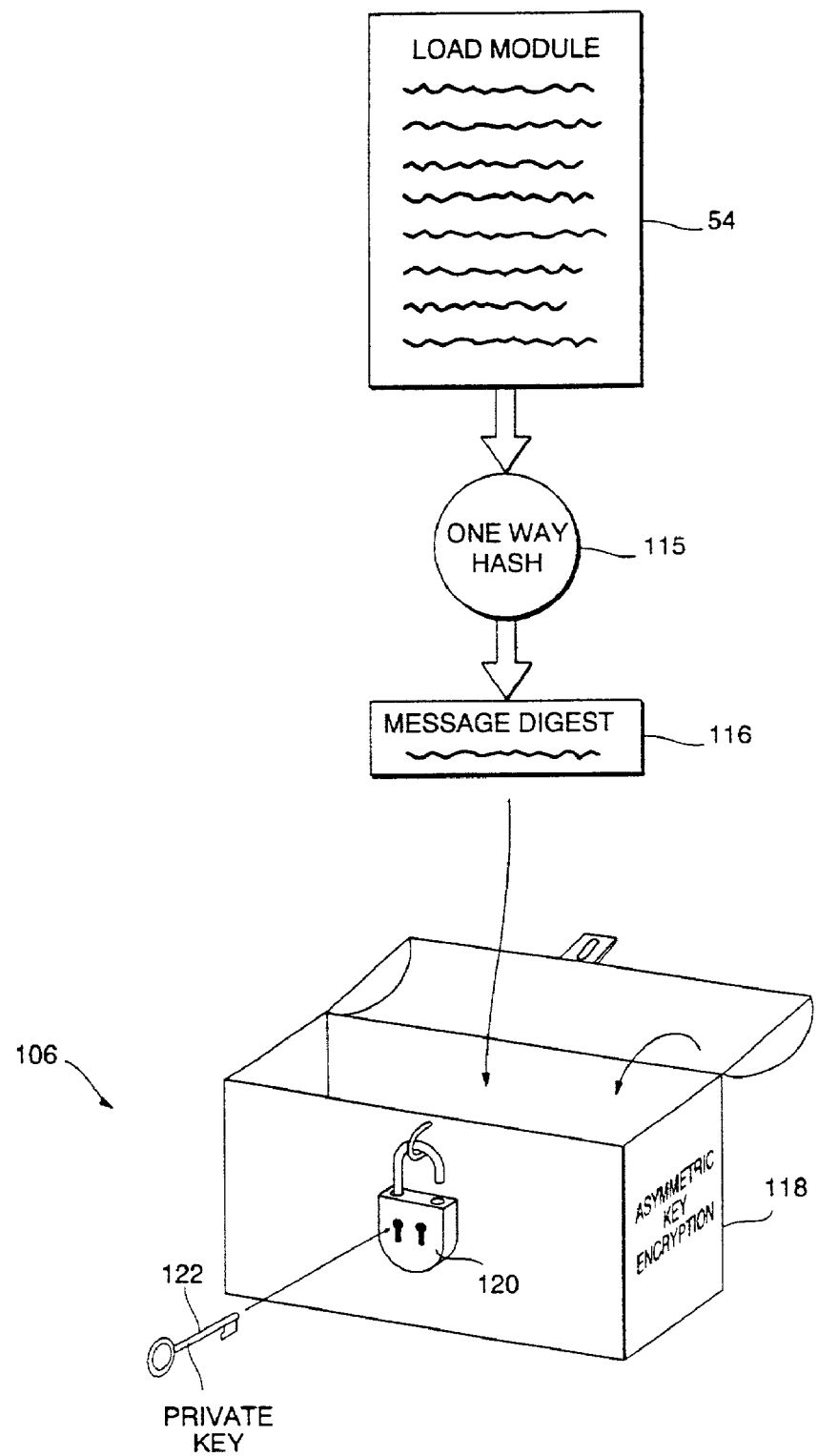
FIG. 5 shows how a verifying authority can create a certifying digital signature.

In the FIG. 5 process, load module 54 (along with specifications 110 if desired) is processed to yield a "message digest" 116 using a conventional one-way hash function selected to provide an appropriate resistance to algorithmic attack. See, for example, the transformation processes discussed in the Schneier text at Chapter 18, pages 429–455. A one-way hash function 115 provides a "fingerprint" (message digest 116) that is unique to load module 54. The one-way hash function transforms the contents of load module 54 into message digest 116 based on a mathematical function. This one-way hash mathematical function has the characteristic that it is easy to calculate message digest 116 from load module 54, but it is hard (computationally infeasible) to calculate load module 54 starting from message digest 116 and it is also hard (computationally infeasible) to find another load module 54' that will transform to the same message digest 116. There are many potential candidate functions (e.g., MD5, SHA), families of functions (e.g., MD5, or SHA with different internal constants), and keyed functions (e.g., message authentication codes based on block ciphers such as DES) that may be employed as one-way hash functions in this scheme. Different functions may have different cryptographic strengths and weaknesses so that techniques which may be developed to defeat one of them are not necessarily applicable to others.

Message digest 116 may then be encrypted using asymmetric key cryptography. FIG. 5 illustrates this encryption operation using the metaphor of a strong box 118. The message digest 116 is placed into strong box 118, and the strongbox is locked with a lock 120 having two key slots opened by different ("asymmetrical") keys. A first key 122 (sometimes called the "private" key) is used to lock the lock. A second (different) key 124 (sometimes called the "public" key) must be used to open the lock once the lock has been locked with the first key. The encryption algorithm and key length is selected so that it is computationally infeasible to calculate first key 122 given access to second key 124, the public key encryption algorithm, the clear text message digest 116, and the encrypted digital signature 106. There are many potential candidate algorithms for this type of asymmetric key cryptography (e.g., RSA, DSA, E1 Gamal, Elliptic Curve Encryption). Different algorithms may have different cryptographic strengths and weaknesses so that techniques which may be developed to defeat one of them are not necessarily applicable to others.

In this case the first key is owned by verifying authority 100 and is kept highly secure (for example, using standard physical and procedural measures typically employed to keep an important private key secret while preventing it from being lost). Once message digest 116 is locked into strong box 118 using the first key 122 the strong box can be opened only by using the corresponding second key 124. Note that other items (e.g., further identification information, a time/date stamp, etc.) can also be placed within strong box 106.

FIG. 6 shows how a protected processing environment 108 "authenticates" the digital signature 106 created by the FIG. 5 process. Second key 124 and the one-way hash algorithm are first securely provided to the protected processing environment. For example, a secure key exchange protocol can be used as described in connection with FIG. 64 of the Ginter et al. patent specification. Public key cryptography allows second key 124 to be made public without compromising first key 122. However, in this example, protected processing environment 108 preferably keeps the second key 124 (and, if desired, also the one-way hash algorithm and/or its associated key) secret to further increase security.

Maintaining "public" verification key 124 as a secret within tamper resistant protected processing environment 108 greatly complicates the job of generating bogus digital signatures 106. If the attacker does not possess second key 124, the difficulty of an algorithmic attack or cryptanalytic attack on the verification digital signature algorithm is significantly increased, and the attacker might be reduced to exhaustive search (brute force) type attacks which would be even less practical because the search trials would require attempting to present a bogus load module 54 to protected processing environment 108—which, after a few such attempts is likely to refuse all further attempts. Keeping second key 124 secret also requires a multi-disciplinary attack: an attacker must both (A) extract the secret from protected processing environment 108, and (B) attack the algorithm. It may be substantially less likely that a single attacker may have expertise in each of these two specialized disciplines.

In addition, maintaining the "public" key within a tamper-resistant environment forecloses the significant threat that the owner of protected processing environment 108 may himself attack the environment. For example, if the owner could replace the appropriate "public" key 124 with his own substitute public key, the owner could force the protected processing environment 108 to execute load modules 54 of his own design—thereby compromising the interests of others in enforcing their own controls within the owner's protected processing environment. For example, the owner could turn off the control that required him to pay for watching or prohibited him from copying content. Since protected processing environment 108 can support a "virtual business presence" by parties other than the owner, it is important for the protected processing environment to be protected against attacks from the owner.

The load module 54 and its associated digital signature 106 is then delivered to the protected processing environment 108. (These items can be provided together at the same time, independently, or at different times.) Protected processing environment 115 applies the same one way hash transformation on load module 54 that a verifying authority 100 applied. Since protected processing environment 108 starts with the same load module 54 and uses the same one-way hash function 115, it should generate the same message digest 116'.

Protected processing environment 108 then decrypts digital signature 106 using the second key 124—i.e., it opens strongbox 118 to retrieve the message digest 116 a verifying authority 100 placed in there. Protected processing environment 108 compares the version of message digest 116 it obtains from the digital signature 106 with the version of message digest 116' it calculates itself from load module 54 using the one way hash transformation 115. The message digests 116, 116' should be identical. If they do not match, digital signature 106 is not authentic or load module 54 has been changed—and protected processing environment 108 rejects load module 54.

FIG. 7 shows that multiple digital signatures 106(1), 106(2), ... 106(N) can be created for the same load module 54. For example:

one digital signature 106(1) can be created by encrypting message digest 116 with a "private" key 122(1), another (different) digital signature 106(2) can be created by encrypting the message digest 116 with a different "private" key 122(2), possibly employing a different signature algorithm, and a still different digital signature 106(N) can be generated by encrypting the message digest using a still different "private" key 122(N), possibly employing a different signature algorithm.

The public key 124(1) corresponding to private key 122(1) acts only to decrypt (authenticate) digital signature 106(1). Similarly, digital signature 106' can only be decrypted (authenticated) using public key 124(2) corresponding to the private 122(2). Public key 124(1) will not "unlock" digital signature 106(2) and public key 124(2) will not "unlock" digital signature 106(1).

Different digital signatures 106(1), 106(N) can also be made by using different one way hash functions 115 and/or different encryption algorithms. As shown in FIG. 8, a load module 54 may have multiple different types of digital signatures 106 associated with it. Requiring a load module 54 to present, to a protected processing environment 108, multiple digital signatures 106 generated using fundamentally different techniques decreases the risk that an attacker can successfully manufacture a bogus load module 54.

For example, as shown in FIG. 8, the same load module 54 might be digitally signed using three different private keys 122, cryptographic algorithms, and/or hash algorithms. If a given load module 54 has multiple distinct digital signatures 106 each computed using a fundamentally different technique, the risk of compromise is substantially lowered. A single algorithmic advance is unlikely to result in simultaneous success against both (or multiple) cryptographic algorithms. The two digital signature algorithms in widespread use today (RSA and DSA) are based on distinct mathematical problems (factoring in the case of RSA, discrete logs for DSA). The most currently popular one-way hash functions (MD4/MD5 and SHA) have similar internal structures, possibly increasing the likelihood that a successful attack against one would lead to a success against another. However, hash functions can be derived from any number of different block ciphers (e.g., SEAL, IDEA, triple-DES) with different internal structures; one of these might be a good candidate to complement MD5 or SHA.

Multiple signatures as shown in FIG. 8 impose a cost of additional storage for the signatures 106 in each protected load module 54, additional code in the protected processing environment 108 to implement additional algorithms, and additional time to verify the digital signatures (as well as to generate them at verification time). As an optimization to the use of multiple keys or algorithms, an appliance 61 might verify only a subset of several signatures associated with a load module 54 (chosen at random) each time the load module is used. This would speed up signature verification while maintaining a high probability of detection. For example, suppose there are one hundred "private" verification keys, and each load module 54 carries one hundred digital signatures. Suppose each protected processing environment 108, on the other hand, knows only a few (e.g., ten) of these corresponding "public" verification keys randomly selected from the set. A successful attack on that particular protected processing environment 108 would permit it to be compromised and would also compromise any other protected processing environment possessing and using precisely that same set of ten keys. However, it would not compromise most other protected processing environments—since they would employ a different subset of the keys used by verifying authority 100.

FIG. 8A shows a simplified example of different processing environments 108(1), . . . , 108(N) possessing different subsets of "public" keys used for digital signature authentication—thereby compartmentalizing the protected processing environments based on key management and availability. The FIG. 8A illustration shows each protected processing environment 108 having only one "public" key 124 that corresponds to one of the digital signatures 106 used to "sign" load module 54. As explained above, any number of digital signatures 106 may be used to sign the load module 54—and different protected processing environment 108 may possess any subset of corresponding "public" keys.

FIG. 9 shows that a load module 54 may comprise multiple segments 55(1), 55(2), 55(3) signed using different digital signatures 106. For example:

a first load module segment 55(1) might be signed using a digital signature 106(1);

a second load module segment 55(2) might be digitally signed using a second digital signature 106(2); and a third load module segment 55(3) might be signed using a third digital signature 106(3).

These three signatures 55(1), 55(2), 55(3) could all be affixed by the same verifying authority 100, or they could be affixed by three different verifying authorities (providing a "web of trust"). (In another model, a load module is verified in its entirety by multiple parties—if a user trusts any of them, she can trust the load module.) A protected processing environment 108 would need to have all three corresponding "public" keys 124(1), 124(2), 124(3) to authenticate the entire load module 54—or the different load module segments could be used by different protected processing environments possessing the corresponding different keys 124(1), 124(2), 124(3). Different signatures 55(1), 55(2), 55(3) could be calculated using different signature and/or one-way hash algorithms to increase the difficulty of defeating them by cryptanalytic attack.

Assurance Levels

Verifying authority 100 can use different digital signing techniques to provide different "assurance levels" for different kinds of electronic appliances 61 having different "work factors" or levels of tamper resistance. FIGS. 10A–10C show an example assurance level hierarchy providing three different assurance levels for different electronic appliance types:

Assurance level I might be used for an electronic appliance(s) 61 whose protected processing environment 108 is based on software techniques that may be somewhat resistant to tampering. An example of an assurance level I electronic appliance 61A might be a general purpose personal computer that executes software to create protected processing environment 108.

An assurance level II electronic appliance 61B may provide a protected processing environment 108 based on a hybrid of software security techniques and hardware-based security techniques. An example of an assurance level II electronic appliance 61B might be a general purpose personal computer equipped with a hardware integrated circuit secure processing unit ("SPU") that performs some secure processing outside of the SPU (see Ginter et al. patent disclosure FIG. 10 and associated text). Such a hybrid arrangement might be relatively more resistant to tampering than a software-only implementation.

The assurance level III appliance 61C shown is a general purpose personal computer equipped with a hardware-based secure processing unit 132 providing and completely containing protected processing environment 108 (see Ginter et al. FIGS. 6 and 9 for example). A silicon-based special purpose integrated circuit security chip is relatively more tamper-resistant than implementations relying on software techniques for some or all of their tamper-resistance.

In this example, verifying authority 100 digitally signs load modules 54 using different digital signature techniques (for example, different "private" keys 122) based on assurance level. The digital signatures 106 applied by verifying authority 100 thus securely encode the same (or different) load module 54 for use by appropriate corresponding assurance level electronic appliances 61.

Assurance level in this example may be assigned to a particular protected processing environment 108 at initialization (e.g., at the factory in the case of hardware-based secure processing units). Assigning assurance level at initialization time facilitates the use of key management (e.g., secure key exchange protocols) to enforce isolation based on assurance level. For example, since establishment of assurance level is done at initialization time, rather than in the field in this example, the key exchange mechanism can be used to provide new keys (assuming an assurance level has been established correctly).

Within a protected processing environment 108, as shown in FIGS. 10A–10C, different assurance levels may be assigned to each separate instance of a channel (see Ginter et al., FIG. 15) contained therein. In this way, each secure processing environment and host event processing environment (see Ginter et al., FIG. 10 and associated description) contained within an instance of a PPE 108 may contain multiple instances of a channel, each with independent and different assurance levels. The nature of this feature of the invention permits the separation of different channels within a PPE 108 from each other, each channel possibly having identical, shared, or independent sets of load modules for each specific channel limited solely to the resources and services authorized for use by that specific channel. In this way, the security of the entire PPE is enhanced and the effect of security breaches within each channel is compartmentalized solely to that channel.

As shown in FIG. 11A-11C, different digital signatures and/or signature algorithms corresponding to different "assurance levels" may be used to allow a particular execution environment to protect itself from particular load modules 54 that are accessible to other classes or "assurance levels" of electronic appliances. As shown in FIGS. 11A–11C:

A protected processing environment(s) of assurance level I protects itself (themselves) by executing only load modules 54 sealed with an assurance level I digital signature 106(I). Protected processing environment(s) 108 having an associated assurance level I is (are) securely issued a public key 124(I) that can "unlock" the level I digital signature.

Similarly, a protected processing environment(s) of assurance level II protects itself (themselves) by executing only the same (or different) load module 54 sealed with a "Level II" digital signature 106(II). Such a protected processing environment 108 having an associated corresponding assurance level II possess a public key 124(II) used to "unlock" the level II digital signature.

A protected processing environment(s) 108 of assurance level III protects itself (themselves) by executing only load modules 54 having a digital signature 106(III) for assurance level III. Such an assurance level III protected processing environment 108 possesses a corresponding assurance level 3 public key 124(III). Key management encryption (not signature) keys can allow this protection to work securely.

In this example, electronic appliances 61 of different assurance levels can communicate with one another and pass load modules 54 between one another—an important feature providing a scaleable virtual distribution environment involving all sorts of different appliances (e.g., personal computers, laptop computers, handheld computers, television sets, media players, set top boxes, internet browser appliances, smart cards, mainframe computers, etc.) The present invention uses verifying authority 100 and the digital signatures it provides to compartmentalize the different electronic appliances depending on their level of security (e.g., work factor or relative tamper resistance). In particular, verifying authority 100 and the digital signatures it provides isolate appliances with significantly different work factors—preventing the security of high work factor appliances from collapsing into the security of low work factor appliances due to free exchange of load modules 54.

In one example, verifying authority 100 may digitally sign identical copies of load module 54 for use by different classes or "assurance levels" of electronic appliances 61. If the sharing of a load module 54 between different electronic appliances is regarded as an open communications channel between the protected processing environments 108 of the two appliances, it becomes apparent that there is a high degree of risk in permitting such sharing to occur. In particular, the extra security assurances and precautions of the more trusted environment are collapsed into the those of the less trusted environment because an attacker who compromises a load module within a less trusted environment is then be able to launch the same load module to attack the more trusted environment. Hence, although compartmentalization based on encryption and key management can be used to restrict certain kinds of load modules 54 to execute only on certain types of electronic appliances 61, a significant application in this context is to compartmentalize the different types of electronic appliances and thereby allow an electronic appliance to protect itself against load modules 54 of different assurance levels.

FIG. 12 emphasizes this isolation using the illustrative metaphor of desert islands. It shows how the assurance levels can be used to isolate and compartmentalize any number of different types of electronic appliances 61. In this example:

Personal computer 60(1) providing a software-only protected processing environment 108 may be at assurance level I;

Media player 400(1) providing a software-only based protected processing environment may be at assurance level II;

Server 402(1) providing a software-only based protected processing environment may be at assurance level III;

Support service 404(1) providing a software-only based protected processing environment may be at assurance level IV;

Personal computer 60(2) providing a hybrid software and hardware protected processing environment 108 may be at assurance level V;

Media player 400(2) providing a hybrid software and hardware protected processing environment may be at assurance level VI;

Server 402(2) providing a software and hardware hybrid protected processing environment may be at assurance level VII;

Support service 404(2) providing a software and hardware hybrid protected processing environment may be at assurance level VIII; and Personal computer 60(3) providing a hardware-only protected processing environment 108 may be at assurance level IX;

Media player 400(3) providing a hardware-only protected processing environment may be at assurance level X;

Server 402(3) providing a hardware-only based protected processing environment may be at assurance level XI;

Support service 404(3) providing a hardware-only based protected processing environment may be at assurance level XII.

In accordance with this feature of the invention, verifying authority 100 supports all of these various categories of digital signatures, and system 50 uses key management to distribute the appropriate verification keys to different assurance level devices. For example, verifying authority 100 may digitally sign a particular load module 54 such that only hardware-only based server(s) 402(3) at assurance level XI may authenticate it. This compartmentalization prevents any load module executable on hardware-only servers 402(3) from executing on any other assurance level appliance (for example, software-only protected processing environment based support service 404(1)).

To simplify key management and distribution, execution environments having significantly similar work factors can be classified in the same assurance level. FIG. 13 shows one example hierarchical assurance level arrangement. In this example, less secure "software only" protected processing environment 108 devices are categorized as assurance level I, somewhat more secure "software and hardware hybrid" protected processing environment appliances are categorized as assurance level II, and more trusted "hardware only" protected processing environment devices are categorized as assurance level III.

Figure 13A:
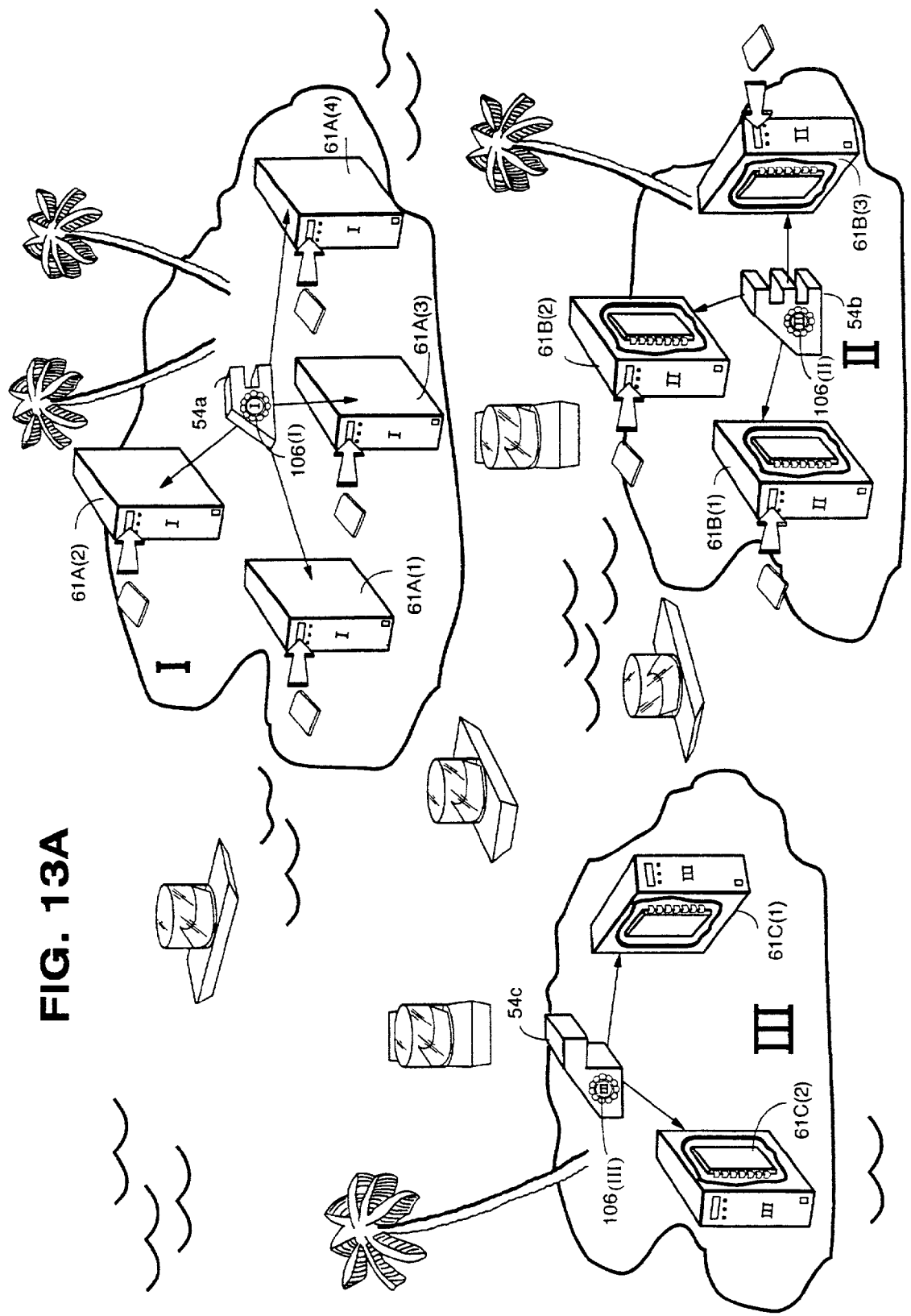

To show this type of isolation, FIG. 13A shows three example corresponding "desert islands." Desert island I is "inhabited" by personal computers 61A providing a software-only protected processing environment. The software-only protected processing environment based personal computers 60(1) "inhabit" desert island I are all of the same assurance level—and thus will each authenticate (and may thus each use) an assurance level I load module 54a. Desert island II is "inhabited" by assurance level II hybrid software and hardware protected processing environment personal computers 61B. These assurance level II personal computers will each authenticate (and may thus each execute) an assurance level II load module 54b. Similarly, a desert island III is "inhabited" by assurance level III personal computers 61C providing hardware-only protected processing environments. These assurance level III devices 61C may each authenticate and execute an assurance level III load module 54c.

The "desert islands" are created by the use of different digital signatures on each of load modules 54a, 54b, 54c. In this example, all of the appliances 61 may freely communicate with one another (as indicated by the barges—which represent electronic or other communications between the various devices. However, because particular assurance level load modules 54 will be authenticated only by appliances 60 having corresponding assurance levels, the load modules cannot leave their associated "desert island"— providing isolation between the different assurance level execution environments. More specifically, a particular assurance level appliance 61 thus protects itself from using a load module 54 of a different assurance level. Digital signatures (and/or signature algorithms) 106 in this sense create the isolated "desert islands" shown—since they allow execution environments to protect themselves from "off island" load modules 54 of different assurance levels.

A load module or other executable may be certified for multiple assurance levels. Different digital signatures may be used to certify the same load module or other executable for different respective assurance levels. The load module or other executable could also be encrypted differently (e.g. using different keys to encrypt the load module) based on assurance level. If a load module is encrypted differently for different assurance levels, and the keys and/or algorithms that are used to decrypt such load modules are only distributed to environments of the same assurance level, an additional measure of security is provided. The risk associated with disclosing the load module or other executable contents (e.g., by decrypting encrypted code before execution) in a lower assurance environment does not compromise the security of higher assurance level systems directly, but it may help the attacker learn how the load module or other executable works and how to encrypt them—which can be important in making bogus load modules or other executables (although not in certifying them—since certification requires keys that would only become available to an attacker who has compromised the keys of a corresponding appropriate assurance level environment). Commercially, it may be important for administrative ease and consistency to take this risk. In other cases, it will not be (e.g. provider sensitivities, government uses, custom functions, etc.)

Figure 14:
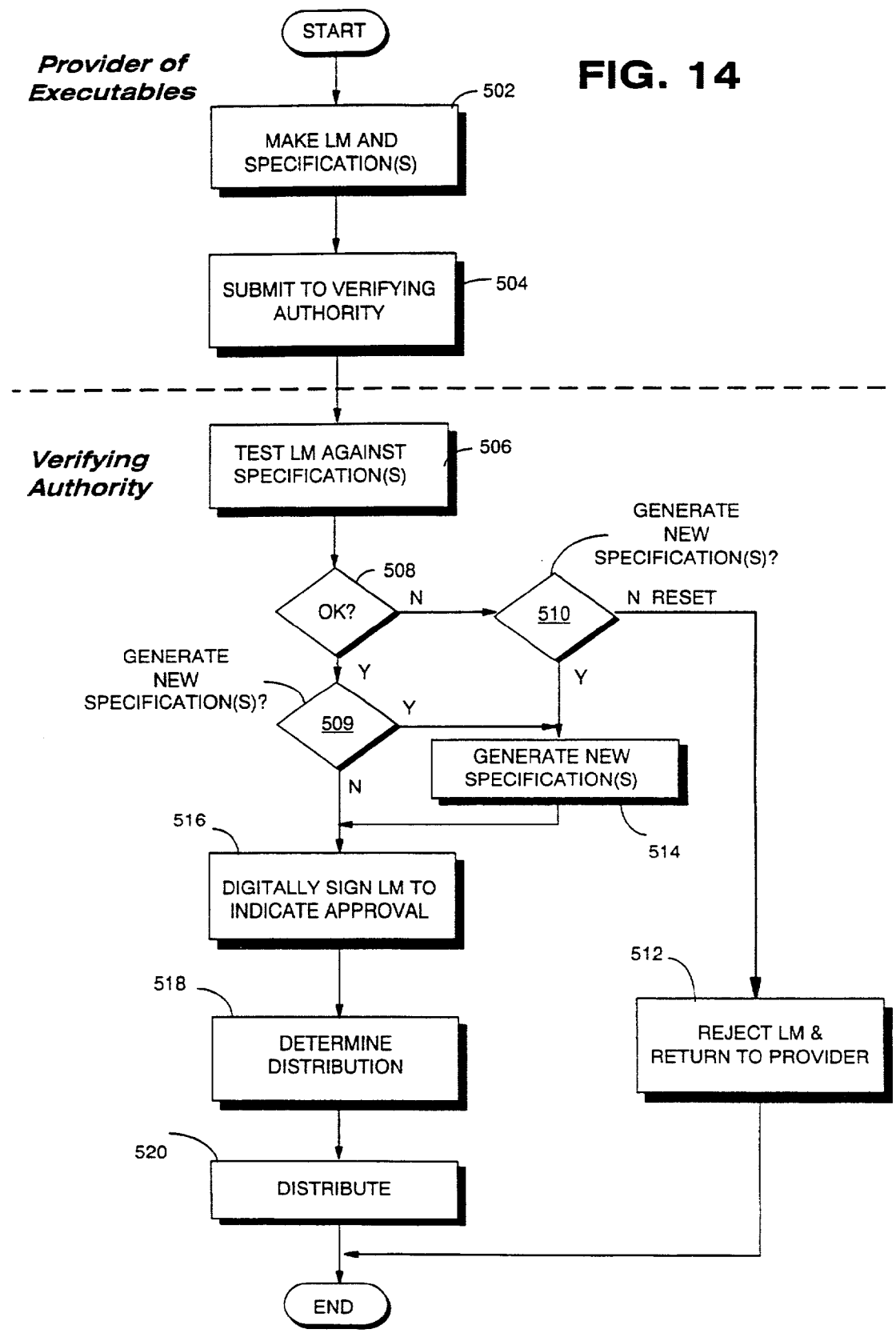
FIG. 14 shows example overall steps that may be performed within an electronic system (such as, for example, a virtual distribution environment) to test, certify, distribute and use executables.

FIG. 14 shows an example sequence of steps that may be performed in an overall process provided by these inventions. To begin the overall process, a load module provider 52 may manufacture a load module and associated specifications (FIG. 14, block 502). Provider 52 may then submit the load module and associated specifications to verifying authority 100 for verification (FIG. 14, block 504). Verifying authority 100 may analyze, test, and/or otherwise validate the load module against the specifications (FIG. 14, block 506), and determine whether the load module satisfies the specifications.

If the load module is found to satisfy its specifications, a verifying authority 100 determines whether it is authorized to generate one or more new specifications for the load module (FIG. 14, block 509). If it is authorized and this function has been requested ("Y" exit to decision block 509), a verifying authority generates specifications and associates them with the load module (FIG. 14, block 514).

If the load module fails the test ("N" exit to decision block 508), verifying authority 100 determines whether it is authorized and able to create new specifications corresponding to the actual load module performance, and whether it is desirable to create the conforming specifications (FIG. 14, decision block 510). If verifying authority 100 decides not to make new specifications ("N" exit to decision block 510), verifying authority returns the load module to provider 52 (block 512) and the process ends. On the other hand, if verifying authority 100 determines that it is desirable to make new specifications and it is able and authorized to do so, a verifying authority 100 may make new specifications that conform to the load module ("Y" exit to decision block 510; block 514).

A verifying authority 100 may then digitally sign the load module 54 to indicate approval (FIG. 14, block 516). This step 516 may involve applying multiple digital signatures and/or a selection of the appropriate digital signatures to use in order to restrict the load module to particular "assurance levels" of electronic appliances as discussed above. Verifying authority may then determine the distribution of the load module (FIG. 14, block 518). This "determine distribution" step may involve, for example, determining who the load module should be distributed to (e.g., provider 52, support services 404, a load module repository operated by a verifying authority, etc.) and/or what should be distributed (e.g., the load module plus corresponding digital signatures, digital signatures only, digital signatures and associated description, etc.). Verifying authority 100 may then distribute the appropriate information to a value chain using the appropriate distribution techniques (FIG. 14, block 520).

We claim:

1. A method including the following:
   at a certification authority, receiving an executable program generated by a party independent of the certification authority;
   at the certification authority, testing the executable program and, based on the results of the testing, generating a specification describing the actual operation of the executable program;
   at the certification authority, generating a digital certificate certifying that the executable program operates in the manner described in the specification;
   receiving the executable program at a user site;
   receiving the digital certificate at the user site;
   at the user site, evaluating the digital certificate to determine if the digital certificate is associated with the executable program;
   at the user site, evaluating the digital certificate to determine whether to execute the executable program; and
   at the user site, executing the executable program, the execution being dependent on the evaluation of the digital certificate, and in which the user site includes a tamper-resistant execution space, the tamper-resistant execution space being operable to protect against tampering, by a user at the user site, with the performance of said step of evaluating the digital certificate to determine whether to execute the executable program.

2. A method including the following:
   at a certification authority, receiving an executable program generated by a party independent of the certification authority;
   at the certification authority, testing the executable program and, based on the results of the testing, generating a specification describing the actual operation of the executable program;
   at the certification authority, generating a digital certificate certifying that the executable program operates in the manner described in the specification;
   receiving the executable program at a user site in encrypted form;
   receiving the digital certificate at the user site;
   at the user site, evaluating the digital certificate to determine if the digital certificate is associated with the executable program;
   at the user site, evaluating the digital certificate to determine whether to execute the executable program;
   decrypting the executable program; and
   at the user site, executing the executable program, the execution being dependent on the evaluation of the digital certificate, and in which the user site includes a tamper-resistant execution space, the tamper-resistant execution space being operable to protect against tampering, by a user at the user site, with the performance of said steps of (i) decrypting the executable program, and (ii) evaluating the digital certificate to determine whether to execute the executable program.

3. A method including the following:
   at a certification authority, receiving an executable program generated by a party independent of the certification authority;
   at the certification authority, testing the executable program and, based on the results of the testing, generating a specification describing the actual operation of the executable program;
   at the certification authority, generating a digital certificate certifying that the executable program operates in the manner described in the specification;
   receiving the executable program at a user site;
   receiving the digital certificate at the user site;
   at the user site, evaluating the digital certificate to determine if the digital certificate is associated with the executable program;
   at the user site, evaluating the digital certificate to determine whether to execute the executable program; and
   at the user site, executing the executable program, the execution being dependent on the evaluation of the digital certificate, and in which the user site includes a tamper-resistant execution space, the tamper-resistant execution space being operable to protect against tampering, by a user at the user site, with the performance of said step of evaluating the digital certificate to determine whether to execute the executable program, and in which the tamper-resistant execution space includes a secure processing unit.

* * * * *